INVENTORS
HISAO FUTAKI
BY TAKESHI SHIMODA

H. Edward Mestern

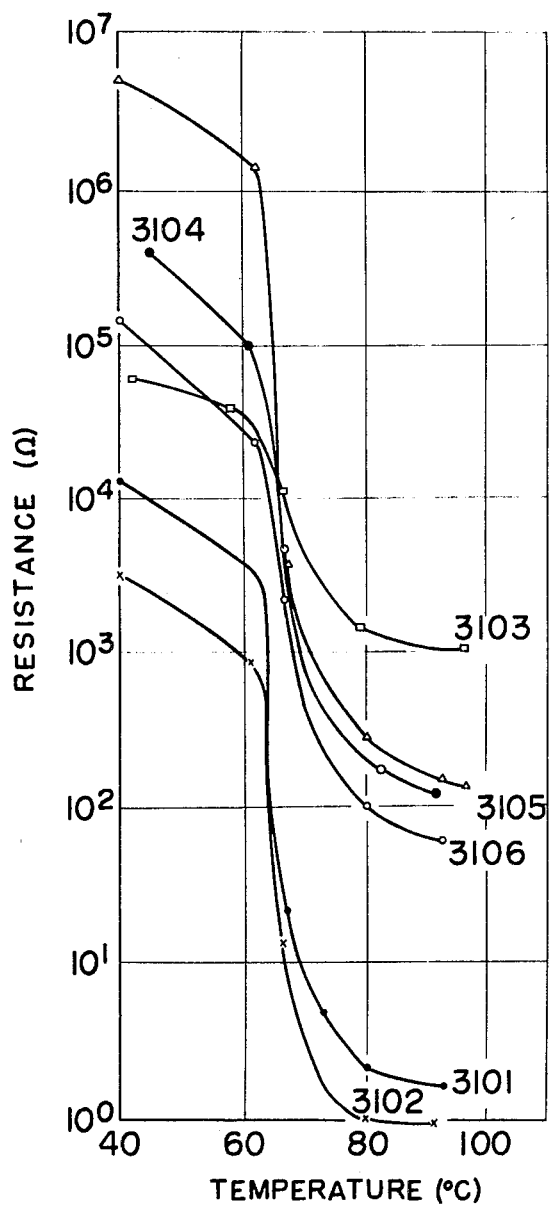

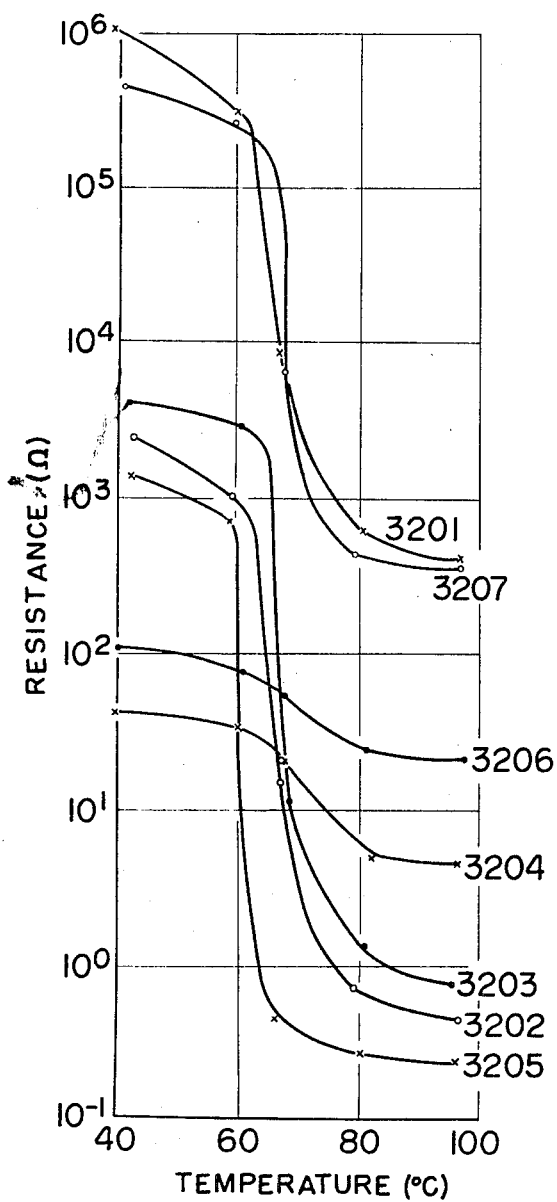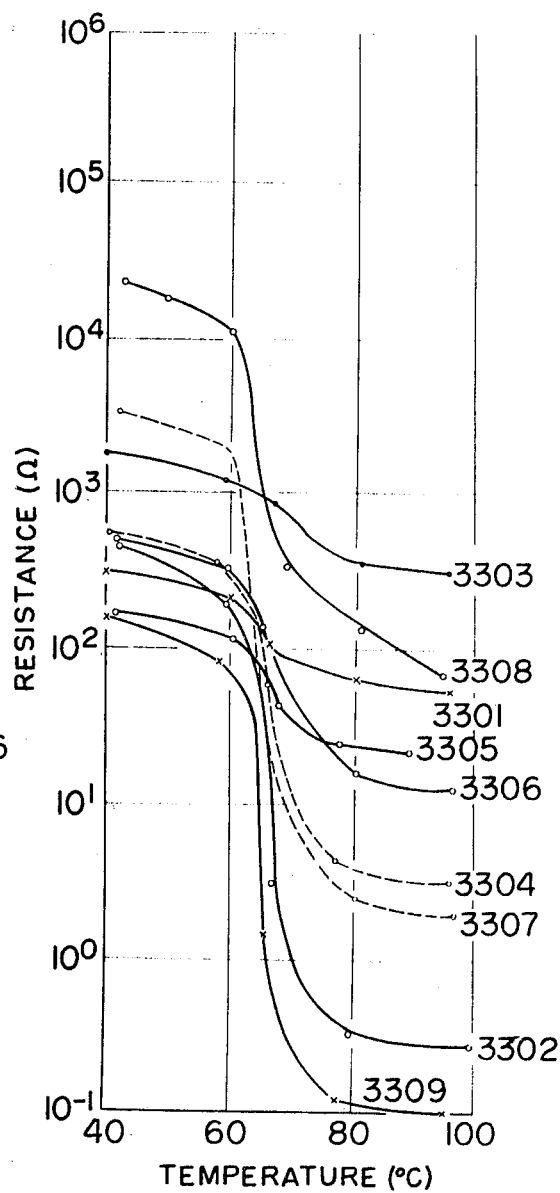

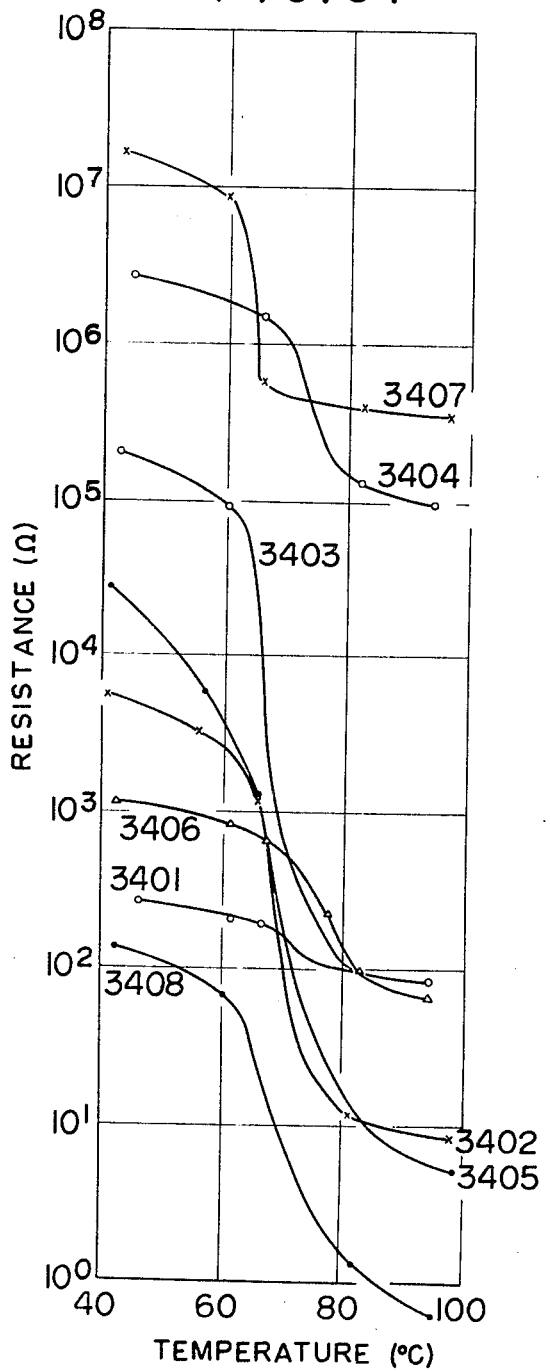
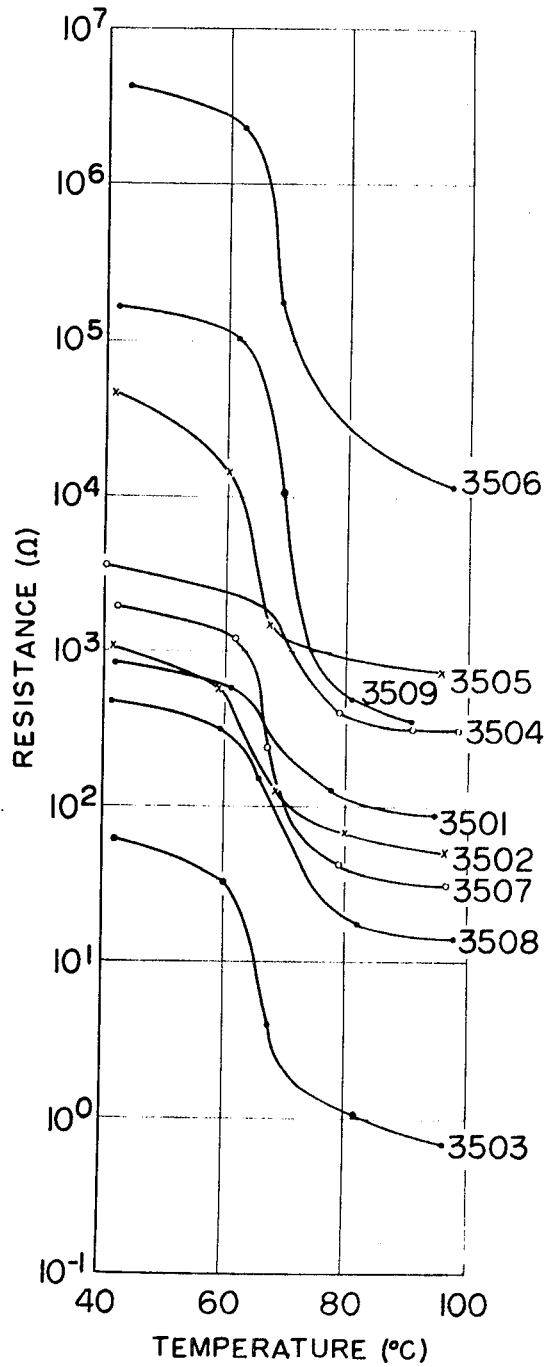

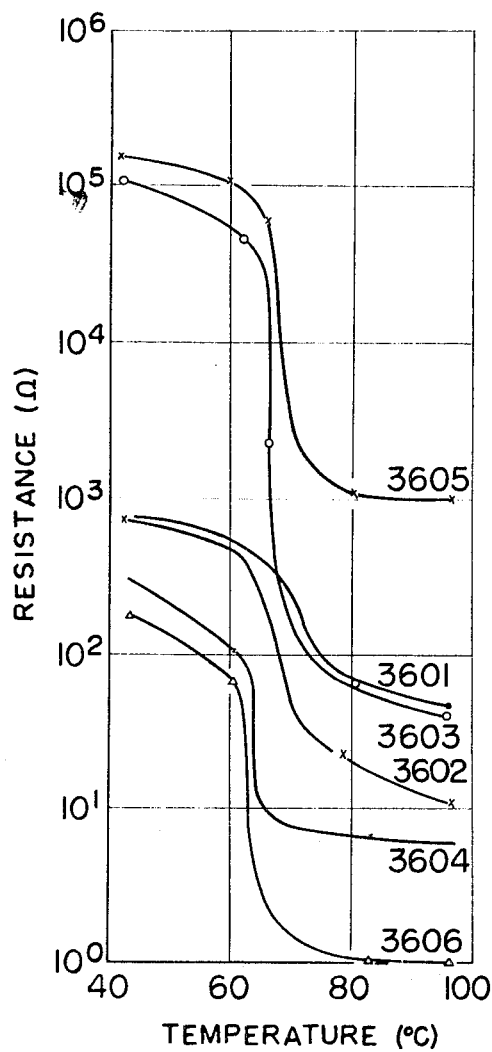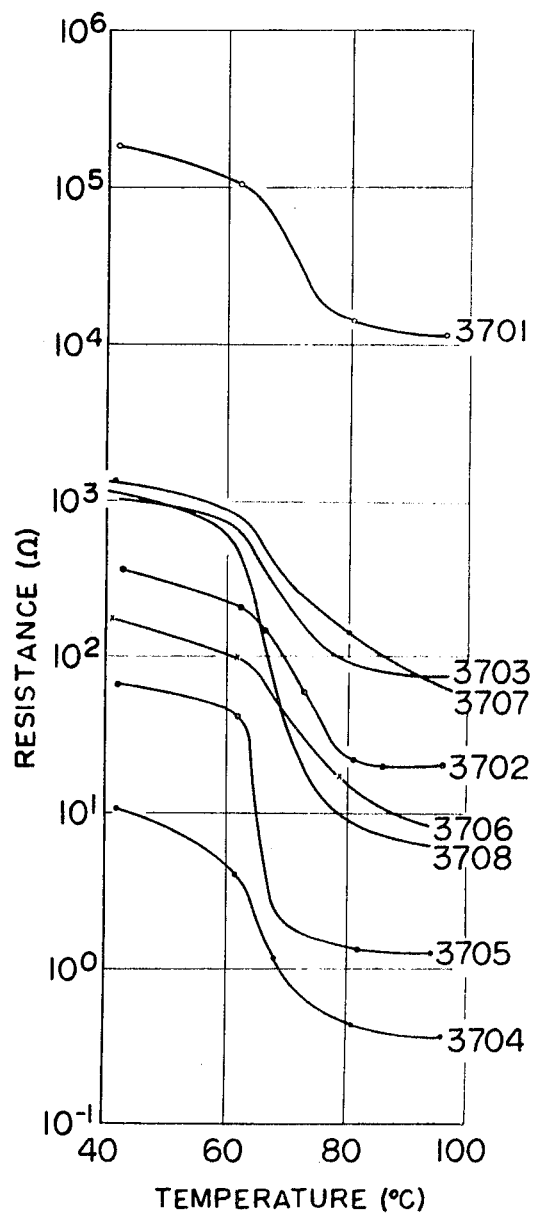

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE (Ψ)

RATE OF ABRUPT CHANGE OF RESISTANCE (Ψ)

RATE OF ABRUPT CHANGE OF RESISTANCE (Ψ)

RATE OF ABRUPT CHANGE OF RESISTANCE (Ψ)

INVENTORS
HISAO FUTAKI
BY TAKESHI SHIMODA

*H. Edward Mestern*

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

INVENTORS
HISAO FUTAKI
BY TAKESHI SHIMODA

H. Edward Western

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

RATE OF ABRUPT CHANGE OF RESISTANCE ($\Psi$)

INVENTORS
HISAO FUTAKI
TAKESHI SHIMODA
BY
H. Edward Mostern

RATE OF ABRUPT CHANGE OF
RESISTANCE (Ψ)

RATE OF ABRUPT CHANGE OF
RESISTANCE (Ψ)

RATE OF ABRUPT CHANGE OF
RESISTANCE (Ψ)

RATE OF ABRUPT CHANGE OF
RESISTANCE (Ψ)

RATE OF ABRUPT CHANGE OF RESISTANCE (Ψ)

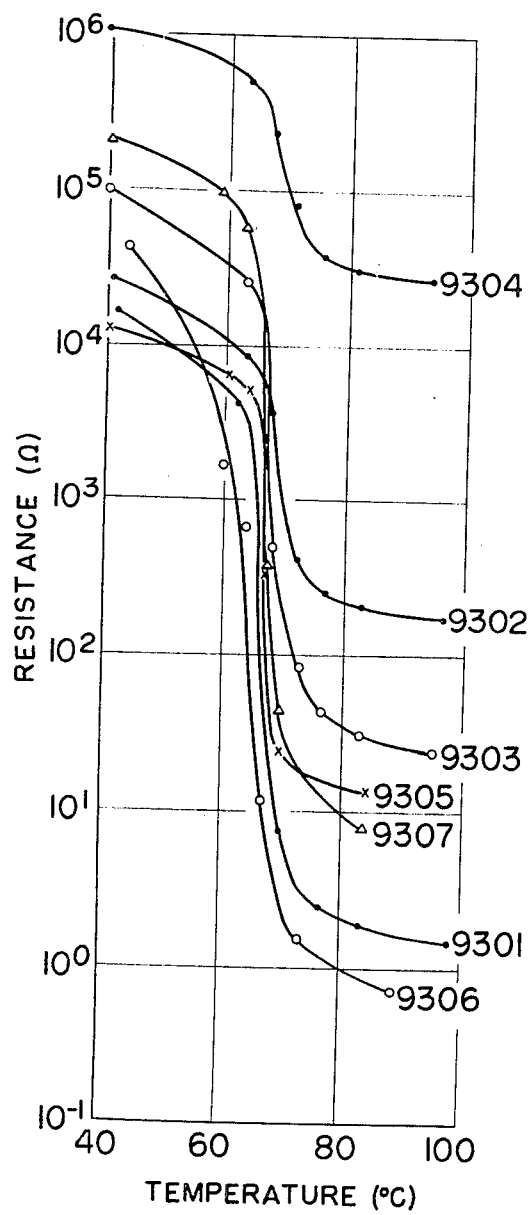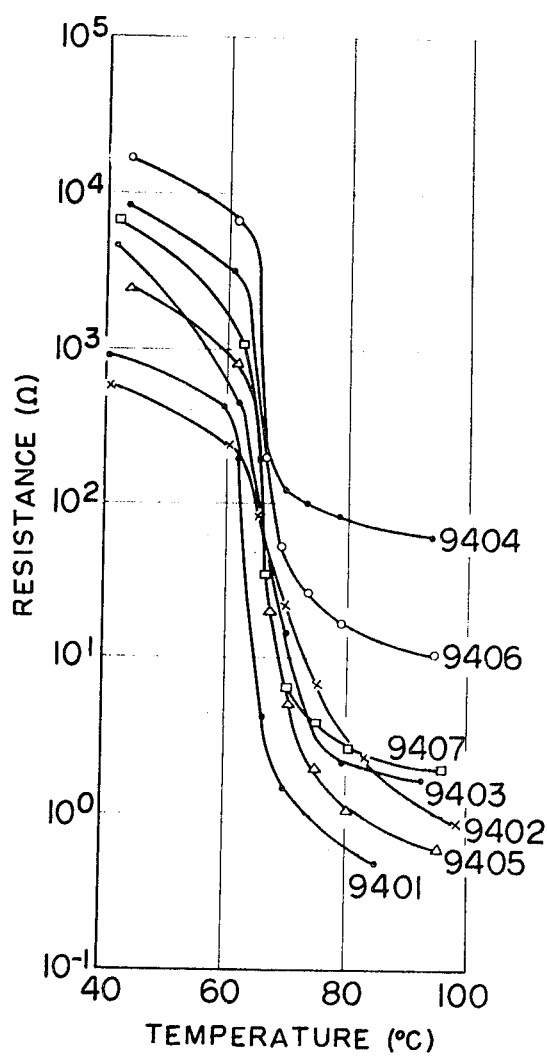

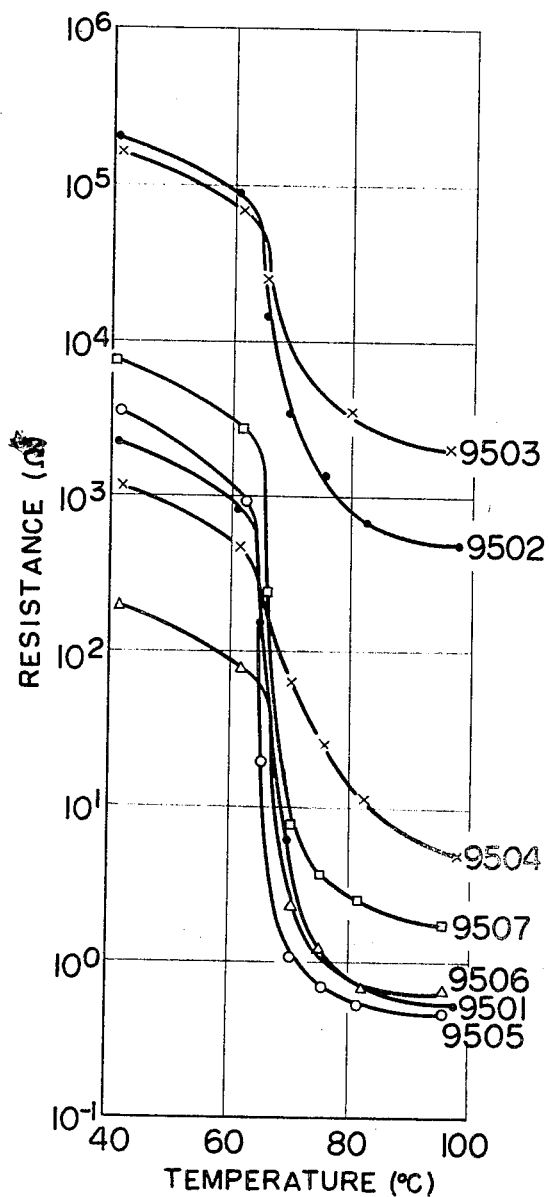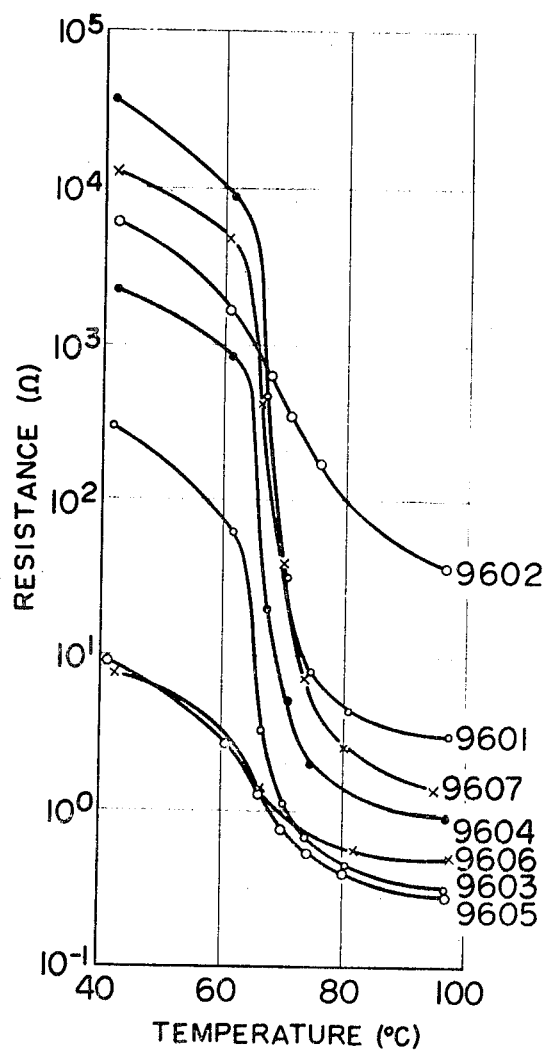
FIG. 95
FIG. 96

LEAD WIRE $V_2O_4$ CRYSTALLITE

LEAD WIRE

LEAD WIRE

United States Patent Office 3,598,762
Patented Aug. 10, 1971

3,598,762
VANADIUM OXIDE SEMICONDUCTORS AND METHOD OF MANUFACTURING SAME
Hisao Futaki, Musashino-shi, and Takeshi Shimoda, Hachioji-shi, Japan, assignors to Kabushiki Kaisha Hitachi Seisakusho, Tokyo, Japan
Continuation of abandoned application Ser. No. 484,510, Aug. 24, 1965, which is a continuation-in-part of application Ser. No. 266,245, Mar. 19, 1963. This application Sept. 21, 1967, Ser. No. 701,021
Claims priority, application Japan, Mar. 22, 1962, 37/10,639
Int. Cl. H01b 1/06; H01c
U.S. Cl. 252—518                 35 Claims

ABSTRACT OF THE DISCLOSURE

A thermistor having an abrupt change in a negative temperature coefficient of electrical resistance in a specific temperature range from 65 to 70° C., which comprises a sintered body composed of a semiconductive oxide substance and a plurality of crystalline particles of $V_2O_4$ suspended in and enclosed by said oxide substance. This specification also discloses methods for producing thereof which comprises the steps of reducing a mixture of $V_2O_5$ and other oxide at about 400° C. and sintering the reduced mixture at 1000–1300° C.

---

This application is a continuation of our co-pending application Ser. No. 484,510, now abandoned, filed Aug. 24, 1965, which was a continuation-in-part of our abandoned application Ser. No. 266,245, filed Mar. 19, 1963.

The present invention relates to an oxide semiconductor and method of manufacturing the same. More particularly, it relates to a thermistor of a type such that its resistance value sharply declines when the temperature of said oxide semiconductor reaches a specific temperature range of about 65° C.–70° C. (hereinafter described as a particular thermistor) and a method of fabricating the same.

For an element whose resistance value undergoes gradual decline with a certain function in accordance with variations in temperature, such as temperature rise, there have conventionally been known various types of thermistors, such as ceramic thermistors, glass thermistors, etc. On the other hand, there have also been known so-called positive thermistors whose resistance value sharply increases when the temperature reaches a certain temperature level in its ascent.

However, these conventionally known thermistors have various disadvantages such that the electric characteristics are unstable, degree of abrupt change in resistance is not satisfactory to meet practical purposes, their range of applications is comparatively limited, methods for fabricating such thermistors are very complicated and difficult and so on.

It is therefore an object of the present invention to provide thermistor elements which have an extremely large negative temperature coefficient of resistance.

It is another object of the present invention to provide thermistor elements having a practicable temperature range for use within which electric resistance decreases sharply.

It is still another object of the present invention to provide thermistor elements in which value of electric resistance can be selected optionally.

It is still another object of the present invention to provide thermistor elements which are sensitive to temperature variations and stable in electrical characteristics.

It is still another object of the present invention to provide thermistor elements which are free from resistance-variation with lapse of time and have the least temperature hysteresis, and excellent reproducibility and moreover whose shape and size can be selected at will.

It is a further object of the present invention to provide methods for fabricating thermistor elements having such advantages as described in the preceding paragraphs which enable one skilled in the art to obtain the desired thermistors without requiring higher technical skill and with less process steps.

The foregoing objects and other objects of the present invention will become more apparent by reference to the following description when read in conjunction with the accompanying drawing in which:

FIGS. 5, 8, 31–37, 90–96 and 100 are respectively the diagrams illustrating the resistance-temperature characteristic curves of the oxide semiconductors fabricated in accordance with the present invention;

Figure 1:
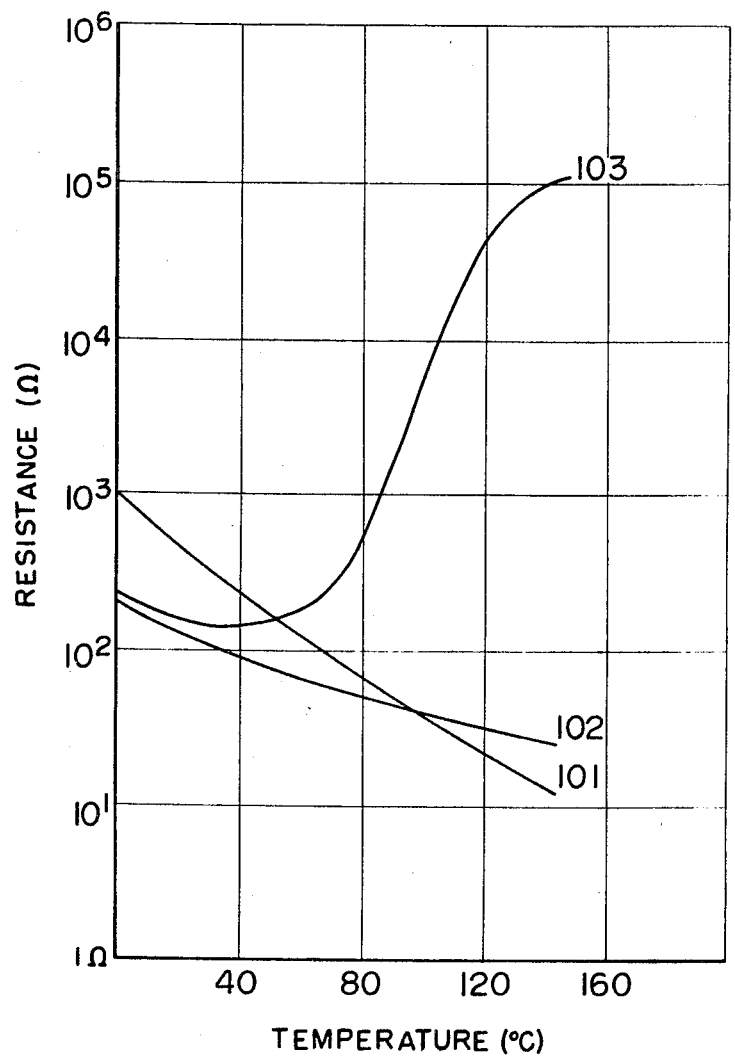
FIG. 1 is a diagram showing the resistance-temperature characteristic curves of the known thermistors.

More detailed explanation on these conventional thermistors will be given hereinbelow. The studies of the thermistors have already been undertaken as early as the 1940's. The main component materials used for the thermistors available at present comprise complex oxides of the binary to quaternary systems of Mn, Co, Ni, Fe and Cu. These thermistors are sintered products prepared by shaping complex oxides of said binary-quaternary systems in bead type, disc type or rod type, and then subjecting the shaped materials to sinter-treating in the air at the temperature of above 1000° C. The variation in electric resistance with the temperature variation of the thus produced thermistors is as indicated in FIG. 1 by the curve 101. In this diagram, electric resistance [Ω] is expressed on the ordinate, while temperature [° C.] is represented on the abscissa. The curve 101, as is already known, shows the relationship between temperature and resistance, wherein the resistance value varies in accordance with the function represented by $$R = R_0 \exp B \left( \frac{1}{T} - \frac{1}{T_0} \right)$$

wherein R is a resistance value at the time of the thermistor temperature being T [° K.], $R_0$ is a resistance value at the time of the thermistor temperature being at the absolute temperature ∞ [° K.] and B is the thermistor constant [° K.]. Since these thermistors, as mentioned in the foregoing, are sintered products, they have such advantage that the size of the elements can be optionally determined, which consequently makes it possible to easily obtain elements which are capable of well controlling the current of a few amperes and above. On the other hand, they have drawbacks such that it is difficult to maintain uniform grain size of sintered powder particles which constitute the thermistors as well as uniform quality of composition of the sintered powder particles, and that, for the preceding reason, the thermistors of this quality have remarkable irregularity in their characteristics.

Ceramic thermistors are obtained in almost similar method as that of said thermistors and they possess similar electric characteristics, structure and properties. For example, U.S. Pat. No. 2,962,452 describes that thermistors can also be fabricated by properly mixing oxides of Ti, Sn, Ta, Mo, Al, Nb, V, W, etc., besides the components of oxides of Co, Ni, Mn, Fe, Cu which have been used for conventional thermistors. It should be noted that the ceramic thermistors fabricated from the above-mentioned new oxides have the electric characteristics which follow the function represented by $$R = R_0 \exp B \left( \frac{1}{T} - \frac{1}{T_0} \right)$$

as is the case with the conventional thermistors. The conduction mechanism of ceramic thermistor is similar to that of ordinal thermistor.

Glass thermistors, unlike conventional thermistors whose elements are composed of sintered materials of metal oxide powders, are those whose elements are made of semiconducting oxide glass. According to Journal of the Electrochemical Society, vol. 104, No. 4, April 1957, pages 237–240, published by P. L. Baynton, H. Rawson and J. E. Stanworth as a result of their studies, semiconducting oxides are the $BaO-V_2O_5-P_2O_5$ system mainly composed of barium oxide BaO, vanadium pentoxide $V_2O_5$ and phosphorus pentoxide $P_2O_5$, or the

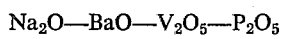

system with sodium oxide $Na_2O$ added to the above mentioned system. In this semiconducting glass $V_2O_5$ serves as network former and a material, such as $P_2O_5$ etc., serves as vitrifying substance.

In the semiconducting glass, there exist together ions of transition elements of the same kind as the semiconductor glass will different valences. As energy levels of these elements stand close to each other, impartation of small amount of energy may induce to mutual transfer of electrons and exchange of valence among them. For example, in vanadium oxide system glass, $V^{4+}$ and $V^{5+}$ coexist and they are inclined to undergo valence exchange therebetween in the manner as described below.

$V^{4+} \rightleftarrows V^{5+} + e$ (wherein $e$ denotes electric charge of electron). Therefore, when electric field is applied to this glass, exchange of electrons is provoked to take place continuously one after another resulting in an electric current flow. As conventional thermistors also contain transition elements of Co, Ni, Mn, etc., valence exchange of transition elements is carried out at the crystal lattice in a similar manner to the abovementioned theory, electro-conductivity is given to the glass. It may well be said, therefore, that glass thermistors and conventional thermistors, though different in compositions, are the same valence conversion type semiconductors which are quite identical in principle, with only exception that the former has a glassy structure.

There are several methods of fabricating these glass thermistors; as one example, a method of producing of glass thermistor of $BaO-V_2O_5-P_2O_5$ system will be considered hereinbelow. First of all, BaO, $V_2O_5$ and $P_2O_5$ are properly weighed and mixed together, then the mixture is melted at a temperature of, for example, 1000° C., then a glass thermistor is taken out of the molten mixture in the form of either a bead type, film type or ladder type, and finally it is cooled and solidified in the final shape.

According to the description in "Journal of the Electrochemical Society" written by Baynton et al., it has been clearly stated that no crystalloid is found in a semiconducting glass of a so called glass thermistor by X-ray diffraction detection, therefore, the semiconductor glass is completely amorphous, and that is a corelationship between the logarithm of resistance value and the reciprocal of absolute temperature. Therefore, in other words, the glass thermistor has a resistance-temperature characteristic which is similar to that of the conventional thermistor. In glass thermistor of known type, resistance variation shown as the curve 102 in FIG. 1 in accordance with temperature variation differs from that of the conventional thermistor shown as the curve 101 but apparently follows the function represented by $$R = R_0 \exp B \left( \frac{1}{T} - \frac{1}{T_0} \right)$$

Since this glass thermistor is made of vitreous compounds as mentioned in the foregoing, it easily deforms and has excellent working properties. Furthermore, since the composite materials of this glass thermistor are molten and mixed, it is homogeneous in its structure and accordingly has little irregularity in its characteristics and is eminent in its interexchangeability. Further, almost no aging phenomenon (i.e., a phenomenon that electric characteristics thereof undergoes naturally in accordance with lapse of time, which frequently takes place in usual thermistors), and also very few internal noises in view of the fact that it is produced from molten material. On the other hand, however, glass thermistor has some drawbacks such that it has high electric resistance and is water-soluble, although it is made of glass and is difficult to be made in a large size.

A positive thermistor is fabricated by adding a small amount of rare earth or the like to materials of barium titanate system; its resistance value increases sharply when temperature rises to a specific level. Namely, the thermistor varies its resistance within a comparatively narrow temperature range and has extremely large temperature coefficient in positive state. Explaining more minutely about this positive thermistor, a positive thermistor is made of ceramics which comprises a fired product composed of 1 mol of first component consisting of at least one oxide selected from titanium dioxide, zirconium dioxide, niobium oxide or tantalum oxide and a total of 1 mol of second component consisting of (a) up to 0.999 mol of at least one oxide selected from barium oxide, lead oxide or strontium oxide and (b) 0.001 mol of at least one rare earth metal attached to crystal lattice or up to solution limit of trivalent permutation impurity and is initially fired in inert atmosphere to sinter the constituents and thereafter fired in air. There are several methods for fabricating the positive thermistor, of which the most commonly practised method is as follows. Namely, the above-mentioned components are properly selected and mixed together, then the mixture is subjected to a wet mill in water for 2–4 hours, thereafter it is heat-treated for about 2 hours at a temperature of 1,000° C. or so. The thus treated mixture is again subjected to the wet mill in water and then dried. After dried, the material is pulverized into fine particles, which is then molded into a desired shape by applying pressure of about 35,000 kg./cm.$^2$. The shaped article is sintered at the temperature of about 1,400° C. for several hours, whereby a positive thermistor is obtained.

The positive thermistor obtained in this way shows that, when it is heated to a specific temperature, its resistance sharply increases, the range of the said specific temperature being comparatively narrow, and its temperature coefficient for resistance is of extremely large value. A representative characteristic curve as shown by the curve 103 in FIG. 1. As mentioned in the preceding, since this positive thermistor has large temperature coefficient, it has been used for apparatuses which require particularly high sensitivity such as, for example, those used for temperature measurement, temperature control, voltage control for current stabilization, thermo-electric conductivity measurement, etc., thereby revealing remarkably improved practical effects as compared with conventional thermistor. However, even the most commonly employed method as described above is not free from disadvantages. That is, the manufacturing method comprises multiple steps and, moreover, particular problems to be taken into consideration are that since the amount of additives composing the positive thermistor is very small, perfect mixing of the components is necessary; in order to attain excellent characteristics, component materials should be highly pure, otherwise desired characteristics cannot be obtained and the resultant product will become a mere resistor; the manufacturing conditions are mostly difficult to control its treating temperature (extremely high temperature is required), molding under pressure, etc.; and considerably long time is necessary until the final product is obtained, and so on. The fabricating method is therefore very complicated. Moreover, the above-mentioned positive thermistor has the following defects in respect of its characteristics and performance. The first and most fatal defect is that it has extremely large voltage dependency. On account of this, when the resistance-temperature characteristics are measured at low voltage, its resistance value is found to vary about 3 figures, but when the characteristics are measured by impressing high voltage, the resistance value varies only 1 to 2 figures. From this fact, therefore, when a positive thermistor is to be used, some compensation should be given with respect to voltage dependency. Secondly, when electrode is connected to the positive thermistor, the portion to be rendered electrode-connection should be first nickel-plated so as to facilitate connection of the electrode to the thermistor element, because the element possesses strong selectivity toward electrode material, i.e., there are some materials suitable for electrode-connecting and the others are not suitable for the purpose; in this case, considerable numbers of metals for the electrode have been found unsuitable. Thirdly, although many attempts have been made to produce a positive thermistor of super miniature type, it is found extremely difficult to obtain a miniature type like a bead type, because a platinum wire or the like is used as the electrode wire at the time of sinter-treatment. Fourthly, the positive thermistor cannot be free from large fluctuations in characteristics owing to complexity of the manufacturing method or the mixing ratio of the components.

It has been known that the various thermistors as explained in the foregoing are widely used as thermometer, temperature-controller, automatic gain controller, automatic amplitude controller, anemometer, vacuum gauge, current meter, flow meter, gas analyzer, gas chromatography, detective elements for temperature compensation of electronics devices or heat prevention of various devices, contactless switching elements, time lag elements, and so forth. However, since these various thermistors exponentially and functionally change their resistance values in accordance with temperature variations shown as the curves 101 and 102 in FIG. 1 and such has a small temperature coefficient of resistance respectively, it is therefore impossible to let them work as contactless switches. Because of the above-mentioned characteristics, an apparatus which contains above-mentioned thermistors therein is needed to have an amplifier for amplifying the detected signals which correspond to resistance variation; almost all of the apparatuses constructed actually require amplifiers therefor. This is extremely disadvantageous from both economical and constructional standpoints of apparatus. Emergence of the positive thermistor has proved to be greatly helpful for removing these defects. This element has several times as high value as conventional thermistor in its temperature coefficient of resistance and has a characteristic such that its resistance value sharply rises when the temperature reaches a certain level, as illustrated by the curve 103 in FIG. 1. This results in extremely improved sensitivity and permitting easy control of the apparatus. Therefore, when an apparatus containing a positive thermistor is constructed, there is no need of installing additional circuits, such as amplifier circuit. It is also possible to utilize the element in its original form for a contactless switch or micro-temperature difference meter. On the contrary, however, a positive thermistor has a great defect, that is, it requires to compensate a large voltage dependency thereof. Further great disadvantage with this thermistor element is that, when voltage is being impressed on the thermistor element, a polarization phenomenon takes place within the element. In consequence, the range of application of the positive thermistor is inevitably restricted to a considerable extent, though it is far superior in temperature coefficient of resistance to the conventional thermistor.

It is therefore considered preferably, from the practical point of view, if such a resistor that is free from the aforedescribed drawbacks, sharply decreases its resistance value when the temperature reaches a certain level and has extremely large negative resistance-temperature coefficient.

Figure 2:
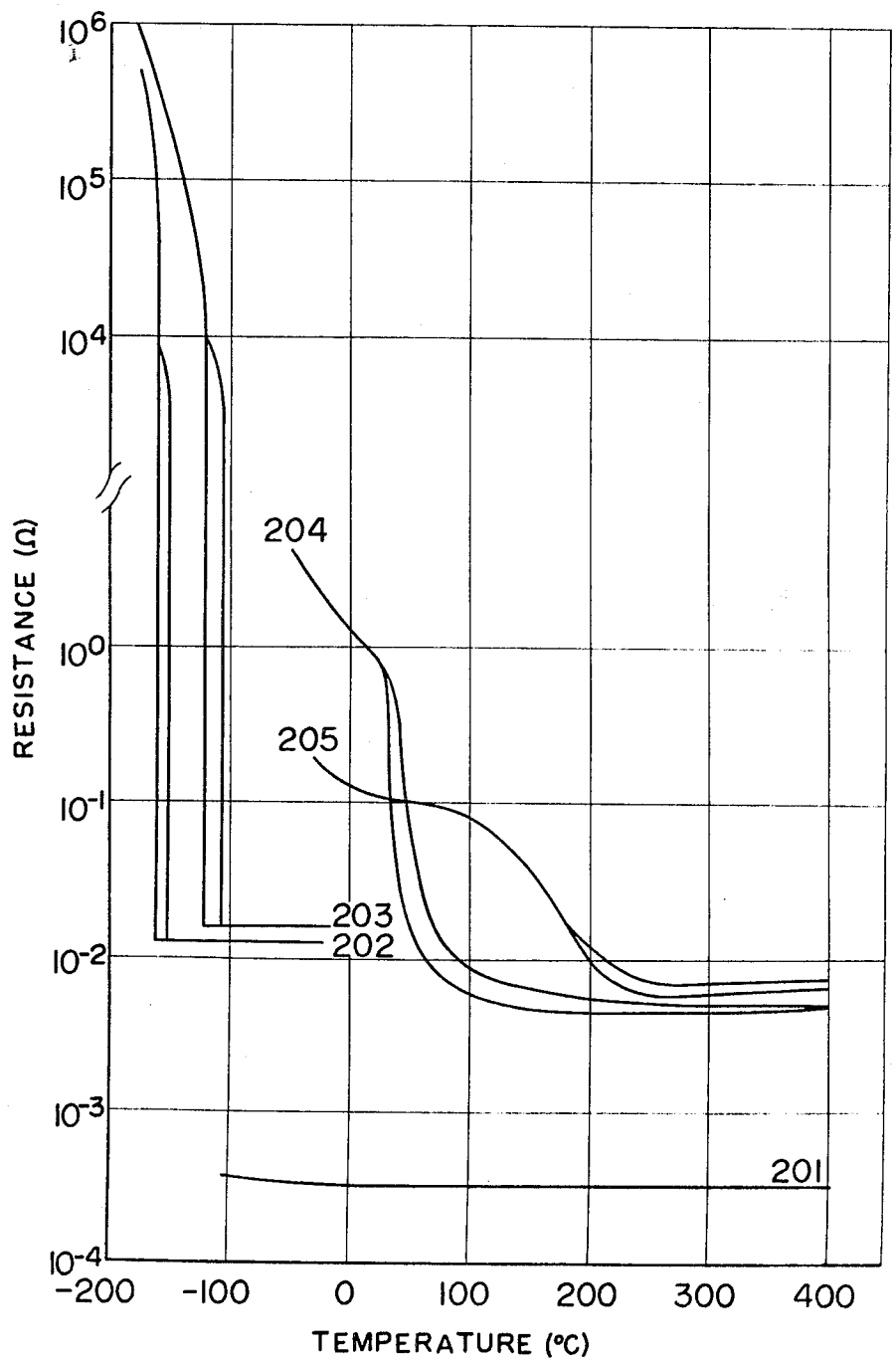
FIG. 2 is a diagram showing the resistance-temperature characteristic curves of titanium system oxides and vanadium system oxides.

For this kind of thermistors exhibiting such characteristics, there has been known $Ag_2S$—$Cu_2S$ system thermistors which abruptly change their electrical resistance at a temperature of from 95 to 170° C. and whose degree of abrupt change of resistance ranges from 2 to 4 figures. However, since these thermistors have ionic nature due to free sulphur contained in the resistors, polarization takes place when they are used in direct current; even if they are used in alternating current, they indicate insufficient stability. Also, it is observed that an electrode is corroded by contained sulphur or that free sulphur is deposited between the electrode and a resistor, etc., which adversely affect the electrical stability and the mechanical strength of the thermistor element. The thermistor containing Na, $NO_2$ or $KNO_3$ also shows considerably sharp decline in resistance at a temperature of 160° C. and 120° C., respectively. But, as they have also ionic nature as well as remarkably high water-solubility, their practical uses cannot be expected. It is therefore necessay that the semiconductors which are useful as parts of electronics devices be selected from those materials which show electric conduction by electron conduction only and have no ionic nature and unstable characteristics as above-described. Besides these thermistors, there are also thermistors of vanadium system oxides such as VO, $V_2O_3$ or $VO_2$ (which is also described as $V_2O_4$) or of titanium system oxides such as $Ti_2O_3$, as reported in a thesis by F. J. Morin in "Physical Review Letters," vol 3, No. 1 (July 1, 1959), pages 35–36. Electric characteristics of these thermistors are illustrated in FIG. 2, wherein the ordinate represents resistance ($\Omega$), while the abscissa represents temperature (° C.) The characteristics expressed by the curves in FIG. 2 can be listed as in the following Table 1.

TABLE 1

| Compound | Crystal structure | Temperature at which resistance changes (° C.) | | Temperature at which specific heat changes (° C.) | Temperature at which magnetic susceptibility changes (° C.) |
|---|---|---|---|---|---|
| | | Cooling characteristics | Heating characteristics | | |
| TiO | Rock salt | | | | |
| VO | do | −159 | −147 | | |
| $V_2O_3$ | Corundum | −120 | −108 | −104 | −105 |
| $VO_2$ | Monoclinic | 67–52 | 62–77 | 67 | 67 |
| $Ti_2O_3$ | Corundum | 227–127 | 127–227 | 200 | 117–127 |

Table 1 gives transition temperatures, namely the temperatures at which a sharp decline of electrical resistance takes place, which have actually been obtained by measuring physical characteristics of vanadium system oxides and titanium system oxides. Also, shown together in this table are crystal structure of respective vanadium oxides and titanium oxides and the temperatures at which specific heat and magnetic susceptibility of the oxides are shifted. In this table, the temperatures shown in the column the term "heating characteristics" means the temperatures at which the electrical resistance of each oxide undergoes sudden descent changes while the oxide compounds are heated, and the temperature in "cooling characteristics" means the temperatures at which electrical resistance of the resistance restored to its original value while the oxide is cooled gradually from the highly elevated temperature.

A comparison between Table 1 and FIG. 2 reveals the following facts: $TiO_2$, as is apparent from the curve 201, undergoes little change of its resistance value due to thermal variation; although VO, as shown by the curve 202, has an extremely large thermal resistance variation, the temperature at which electrical resistance of the oxide sharply declines is within the range of super low temperature about −150° C. Therefore it is almost useless in practical use; likewise, $V_2O_3$ shown by the curve 203 undergoes a sharp declining thermal resistance variation at a super low temperature of about −110° C. and therefore it is not practically used. $VO_2$, on the other hand, undergoes a sharp drop of resistance at a temperature of about 67° C., as seen from Table 1 and the curve 204 in FIG. 2. As mentioned previously, $VO_2$ can also seem to be represented by $V_2O_4$; this is because there is no unified rule of indicating this oxide compound. The phenomenon of sharp change in electric conductivity from electrically semiconductive state to metallic conductive state observed in VO, $V_2O_3$ or $VO_2$ at a specific temperature is essentially different from that of valence-exchange-type semiconductor thermistors such as ceramic thermistors, aforedescribed thermistors and glass thermistors. F. J. Marin analyzes that this phenomenon is caused by an antiferromagnetism-paramagnetism transition of $VO_2$, while N. F. Mott reasons that atomic distance of vanadium stays closer to the critical distance where transition of metal to nonmetal and vice versa take place, i.e., the distance where the atoms are supposed to have electric conductivity, and that, owing to rise of temperature, the said critical distance comes to have a larger value. J. B. Goodenough, on the other hand, indicates that, at above transition temperature (about 67° C. in the case of vanadium tetraoxide), there is possible overlapping of wave functions among vanadium atoms so the vanadium oxides exhibit metallic conduction, however, at a point below transition temperature, a pair of vanadium atoms respectively form a covalent bond so that they present semiconductive characteristics. That the above-mentioned vanadium tetraoxide abruptly changes its resistance value at a temperature of 67° C. or so is the most significant phenomenon. If this peculiar characteristic is stable, the oxide compound will possibly be put to actual uses immediately. On this premises, studies have been pursued on single crystals of $V_2O_4$, particularly, in respect of stability in electric characteristics and problems underlying fabrication thereof to see whether simple substance of vanadium tetraoxide ($V_2O_4$ or $VO_2$) can be industrially utilized for a thermistor. As the results, it was found that $V_2O_4$ had the following defects and therefore it was impracticable. As seen from the curve 204 in FIG. 2 and from Table 1, a hysteresis loop appears remarkably at the time of temperature increase and decrease passing through a specific temperature. Further, owing to its chemical property, $V_2O_4$ is easily oxidated so that its electrical characteristics readily deteriorates. Therefore, even if the phenomenon of abrupt change in resistance can be observed in the initial phase as shown in the curve 204 of FIG. 2, the degree of the sharp change of resistance diminishes with lapse of time. Moreover, reproducibility of its characteristics is very poor. There are various known methods for production of $V_2O_4$, any one of which proves it extremely difficult to produce single crystals of $V_2O_4$. For the methods of producing $V_2O_4$, there are several examples such as a method which comprises mixing definite quantities of $V_2O_3$ and $V_2O_5$ and subjecting the mixture to heat-treatment in vacuum at a temperature of above 700° C.; a method comprising heating tetravalent vanadium (IV) formate $V(HCOO)_4$ in an inert gas atmosphere at a temperature of 240° C. or above to cause thermal decomposition thereof; and a method which comprises adding an appropriate quantity of NaOH to a solution of vanadyl chloride $VOCl_2$, washing the produced precipitates in an inert atmosphere, drying the same at 100° C. thereby obtaining $2V_2O_4 \cdot 3H_2O$ and then converting the resultant product into anhydride. Any of these methods fails in satisfactorily producing single crystals of $V_2O_4$, and the produced $V_2O_4$ scarcely changes its resistance at most 2 figures. It may well be said in view of the above-said reasons that $V_2O_4$ alone is too poor in its utility to be put to practical uses.

As to $Ti_2O_3$, on the other hand, a hysteresis can be observed in the low temperature region as indicated by the curve 205 in FIG. 2. Its resistance variation in accordance with the temperature variation is as small as 1 figure, and the gradient of the said resistance change is slow, which suggests the poor utility of this compound. The fact that the temperature at which resistance variation takes place is about 160° C. adds also to its practical uselessness. The method of producing $Ti_2O_3$ is also complicated similar to the methods of $V_2O_4$, which is the further disadvantage.

Summing up the discussions which have been made hereinabove with respect to various kinds of thermistors and materials therefor, it may be said that there are as yet available no perfect thermistors which well meet our requirements.

The present invention intends to provide novel oxide semiconductors, namely, particular thermistors, which have eliminated all of the foregoing defects inherent to the conventional thermistors. Its objects and features may be summarized as follows:

(1) To provide such thermistor elements that possess extremely large temperature coefficient.

(2) To provide thermistor elements having the temperature at which electrical resistance undergoes sharp decline within a practical range.

(3) To provide thermistor elements in which value of electrical resistance can be selected optionally.

(4) To provide thermistor elements which are sensitive to temperature variations and yet have stable electric characteristics.

(5) To provide thermistor elements which are free from resistance variation with lapse of time which is one of the electric characteristics as has been observed in the conventional thermistors and have the least hysteresis of temperature.

(6) To provide thermistor elements whose shape and size can be selected optionally.

(7) To provide thermistor elements which are excellent in reproducibility of both elements and their electric characteristics.

(8) To provide thermistor elements which can be obtained without necessitating high skill in manufacture such as treatments under high temperature, high voltage, vacuum conditions, etc.

(9) To provide thermistor elements which can be fabricated with less working steps.

(10) To provide thermistor elements whose manufacturing conditions with respect to the manufacturing steps are comparatively easy ones.

The present invention relates to such particular thermistor provided to meet the above-mentioned requirements and the methods of fabrication thereof. Briefly stated, the particular thermistor herein provided comprises a sintered body consisting substantially of a plurality of fine crystalline particles of vanadium tetra-oxide $V_2O_4$ (or vanadium dioxide $VO_2$) and an oxide substance enclosing said fine crystalline particles, the amount of vanadium in the sintered body being not less than 25% in atomic ratio of elements other than oxygen included in the sintered body; and a plurality of electrode means connected to said sintered body.

The materials composing said oxide substance comprises, for example, phosphorus pentoxide ($P_2O_5$), barium oxide (BaO), strontium oxide (SrO), lead oxide (PbO), silver oxide ($Ag_2O$), lithium oxide ($Li_2O$), sodium oxide ($Na_2O$), potassium oxide ($K_2O$), beryllium oxide (BeO), magnesium oxide (MgO), calcium oxide (CaO), lanthanum trioxide ($La_2O_3$), cerium dioxide ($CeO_2$), zirconium dioxide ($ZrO_2$), zinc oxide (ZnO), cadmium oxide (CdO), boron trioxide ($B_2O_3$), aluminum oxide ($Al_2O_3$), silicon dioxide ($SiO_2$), tin dioxide ($SnO_2$), bismuth trioxide ($Bi_2O_3$), uranium trioxide ($UO_3$) or yttrium trioxide ($Y_2O_3$).

In a remarkable case the resistance value of one embodiment of this thermistor, when the ambient temperature reaches a specific range, i.e. 65°C.–70° C., sharply decreased by 3 figures and more. This means that its temperature coefficient of resistance is considerably large. When an ohm meter is connected to both terminals of this thermistor and the ambient temperature of the particular thermistor is varied, its thermal characteristics of the resistance value between both terminals of the said particular thermistor abruptly varies in the temaperature range of 65° C.–70° C., whereby a conductive condition of the thermistor changes from the semiconductive state to the conductive state and vice versa. Moreover, this particular thermistor has stable electric characteristics, which undergo little variation with lapse of time and have the least temperature hysteresis.

A known thermistor employing a large size of vanadium tetraoxide $V_2O_4$ monocrystal has a certain disadvantage that there appears a hysteresis loop in its temperature-resistance characteristics. The reason for this hysterisis phenomenon is that it takes a long time for the large size of $V_2O_4$ monocrystal to change its crystal structure from monoclinic system to tetragonal system around its specific abrupt-changing temperature range. Another disadvantage is that when the large size $V_2O_4$ monocrystal is subjected to repeated temperature cycles, cracks are produced in the crystal structure of $V_2O_4$ monocrystal and its electrical characteristics progressively deteriorate during its utilization.

This invention succeeded in substantially eliminating any hysterisis loops from its temperature-resistance characteristics by employment of fine crystalline particles $V_2O_4$ whose transition from one crystal structure to another will occur simultaneously and does not take such a long time as a large size monocrystal. Furthermore, in case of fine crystalline particles, stresses caused by temperature cycles does not accumulate in the structure and no crack will be produced in the $V_2O_4$ crystal, resulting in no variation in the electrical characteristics even after a long use.

Furthermore, according to this invention, fine crystalline particles of $V_2O_4$ are enclosed by the oxide substance and are shielded against the surrounding atmosphere. This shielding substance not only prevents crystalline particles of $V_2O_4$ from variation in the characteristics but also absorb effectively any stresses produced in the particles by temperature cycles so as to prevent any crystal deformation of the particles during use.

This extremely favorable thermistor can be prepared by the following methods; one method comprises; preparing a mixture of vanadium pentoxide $V_2O_5$ which is the principal constituent, with one or more properly selected oxides other than vanadium system oxides such as phosphorus pentoxide, said mixture including not less than 25% of oxidized penta-valent vanadium in atomic ratio of elements other than oxygen included in said mixture, pulverizing the mixture if necessary; firing the pulverized mixture in a reducing atmosphere at a first temperature lower than the melting point or the softening temperature of the mixture to convert the mean value of the oxygen/vanadium ratio of the vanadium oxide included in said mixture to a value below the true stoichiometric value of $V_2O_5$ but not less than that of $V_2O_4$; again pulverizing the mixture thus fired; molding into a desired shape such as bead type, disc type, rod type, block type, wire type or flake form; and firing (or sintering) the molded mixture in a non-oxidizing atmosphere at a second temperature more than 700° C. but not exceeding the melting point of the crystalline $V_2O_4$ for at least severela seconds.

Other methods comprises; first preparing $V_2O_4$ or vanadium oxide of which the mean value of oxygen/vanadium ratio is below the stoichiometric value of $V_2O_5$ but not less than that of $V_2O_4$; mixing said $V_2O_4$ or said vanadium oxide with other oxides; and sintering the mixture at said second temperature.

In the following, some examples of the methods of fabricating the particular thermistors according to the present invention are given with a view to explaining the present invention more concretely and in details.

EXAMPLE 1

Figures 3, 4:
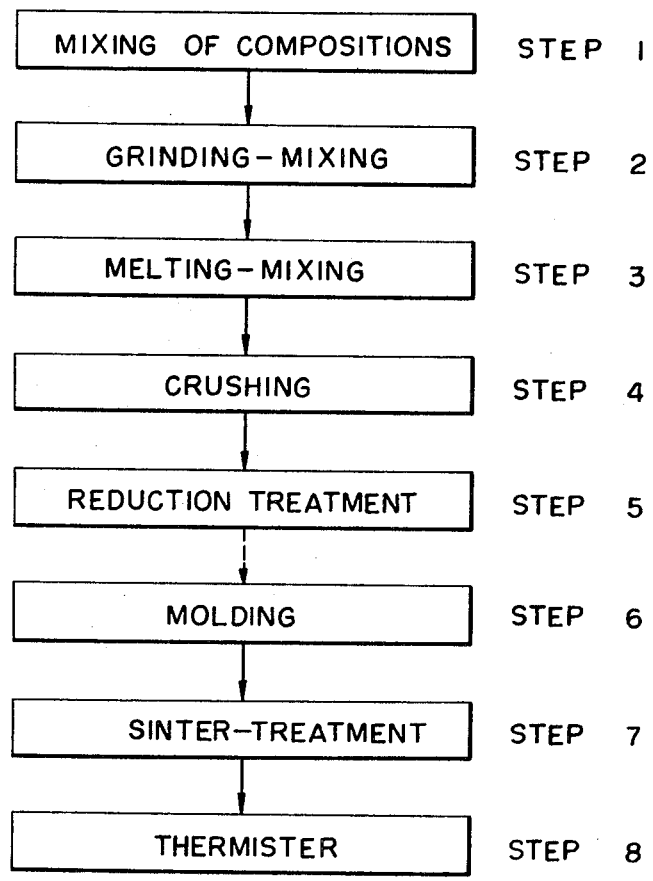
FIG. 3 is a partial vertical section of the known bead type thermistor.
FIG. 4 is a block diagram showing an example of the process of manufacturing oxide semiconductors (particular thermistors) of the present invention.

60 mol percent of $V_2O_5$ and such a quantity of strontium carbonate $SrCO_3$ as to become 40 mol percent of strontium oxide SrO when it is pyrolyzed were mixed and this mixture was initially sintered in air at a relatively low temperature such as 500° C. to prevent $SrCO_3$ from volatilizing and then heated at 1,000° C. for one hour in air, after which it was left to be cooled. Since the melting point of $V_2O_5$ is about 670° C., the heated mixture is molten to a vitreous state and solidified. The molten mixture became a complex oxide body, and contained $V_2O_5$, SrO, strontium vanadates and low valence vanadium oxide including vanadium tetra-oxide. This complex oxide body was again pulverized and then led into a furnace of reducing, wherein ammonia gas ($NH_3$) was being passed at a flow rate of 100 cc./min., to be subjected to a reduce treatment at 400° C. for 120 minutes, thereafter it was left in the $NH_3$ atmosphere to be cooled. Next, this mixture was molded into a desired shape such as, for example, a bead type. In this example, the above-mentioned mixture is made into a pasty by application of a binder such as water and then it is shaped into a bead 302 provided between both ends of lead wires 301a and 301b disposed in parallel, as shown in FIG. 3. The size of the bead prepared in this example is as follows; lead wires 301a and 301b are paladium wires of 0.08 mm.$\phi$, the distance between the two lead wires is 0.4 mm., and average diameter of the bead is 0.8 mm.$\phi$. Next, this bead type mixture is sintered in an inert atmosphere at a temperature of 1,000° C. for 3 minutes, thereafter it is left to be cooled. As a result of examination of the composition of the mixture thus obtained by means of X-ray diffraction, it has been observed that crystalline vanadium tetraoxides are included in the composition. The above process steps are illustrated in a block diagram in FIG. 4. The resistance-temperature characteristics of the particular thermistor according to this invention (oxide semiconductor) 303 thus obtained are illustrated by the curve 501 in FIG. 5. Its characteristics of variations in electric resistance value with lapse of time is shown by the curve 601 in FIG. 6. This curve 601 is based on data obtained as a result of the following forced life tests, that is, for the first ten days, heating and cooling treatments were repeated at a temperature of from 30° C. to 100° C. and vice versa at the rate of 12,000 times a day, and, for the second ten days, same heating-cooling treatments from 30° C. to 150° C. and vice versa were conducted at the rate of 7,000 times a day, whereby electric resistance value of the particular thermistor was measured at a proper time when its temperature was at 30° C.

EXAMPLE 2

90 mol percent of $V_2O_5$ and a quantity of diammonium hydrogen phosphate $(NH_4)_2HPO_4$, which is weighed so as to become 10 mol percent of phosphorus pentoxide $P_2O_5$ when it is pyrolyzed, were mixed and then pulverized. The prepared mixture was treated in accordance with the process steps in FIG. 4 under the same conditions as in Example 1 with the only exception that the time for reduce-treatment in the step 5 in FIG. 4, was shortened to 30 minutes, whereby a particular thermistor obtained. The resistance-temperature characteristics of the particular thermistors thus fabricated are as shown by the curve 502 in FIG. 5, and the characteristics of variations in resistance value with lapse of time are as indicated by the curve 701 in FIG. 7, which shows extremely stable condition. This resistance-variation characteristics in FIG. 7 were obtained in the following manner. Namely, the particular thermistor was heated at a temperature of 100° C., then, at a proper period, it was cooled down to 40° C., at which resistance value of said thermistor was measured.

EXAMPLE 3

66.7 mol percent of $V_2O_5$ and a quantity of barium carbonate $BaCO_3$, which is weighed so as to become 33.3 mol percent of barium oxide BaO when it is pyrolyzed, are mixed and pulverized. The mixture was treated under the same conditions as in Example 1 in accordance with the block diagram shown in FIG. 4 to obtain a particular thermistor. The resistance-temperature characteristics thereof are as shown by the curve 503 in FIG. 5, and its characteristics of variations in resistance with lapse of time are as shown by the curve 702 in FIG. 7, which are stable.

EXAMPLE 4

66.7 mol percent of $V_2O_5$ and 33.3 mol percent lead oxide PbO were mixed and pulverized, thereafter the mixture was treated under the same conditions as in Example 1 in accordance with the block diagram of FIG. 4. The particular thermistor thus obtained had the resistance-temperature characteristics as shown by the curve 504 in FIG. 5, and its resistance variation characteristics are as indicated by the curve 703 in FIG. 7.

EXAMPLE 5

70 mol percent of $V_2O_5$ and 30 mol percent of silver oxide $Ag_2O$ were mixed and pulverized, then the mixture was treated under the same conditions as in Example 1 in accordance with the block diagram of FIG. 4, whereby a desired particular thermistor was obtained. Its resistance-temperature characteristics are as shown by the curve 505 in FIG. 5 and their resistance variation characteristics are indicated by the curve 704 in FIG. 7.

EXAMPLE 6

60 mol percent of $V_2O_5$, a quantity of $SrCO_3$, which is weighed so as to become 30 mol percent of SrO when it is supposedly pyrolyzed into SrO, and a quantity of $$(NH_4)_2HPO_4$$

which is weighed so as to become 10 mol percent of $P_2O_5$ when it is chemically reacted into $P_2O_5$, were mixed and pulverized. The mixture was then treated under the same conditions as in Example 1 in accordance with the block diagram shown in FIG. 4, with the exception that reducing time at step 5 of FIG. 4 was shortened to 60 minutes from 120 minutes. Thus, a particular thermistor having resistance-temperature characteristics as shown by the curve 801 in FIG. 8 and stable resistance-variation characteristics as illustrated by the curve 602 in FIG. 6 was obtained.

EXAMPLE 7

53.8 mol percent of $V_2O_5$, a quantity of $SrCO_3$, which is weighed so as to become 30.8 mol percent of SrO when it is supposedly pyrolyzed into SrO, and 15.4 mol percent of silicon dioxide $SiO_2$ were mixed and pulverized; the mixture was then treated under the same conditions as in Example 1 with the exception that reducing time at step 5 of FIG. 4 was shortened to 60 minutes. In this consequence, a desired particular thermistor was obtained, the resistance-temperature characteristics of which being as shown by the curve 802 in FIG. 8, and the resistance-variation characteristics being as indicated by the curve 705 in FIG. 7.

EXAMPLE 8

58.4 mol percent of $V_2O_5$, 8.3 mol percent of $P_2O_5$ and a quantity of $BaCO_3$ which is weighed so as to become 33.3 mol percent of BaO when it is supposedly pyrolyzed into BaO were mixed and pulverized. The mixture was then treated under the same conditions as in Example 2 in accordance with the block diagram of FIG. 4. As a result, a desired particular thermistor was obtained. The resistance-temperature characteristics of this thermistor are as represented by the curve 804 in FIG. 8, and the resistance-variation characteristics are as shown by the curve 706 in FIG. 7.

EXAMPLE 9

58.3 mol percent of $V_2O_5$, 8.3 mol percent of $P_2O_5$, 16.7 mol percent of PbO and a quantity of $SrCO_3$, which is weighed so as to become 16.7 mol percent of SrO when it is supposedly pyrolyzed into SrO, were mixed and pulverized. The prepared mixture was then treated under the same conditions as in Example 1 after the block diagram of FIG. 4, which resulted in a desired particular thermistor. The resistance-temperature characteristics thereof are as shown by the curve 805 in FIG. 8, while its resistance-variation characteristics are stable as indicated by the curve 707 in FIG. 7.

EXAMPLE 10

A single composition of $V_2O_5$ was treated under the same conditions as in Example 1 following the block diagram of FIG. 4, from which a particular oxide thermistor was obtained. The resistance-temperature characteristics thereof are as illustrated by the curve 506 in FIG. 5 and the curve 806 in FIG. 8 (the curve 806 in FIG. 8 having the same characteristics as the curve 506 in FIG. 5). From these drawings, it is apparent that the thermistor has a relatively good resistance-temperature characteristics, however its resistance variation characteristics are unstable as shown by the curve 603 in FIG. 6.

EXAMPLE 11

The materials used in foregoing Examples 1–10 were treated in accordance with the steps 1, 2 and 3 in the block diagram of FIG. 4 to form molten mixture. This mixture was shaped into a thin film or wire, when it was cooled. This film- or wire-shaped complex oxides substance was at first fired in a reducing atmosphere for several tens minutes at about 400° C. and continuously sintered at 1000° C. for 3 minutes in a reducing atmosphere mentioned in Examples 1–10, and then is was left to be cooled. Thus reduced and sintered film or wire was cut into small pieces to which lead wires were connected, whereby a desired particular thermistor was produced. On measurement of the resistance-temperature characteristics and resistance-variation characteristics of the respective particular thermistor thus obtained, it has been provided that each has the similar characteristics to those of the respective thermistors obtained in Examples 1–10.

EXAMPLE 12

The component materials used in Examples 1–10 were treated under the same conditions as said examples, in compliance with the steps 1, 2, 3, 4 and 5 in the block diagram of FIG. 4. At the step 6, the pulverized complex oxides substance was shaped into disc type, rod type, block type, plate type or pipe type. The shaped material was sintered under the same conditions as in the foregoing Examples 1–10 for the respective compositions of the materials. Thereafter, lead wires were connected to this material to obtain finally desired particular thermistors. The result thermistors fabricated in this way proved to have similar resistance-temperature characteristics and resistance-variation characteristics to those of the thermistors obtained in Examples 1–10.

Figure 5:
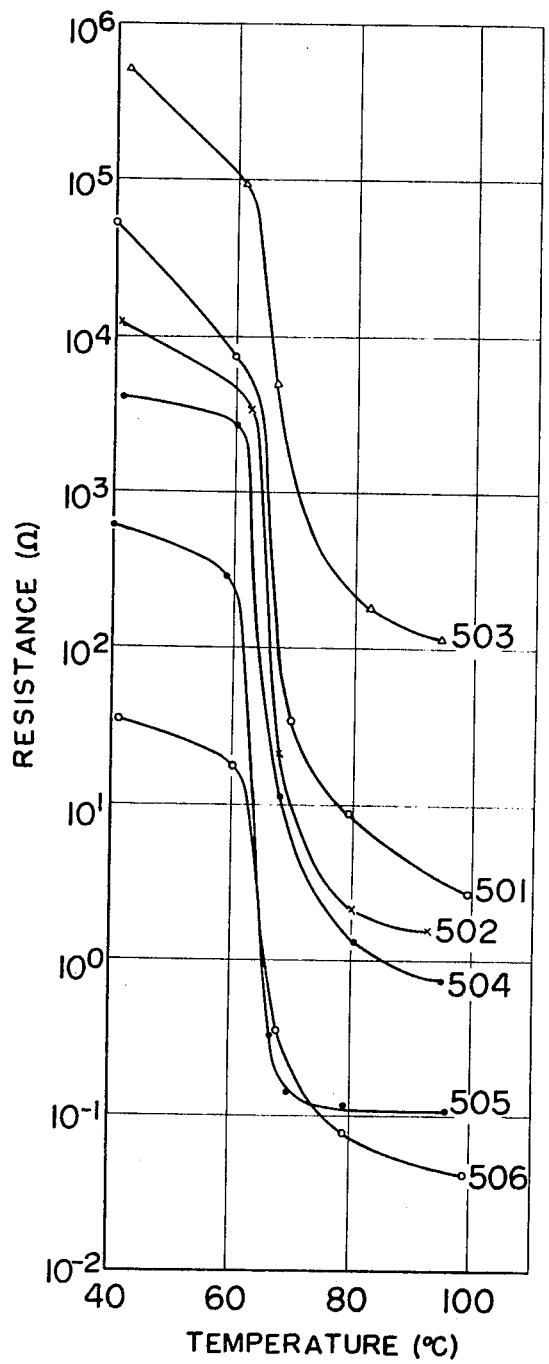
Figure 6:
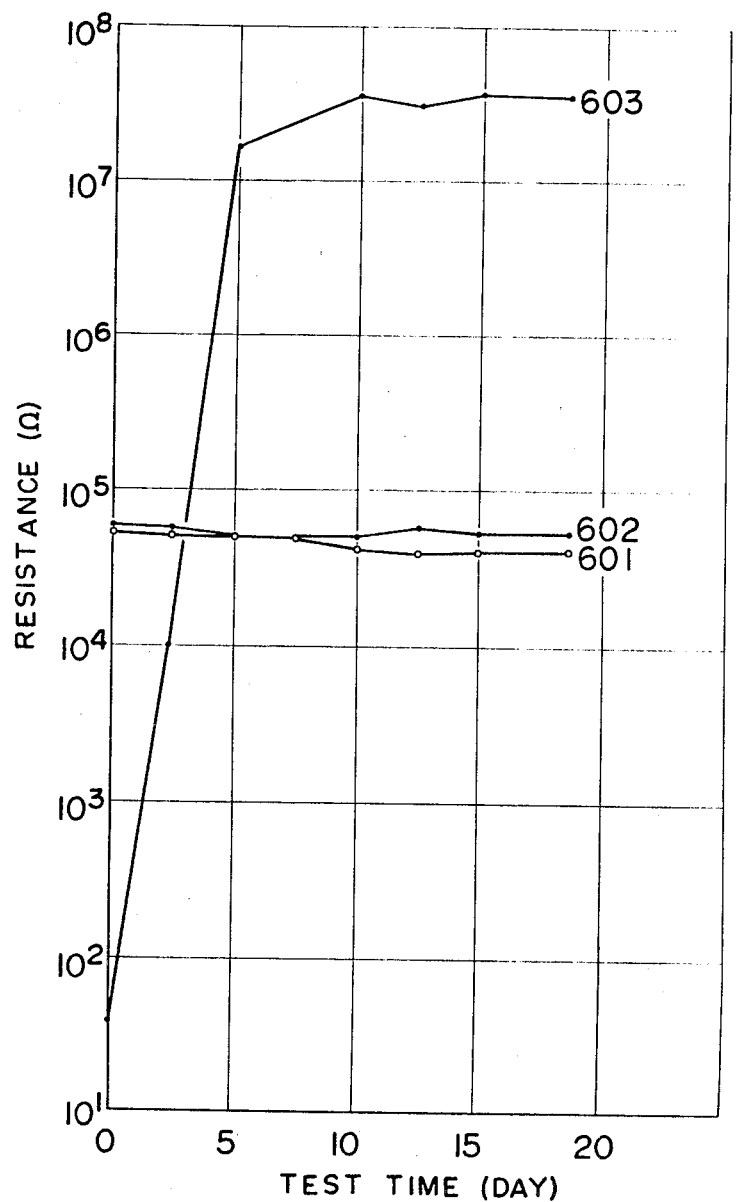
FIGS. 6, 7, 38, 97–99 and 101 are respectively the diagrams showing the characteristic curves of resistance-variation with lapse of time in the oxide semiconductors of the present invention.
Figure 7:
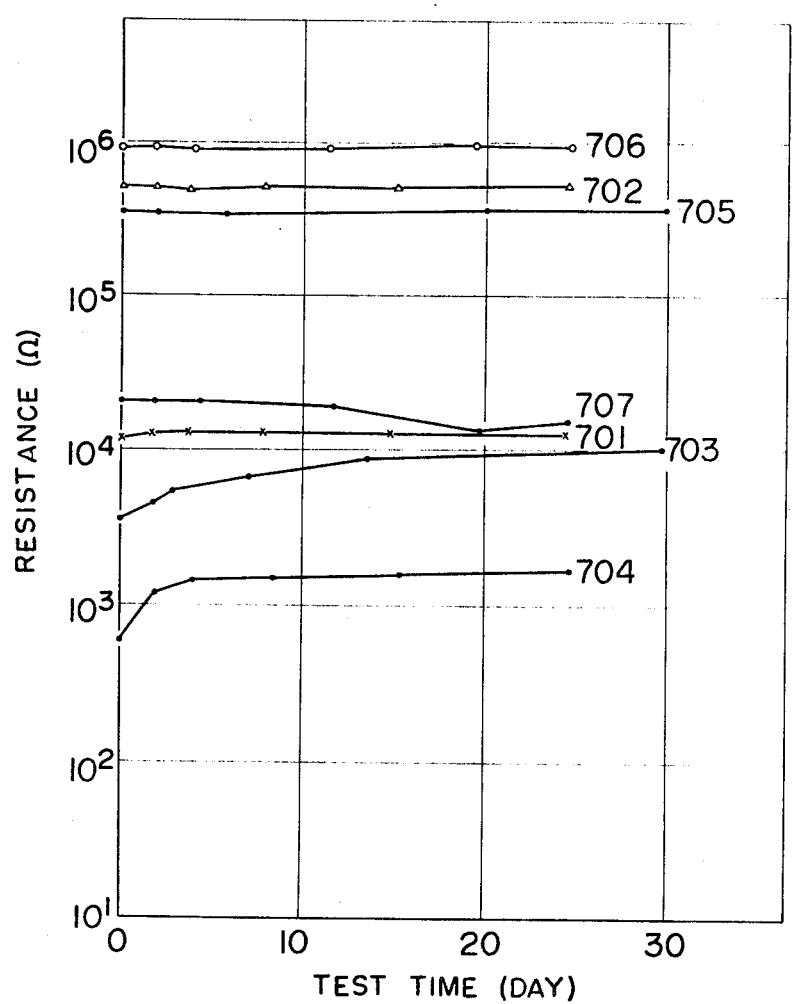
Figure 8:
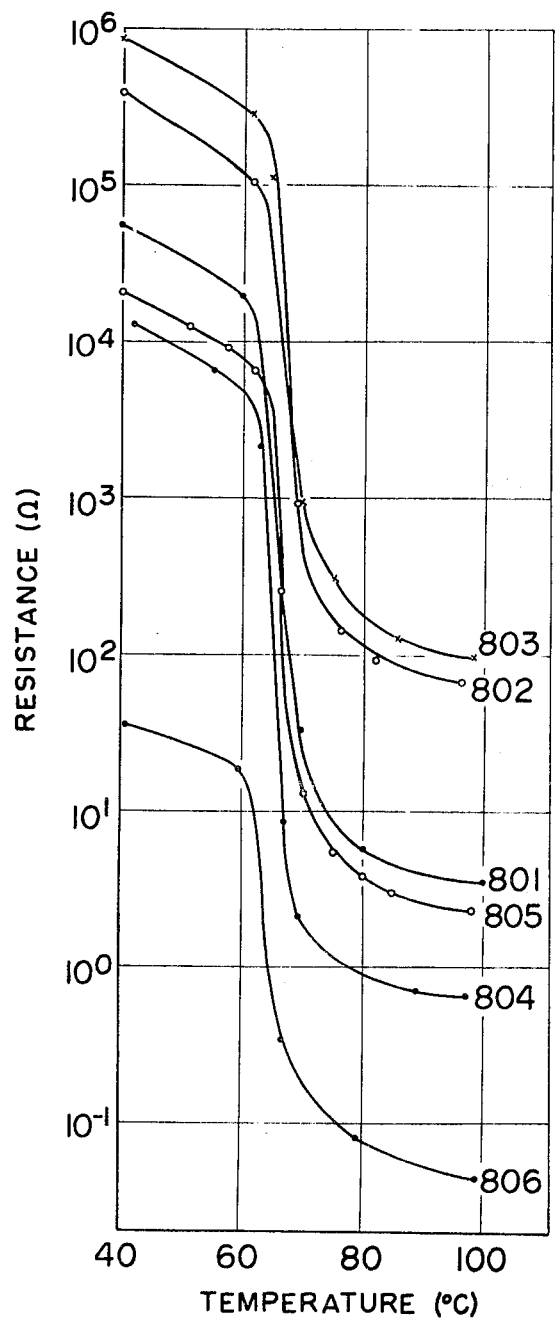

To sum up what has been described in the foregoing examples, the present invention is intended to obtain particular thermistors by mixing $V_2O_5$ as the principal component with other oxides, heat-treating the mixtures in a reducing atmosphere, then molding the heat-treated mixture into desired shapes and finally sintering the shaped bodies. Alternatively, the mixture may first be shaped into desired forms and then the shaped bodies are subjected to reduction treatment in a reducing atmosphere and finally to sintering treatment. Some part or most part in many cases of $V_2O_5$ is converted into crystalline particles of vanadium tetraoxide $V_2O_4$, which is the principal component of the particular thermistors, in the finished products, and the other oxides remain the same formulae or are converted into vanadates thereof. These particular thermistors have their own unique resistance-temperature characteristics as shown in FIGS. 5 and 8. Namely, the thermistors undergo sharply decrease in resistance at the temperature range of from 65° C. to 70° C., and the present thermistors are found to have electric semiconductivity at the temperature below said range, while they possess electric conductivity above said range. In other words, they undergo abrupt change in their electric characteristics from a semiconductive state to a conductive state or vice versa, as the temperature rises above or falls below the above-mentioned temperature range. Also, the characteristics of resistance-variation with lapse of time of the present thermistors are shown in FIGS. 6 and 7, which reveal that the thermistors fabricated by the above-mentioned examples except Example 10 in which a single composition of $V_2O_5$ is used for the thermistor are extremely stable.

Now, the considerations will be given hereinbelow to the causes of the above-mentioned two prominent effects that the present particular thermistors undergo a sharp decline in the resistance value at the temperature range of 65° C.–70° C. and that the resistance-variation characteristics with lapse of time are remarkably stabilized. It is supposed that the following factors are the main reasons:

First, regarding the phenomenon of abrupt change in the resistance value, this pehnomenon is considered to be dependent on crystalline particles of vanadium tetraoxide $V_2O_4$ in view of the facts that the temperature at which the resistance value of the particular thermistor undergoes sharp decline is very close to that of $V_2O_4$ monocrystal.

Figure 39:
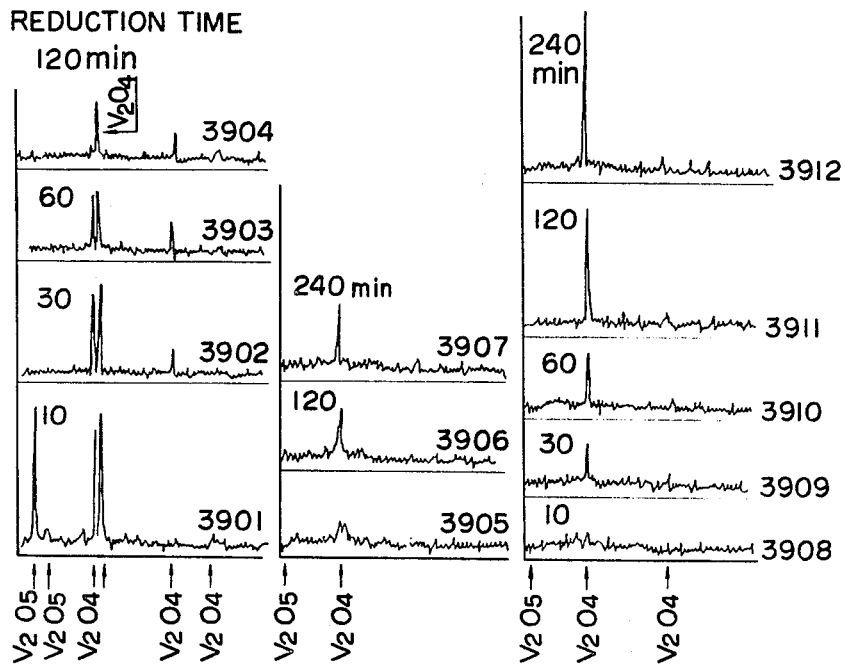
FIG. 39 shows the curves of X-ray diffraction of a finished oxide semiconductor according to the present invention.

In fact, when finished bodies of the particular thermistors are examined by means of X-ray diffraction, conspicuous peaks of $V_2O_4$ crystals are observed from the curves 3901–3912 of FIG. 39.

By the way it is known that the $V_2O_4$ crystal takes the rutile structure belonging to the monoclinic system at the temperature below the range of 65° C.–70° C., and is transformed into a rutile structure belonging to the tetragonal system at the temperature higher than the said temperature range, in conjunction with which it undergoes transformation from an electrically semiconductive state to a metal transition state owing to its electro-conductive mechanism as already mentioned above.

FIG. 39 shows the diffraction curves observed by the X-ray diffraction test. In this graph, the curves 3901–4 are the test results of a particular thermistor of which the starting material is of $V_2O_5$ single composition, the curves 3905–7 are those of a particular thermistor of which the starting materials are of 75 mol percent of $V_2O_5$ and 25 mol percent of SrO and the curves 3908–3912 are those of a specific thermistor of which the starting materials are of 60 mol percent of $V_2O_5$, 30 mol percent of SrO and 10 mol percent of $P_2O_5$. The curves 3901 to 3904, 3905 to 3907 and 3908 to 3912, respectively, indicate the compositions of respective particular thermistors produced at different reducing times of 10, 30, 60, 120 or 240 minutes.

In regard to the second prominent effect that extremely good stability of resistance-variation characteristics with lapse of time can be observed in the present particular thermistors other than those prepared from a single composition of $V_2O_5$, it is reasoned as follows: first, in the particular thermistor of a complex system, as a result of applying reducing and sintering treatments to the materials, oxides which are mixed with $V_2O_5$ remain within the particular thermistor in its original compostion or in various other forms of compounds, such as vanadate, and enclose the crystalline particles of $V_2O_4$ separated from other oxides as a result of sintering treatment, thereby isolating and shielding the crystalline particles from the external atmosphere; and, second, the oxides protect the crystalline particles of $V_2O_4$ which is easily oxidized from oxygen atoms coming in from outside and further, when these materials are sintered, the other oxides than $V_2O_4$ act as a crystallizer or a crystallizing agent, and a plurality of crystalline particles of $V_2O_4$ are separated or precipitated from the other oxides.

The reasons why the resistance-variation characteristics with lapse of time of a thermistor of which the starting material is of a single composition of $V_2O_5$ are inferior should be attributable to the fact that $V_2O_5$ remaining in-reduced cannot effectively isolate and shut off $V_2O_4$ crystals from the external atmosphere and permit easy occurrence of reactions such as oxidation, because of the compound having nonstoichiometric compositions.

From the above descriptions, it can be well understood that in the case producing the particular thermistor of this invention by using the material including principally $V_2O_5$ therein as a starting material, the reducing treatment of said material is mainly necessary for preparing $V_2O_4$ from $V_2O_5$, on the other hand the sinter treatment is mainly necessary for creating crystalline $V_2O_4$, which provides unique electric resistance characteristics as well as stabilizing the same.

In the above description, it is stated that the various oxides remain within the particular thermistors not only as compounds of various forms but also a single substance thereof. Therefore these oxides work to separate crystalline $V_2O_4$ from other substances by sintering a reduced product. In other words, these oxides assist to grow crystalline particules of $V_2O_4$ which is the important material for the particular thermistors.

Figure 40:
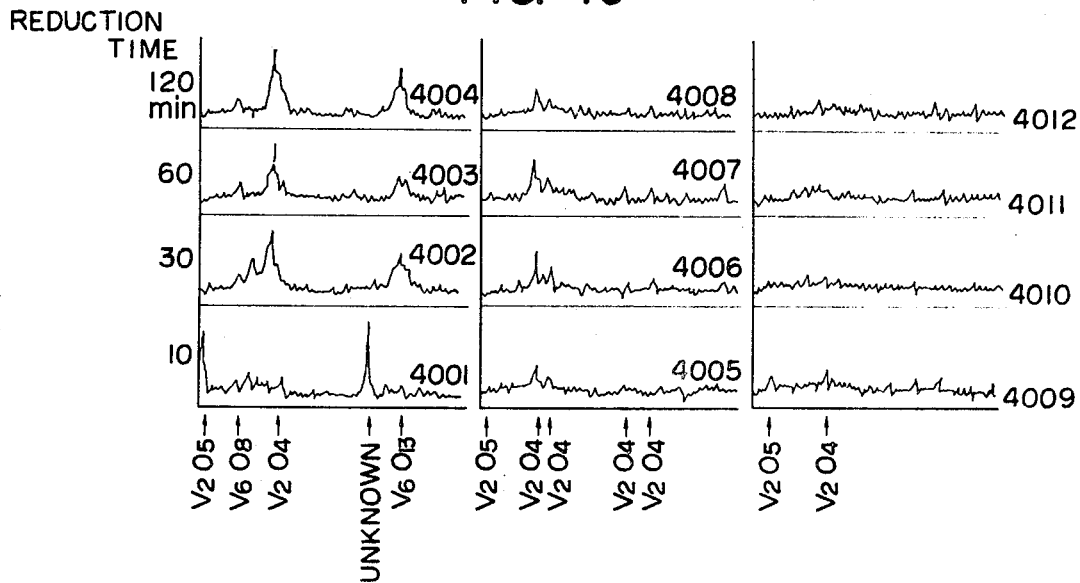
FIG. 40 shows the curves of X-ray diffraction of a half-finished oxide semiconductor according to the present invention.

From various reductions of a mixture of $V_2O_5$ and other oxides no identical peak of $V_2O_4$ has been observed as shown in FIG. 40. However, when the reduced substances are sintered in nitrogen ($N_2$) gas at 1,000° C., they present conspicuous peaks of $V_2O_4$ as shown in FIG. 39. FIG. 40 shows diffraction curves as observed through X-ray diffractions, wherein curves 4001–4004 are respectively the diffraction curves of $V_2O_5$ single composition which was reduced with different reducing time the curves 4005–4008 are respectively the diffraction curves of a mixture consisting of 60 mol percent $V_2O_5$ and 40 mol percent SrO which was reduced at different reducing times; and the curves 4009–4012 are respectively the diffraction curves of a mixture consisting of 60 mol percent $V_2O_5$, 30 mol percent SrO and 10 mol percent $P_2O_5$ which was reduced at different reducing time.

It may be easily inferred that the above-mentioned results, along with the effects of stabilizing electric characteristics of the thermistor, will be one of the factors which contribute to enlargement of the degree of the abrupt change of resistance.

Anyway, it will be safe to say that the certain oxides which are present within the particular thermistors of the present invention contribute much to creation of its unique resistance-temperature characteristics, that the said oxides are indispensable materials for stabilization of electric characteristics of the thermistor and that $V_2O_5$ must be sufficiently converted into $V_2O_4$ crystals which is the principal constituent of the thermistor by means of reducing and sintering treatments. In short, an essential requirement is the presence of such crystalline vanadium tetraoxide $V_2O_4$ as having temperature coefficient of negative resistance wherein electric resistance undergoes sharp decline at a specific temperature range. Then, questions arise as to how much $V_2O_5$ should be converted to vanadium tetraoxide $V_2O_4$ crystals, which undergo abrupt change of resistance, and what is the optimum mixing ratio to the other oxides.

Keeping the above matters in mind, the conditions of reducing treatment of the present invention are discussed in details hereinbelow.

It is usually experienced that, in a chemical reaction, slight difference in compositional ratio or treating conditions often produces remarkable difference in the results obtained. In the following, there is presented a result of experiments conducted to find out the optimum conditions of reducing treatment for a mixture consisting of $V_2O_5$ and the certain oxides by changing the reducing conditions, while the mixing ratio is kept constant.

Figure 9:
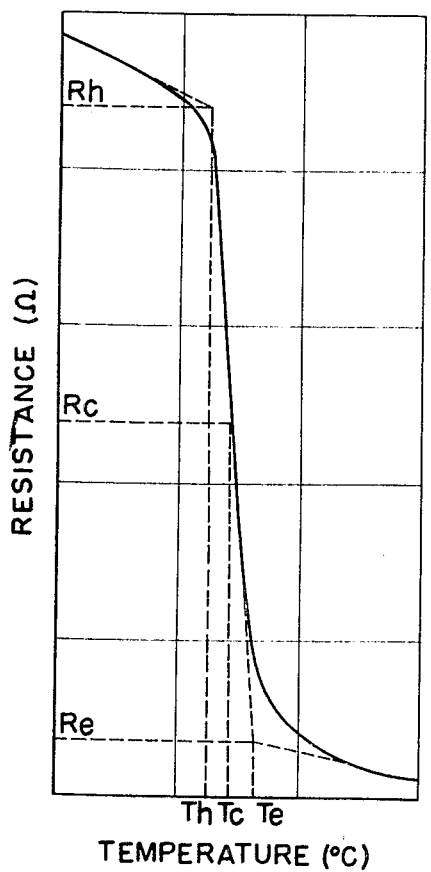
FIG. 9 is a schematic diagram illustrating the electrical characteristics of the oxide semiconductors of the present invention.

In order to discriminate quality of the present particular thermistors, it will be preferable to compare the degree of abrupt change of resistance in resistance-temperature characteristics as mentioned in the foregoing. For this purpose, a discussion should be proceeded in reference to the resistance-temperature characteristic curve in FIG. 9, wherein the ordinate represents electric resistance and the abscissa represents temperature of the particular thermistor. Furthermore, in this graph, the resistance-temperature characteristic curve is imaginally linearized as illustrated by dotted lines, wherein R$h$ represents the resistance value at which abrupt change in resistance value is about to take place with temperature increase, R$e$ represents the resistance value just after the abrupt change is completed and R$c$ represents the resistance value at the middle point where the abrupt change is progressing. T$h$, T$e$ and T$c$ represent the temperatures corresponding to R$h$, R$e$ and R$c$. In this electric characteristics, notation is expressed by the following formulae:

$$Tc = \frac{Th + Te}{2} \qquad \Psi = \log_{10}\left(\frac{Rh}{Re}\right)$$

The present inventors designate T$c$ as "abrupt-changing resistance temperature" and $\psi$ as "abrupt-changing resistance degree."

Figure 10:
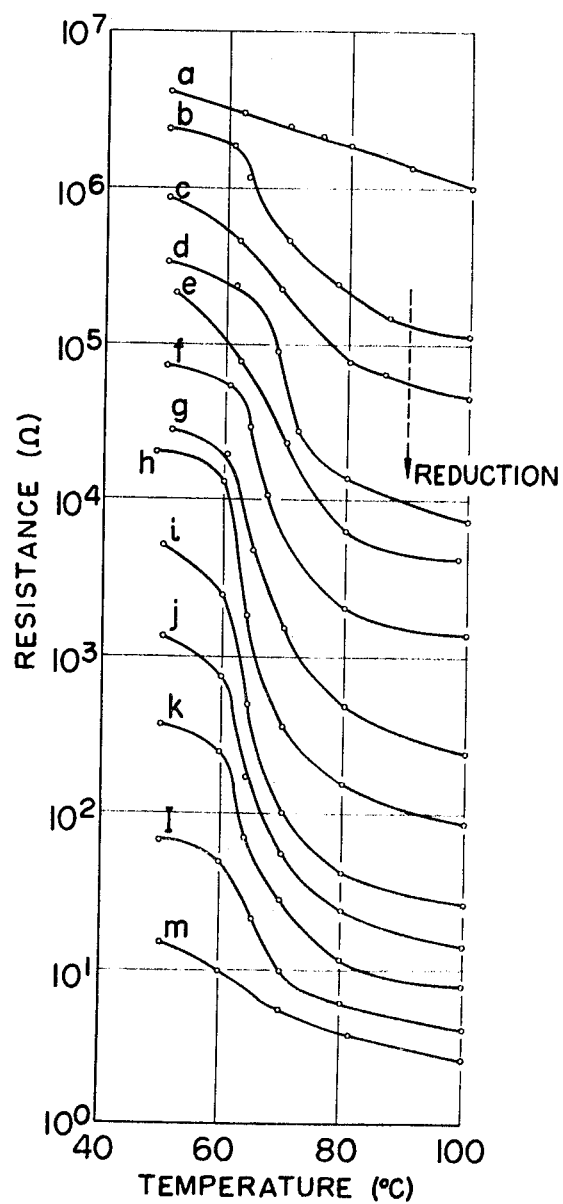
FIG. 10 is a diagram showing the tendency of variation in the resistance-temperature characteristics in accordance with the change of the reduce-treating conditions of the present oxide semiconductors.

From the preceding relationship, it can be easily understood that, in order to increase abrupt-changing resistance degree $\psi$, the amount of resistance change at a specific temperature range should be enlarged. It is one of the objects of the present invention to enlarge $\psi$ and the thermistors having great value of $\psi$, are desirable for various purposes. In this connection, it is mentioned that $\psi$ of the curves 101 and 102 in FIG. 1 is zero. In view of the above statement, the present inventors conducted experiments and succeeded in remarkably improving $\psi$ by varying the conditions of reducing treatment. One example thereof is given in FIG. 10, which shows the resistance-temperature characteristics of particular thermistors produced from three components of

$$V_2O_5 - P_2O_5 - BaO$$

system. The data in the figure were obtained as a result of changing the reduce-treatment temperature and keeping constant the reduce-treatment time about 350° C. and reducing gas composition (firing the mixtures in the blaze of burning city gas, the composition of the city gas being 10.1% of $CO_2$, 5.1% of heavy hydrocarbon, 2.7% of $O_2$, 9.5% of CO, 28.1% of $H_2$, 14.6% of $CH_4$ and 29.9% of $N_2$ in volume ratio); all of these three constitute variable factors in the reducing atmosphere. Thus the curves $a$ through $m$ were obtained by gradually raising the reduce-treatment temperature. The temperature was gradually raised from about 300° C. to 450° C. From FIG. 10, it becomes known that the abrupt-changing resistance degree $\psi$ is great within the range defined by the curves $f$ through $k$. This means that $\psi$ becomes also variable by changing conditions for the reduce-treatment such as reduce-treating time or composition of reducing gas.

Figure 11:
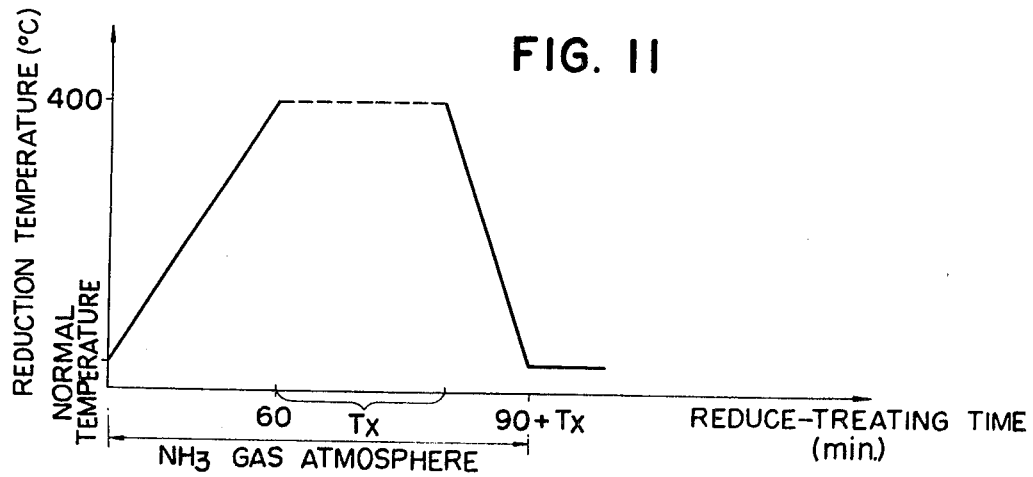
FIG. 11 is a schematic diagram illustrating the temperature-time relationship observed in the reduce-treating process which is one of the processes in fabricating the present oxide semiconductors.
Figure 12:
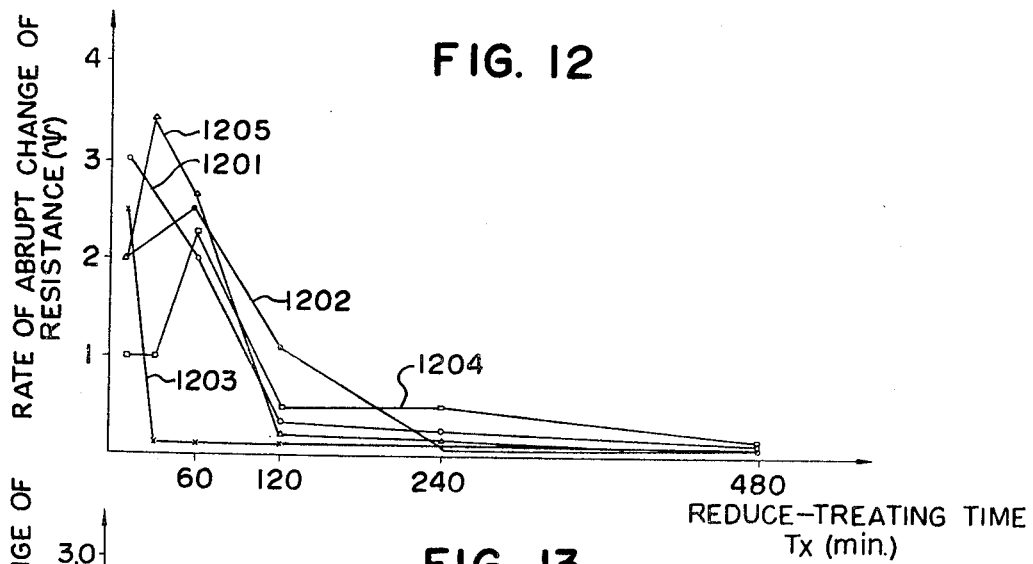
FIGS. 12–17 are the curves showing the electrical characteristics, particularly the degree of abrupt change in resistance $\psi$, in case the reduce-treating conditions of the present oxide semiconductors are varied.
Figure 13:
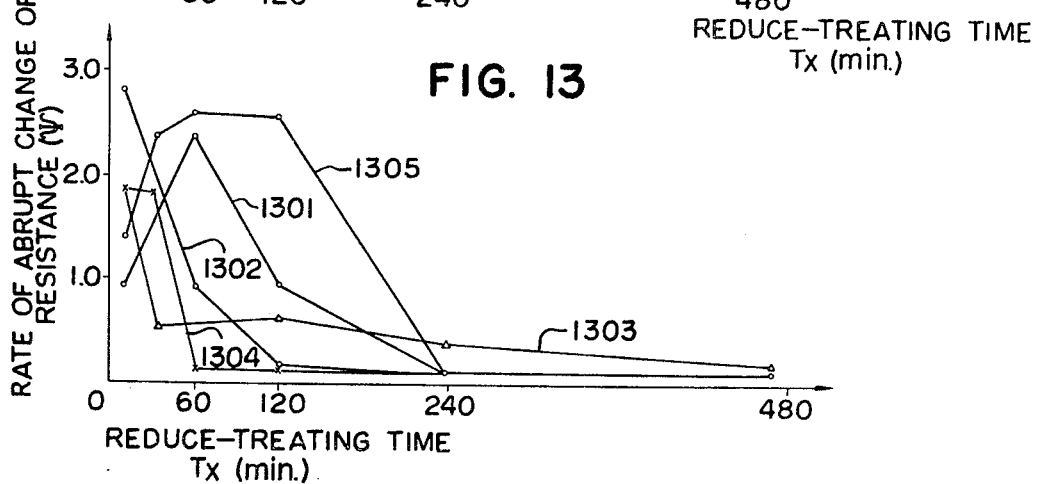
Figure 14:
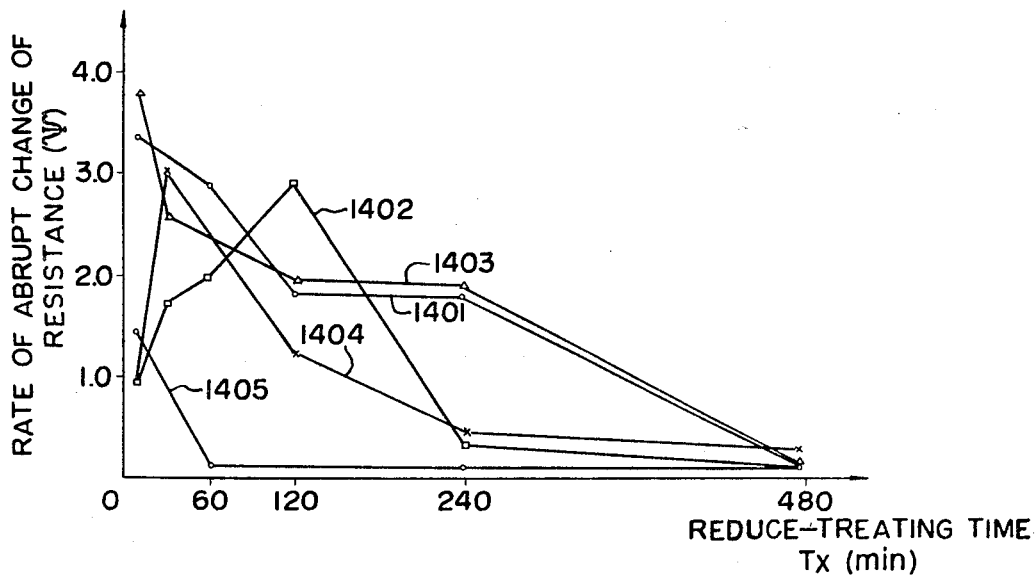
Figure 15:
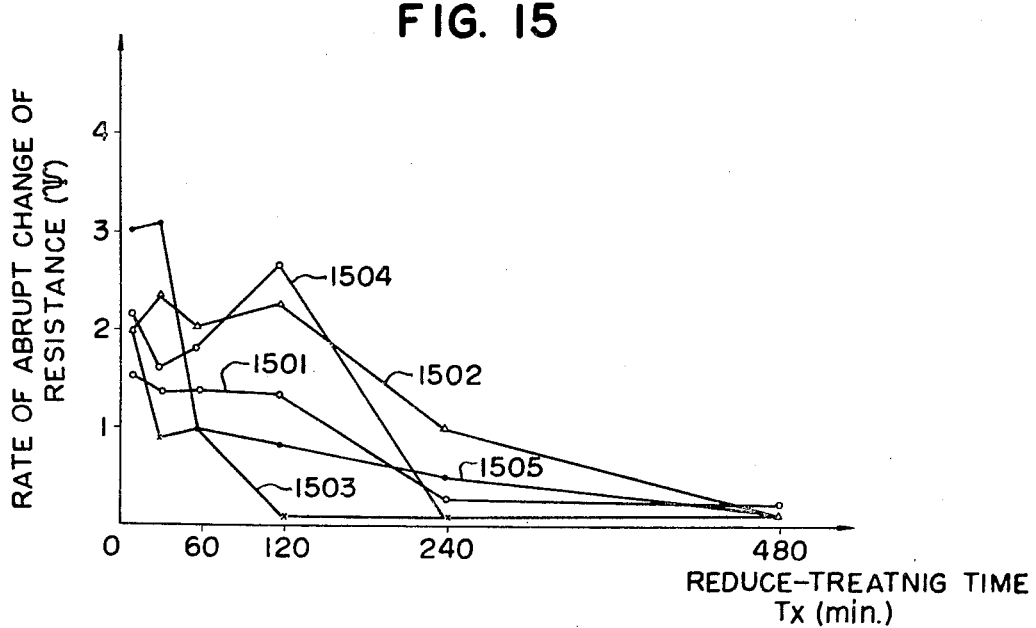
Figure 16:
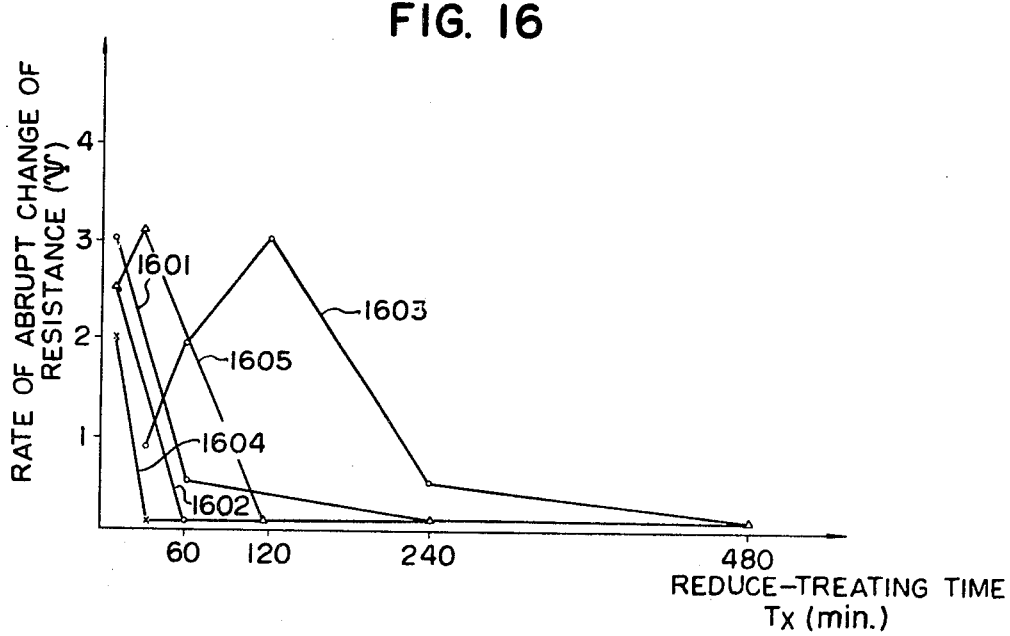
Figure 17:
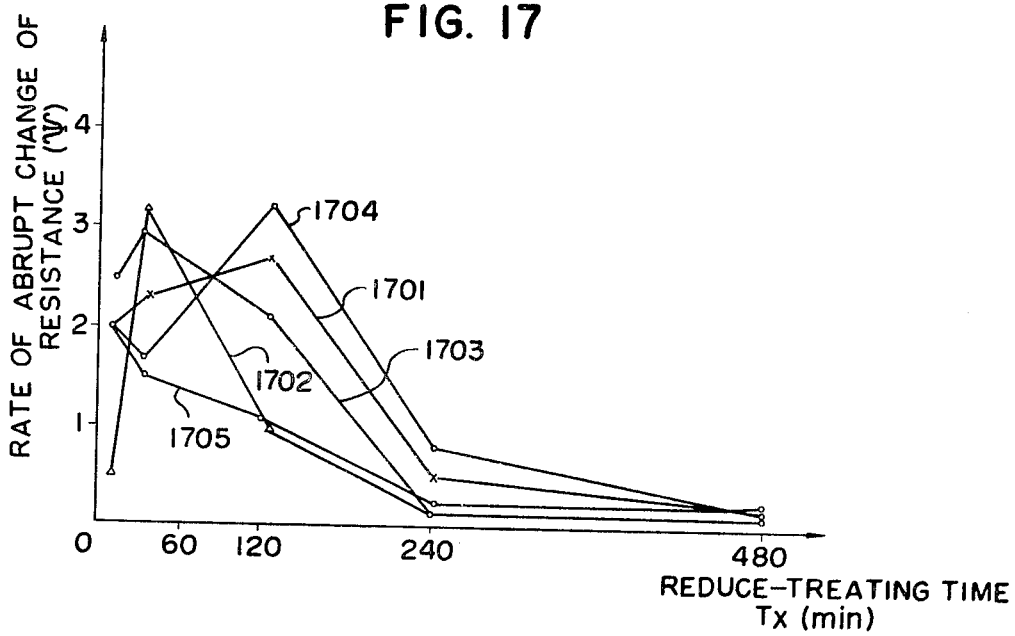

In the light of the above, the present inventors have examined variations in $\psi$ of the present particular thermistors of various compositions fabricated by the same conditions as set forth in Example 1 with only exception that the reduce-treatment time in the reducing conditions is subjected to changes. It should be noted here that, in the present method for fabricating the particular thermistors, the powder mixture to be reduced is placed in this atmosphere of ammonia gas, while it is located in the reduction furnace. The reduction furnace employed in the experiments for the present invention requires an ability within about 60 minutes to raise its temperature level from the normal room temperature to 400° C. at which said powder mixture to be reduced is subjected to the reduce-treatment. Furthermore, it is required to decrease the furnace temperature for about 30 minutes until it becomes cool and the reduced mixture can be taken out after completion of the reducing treatment. Therefore, when the reduce-treatment time is assumed T$x$, the powder mixture to be reduced is to be exposed to the ammonia gas for a time period of 90 min.+Tx. A schematic graphical representation showing this reduce-treatment is given in FIG. 11. The relationship between the abrupt-changing resistance degree and the reduce-treatment time of a particular thermistor obtained by the above-mentioned method is illustrated in FIGS. 12–17, and identification of the curves illustrated in the graphs and the compositions of the corresponding thermistors is presented in the following Table 2. In the same table, compositions of the thermistors are indicated in the form of atomic ratio of the elements with oxygen atoms removed therefrom. For example V9P1 designates a particular thermistor obtained by mixing $V_2O_5$ and $P_2O_5$ at the ratio of 90 mol percent: 10 mol percent, or V6Sr4 designates a particular thermistor obtained by mixing $V_2O_5$ and SrO at the ratio of 43 mol percent: 57 mol percent (i.e. 3:4 in mol percent).

TABLE 2

| Composition | Curve | Composition | Curve |
|---|---|---|---|
| V9:P1 | 1201 | V7:P1:Al2 | 1501 |
| V7.5:P2.5 | 1202 | V5:P2:Na3 | 1502 |
| V6:Sr4 | 1203 | V8:P1:La1 | 1503 |
| V6:Ba4 | 1204 | V6:P1:Sr3 | 1504 |
| V8:Sr1:Al1 | 1205 | V7:P1:Pb2 | 1505 |
| V6:Pb4 | 1301 | V7:P1:Si2 | 1601 |
| V8:Sr1:Na1 | 1302 | V8:P1:Sr1 | 1602 |
| V8:Sr1:La1 | 1033 | V6:P1:Ag3 | 1603 |
| V6:Sr1:Pb3 | 1304 | V7:P1:Bi2 | 1604 |
| V8:Sr1:Mg1 | 1305 | V8:Pb1:Zr1 | 1605 |
| V7:Sr2:Si1 | 1401 | V7:Pb2:Al1 | 1701 |
| V7:Sr1:Sr2 | 1402 | V8:Pb1:La1 | 1702 |
| V8:Sr1:Ca1 | 1403 | V7:Pb2:Mg1 | 1703 |
| V8:Sr1:Zr1 | 1404 | V8:Pb1:Ca1 | 1704 |
| V6:Ag2:Sr2 | 1405 | V7:Pb1:Ag2 | 1705 |

It will be understood from the foregoing description how the particular thermistors of the present invention are influenced in their electric characteristics by being subjected to the reduce-treatment. It is also found that the reduction reaction proceeds even when the furnace temperature is being raised and that an excessive reaction tends to deteriorate electric characteristics. These phenomena may be ascribed to the following reasons: first, the fact that $\psi$ is found considerably great in a thermistor which is kept at 400° C. for a short period of about 10 minutes during the reduce-treatment and that an extension of the reducing time to 60 minutes produces no remarkable difference in the result of reduction may safely lead to a positive assertion that the reduction reaction is being already carried on even in the course of temperature rise; second, from the fact that decrease in the abrupt-changing resistance degree $\psi$ occurs on account of excessive reduced treatment, $V_2O_5$ should not be reduced too much because otherwise $V_2O_4$ may be reduced to low-valence vanadium oxides such as $V_2O_3$.

It is known that, in case $V_2O_5$ single composition is reduced in ammonia ($NH_3$) gas, relationship between reaction velocity constant in reducing reaction of $V_2O_5$ and temperature for the reduce-treatment follows the undermentioned Arrhenius' equation as is the case with the other chemical reactions in general:

$$k = A \exp\left(\frac{-E}{RT}\right)$$

wherein $k$ is the reaction velocity constant; R is the gas constant; T is the absolute temperature ° K.; E is the apparent activation energy; and A is the frequency factor. The above relation applies not only to the reducing reactions by ammonia gas, but also to the reduce-treatment employing ethyl alcohol ($C_2H_5OH$), benzene ($C_6H_6$), etc., though the values of the apparent activation energy E and the frequency factor A differ from those in the case of using ammonia gas.

With a view to discovering whether this concept is also applicable to the particular thermistors of the present invention, the present inventors have closely studied the compositions of the following two types of particular thermistors: one is composed of $V_2O_5$ and SrO mixed at the ratio of 60 mol percent:40 mol percent, and the other is composed of $V_2O_5$, SrO and $P_2O_5$ mixed at the ratio of 60 mol percent:30 mol percent:10 mol percent, respectively. These two types of thermistors were treated in accordance with the block diagram of FIG. 4. That is, pulverized mixtures of the step 4 obtained from the melting-mixing process in the step 3 were, respectively, reduce-treated in the ammonia gas, whereupon the apparent activation energy E and the frequency factor A, etc. were determined. It was found, as the consequence, that the said Arrhenius' equation exactly applies to these cases. This indicates that the reducion of a mixture having vanadium pentoxide $V_2O_5$ and a certain oxide may be proceeded, regardless of changes, in any degree, of reduction temperature, kind of reducing gas, reducing time, etc. by adjusting the condition of the reduction treatments to accomplish obtaining a desired reducing degree of $V_2O_5$ in accordance with Arrhenius' equation.

Figure 104:
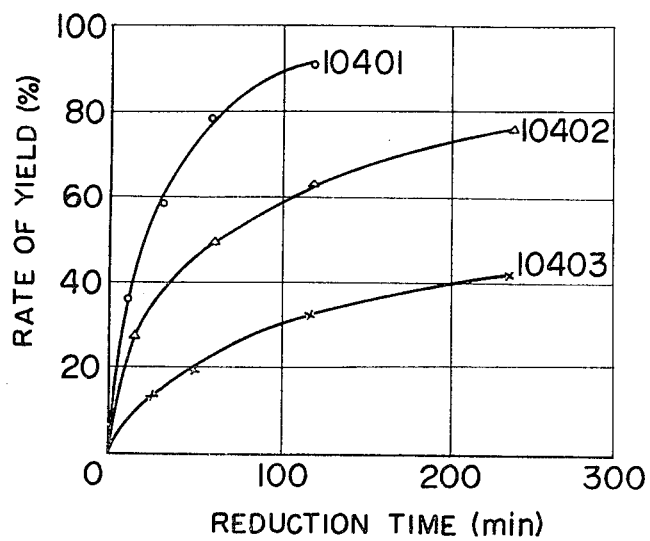
FIG. 104 is a graph showing how much vanadium tetraoxide is grown from vanadium pentoxide contained in the invented oxide semiconductor.

FIG. 104 shows reduction velocity of the particular thermistors of respective compositions at 400° C. in $NH_3$ gas. In the same figure, the ordinate represents the rate or amount of production of vanadium tetraoxide (tetra-valent vanadium) and the abscissa represents the reducing time. The curve 10401 shows the producing rate of vanadium tetraoxide (tetra-valent vanadium) of the particular thermistor obtained from a single composition of $V_2O_5$, the curve 10402 shows that of a particular thermistor obtained from a mixture consisting of 60 mol percent $V_2O_5$ and 40 mol percent of SrO and the curve 10403 shows that of a particular thermistor obtained from a mixture consisting of 60 mol percent of $V_2O_5$, 30 mol percent of SrO and 10 mol percent of $P_2O_5$.

These curves resemble the parabolas as is the case with the amount of reduction of $V_2O_5$. It will be understood from this that the reduction proceeds in conformity to a certain law in any particular thermistor having different composition and mixing ratio respectively.

Furthermore, it will be well understood that any operable particular thermistor should contain substantial amount of vanadium tetraoxide $V_2O_4$, so that the mean value of the oxygen/vanadium ratio of vanadium oxide included in the produced particular thermistor is considerably below the true stoichiometric value of $V_2O_5$ but always above that of $V_2O_4$.

Figure 18:
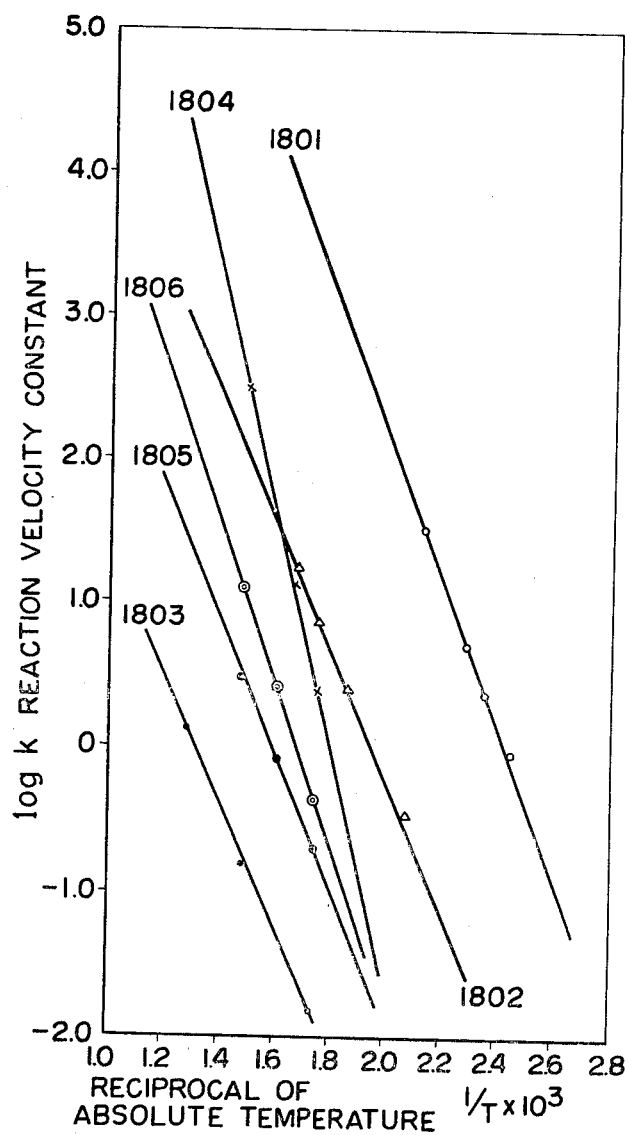
FIG. 18 is a diagram showing the relationship between oxidation reaction velocity and temperature as viewed in terms of the sorts of reducing gas for vanadium oxides.
Figure 19:
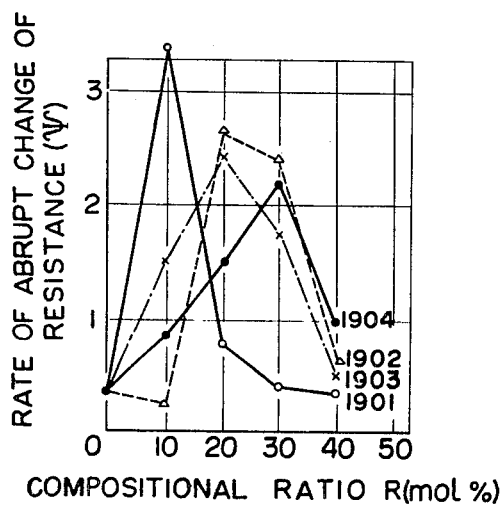
FIGS. 19–30 and 41–89 are respectively the curves showing electrical characteristics, particularly the degree of abrupt change in resistance $\psi$ with change of mixing ratio of the composition of the oxide semiconductors according to the present invention.
Figure 20:
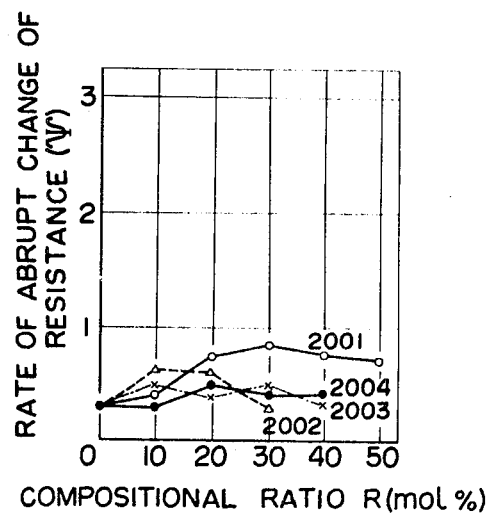
Figure 21:
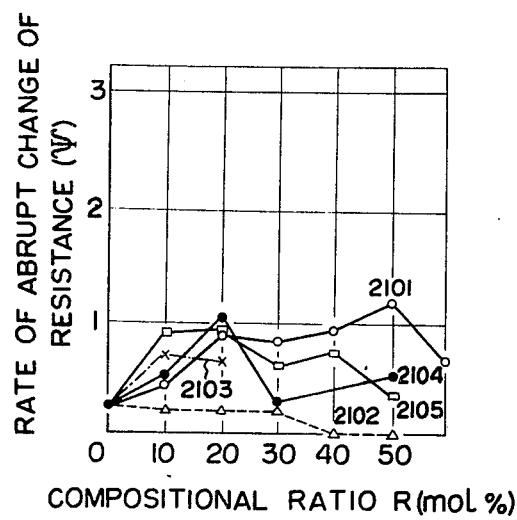
Figure 22:
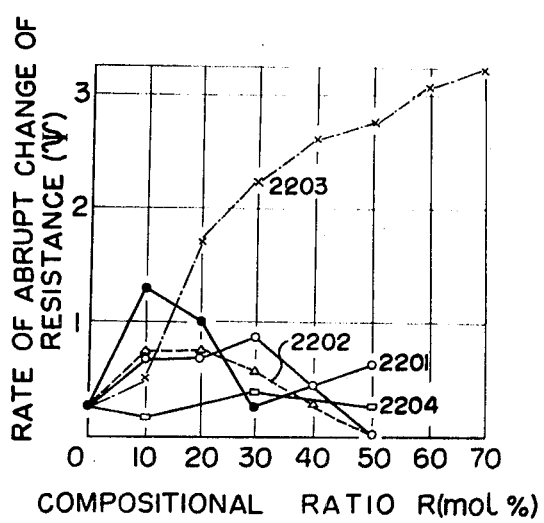
Figure 23:
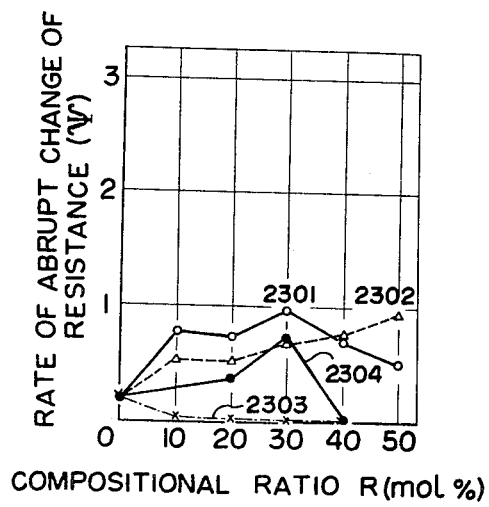
Figure 24:
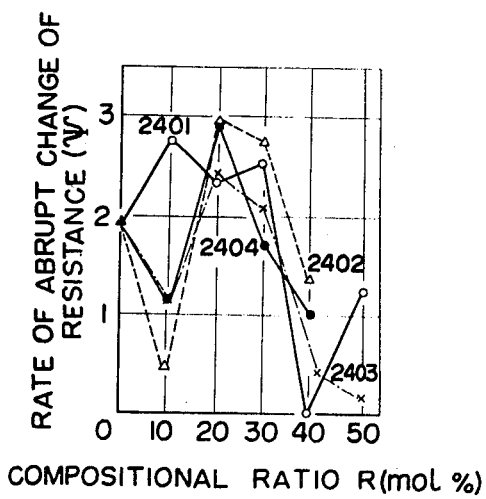
Figure 25:
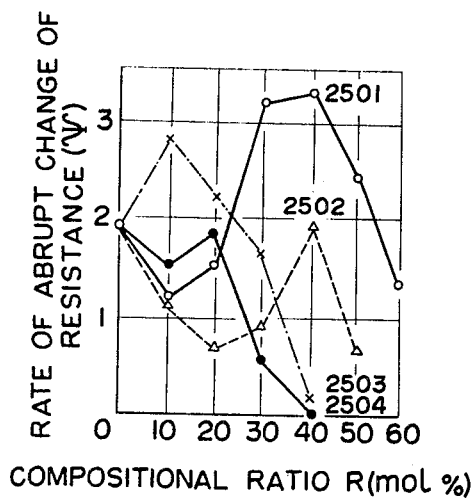
Figure 26:
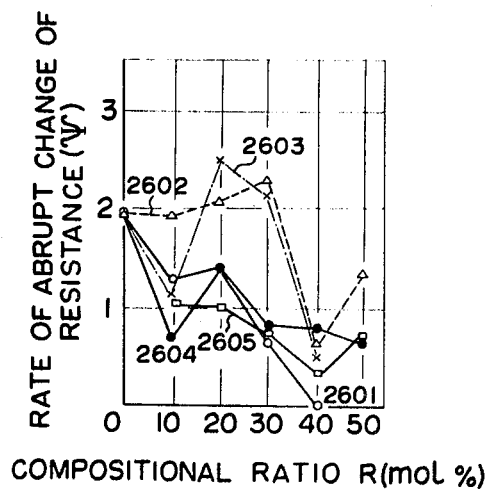
Figure 27:
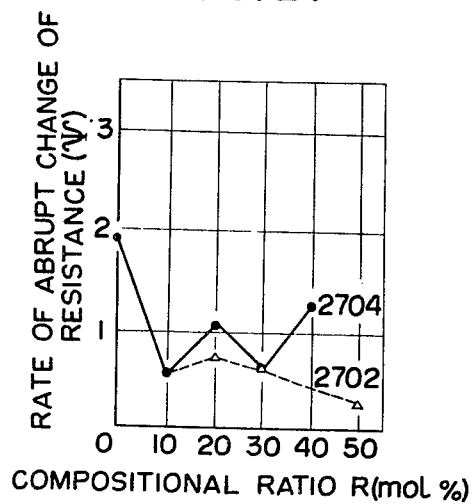
Figure 28:
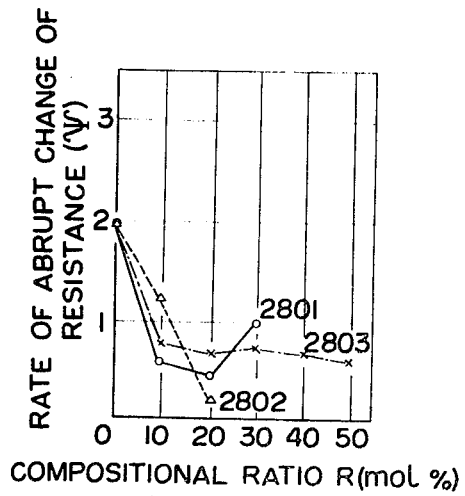
Figure 29:
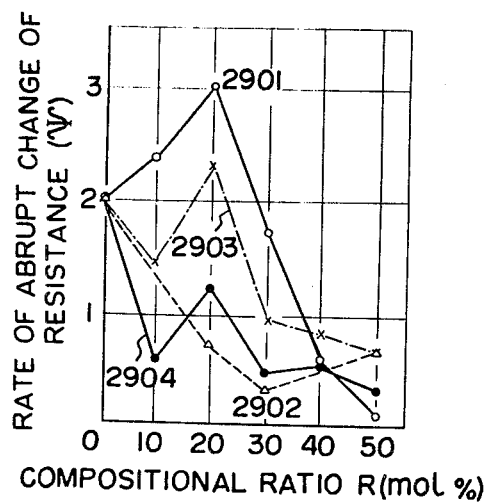
Figure 30:
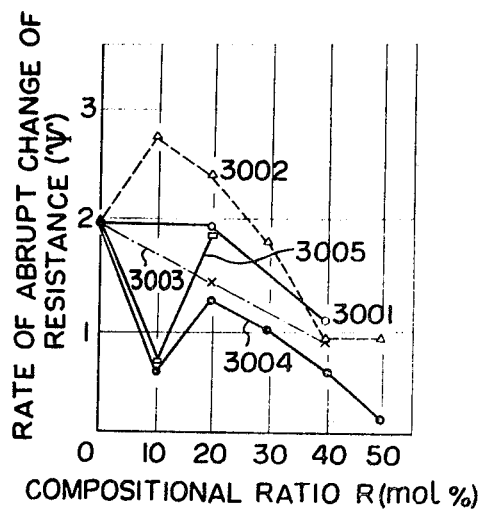

In relation to the said Arrhenius' equation, the apparent activation energy E and the frequency factor A of the reducing gas in each composition of the particular thermistors are given in Table 3A. Also, the relationship between the reaction velocity K and the reducing temperature (expressed by the absolute temperature) T in the respective compositions is indicated in FIG. 18. Table 3A also indicates identification of the curves 1801–1806 in FIG. 18 corresponding to the respective compositions. The way of indicating the compositions of the respective thermistors has taken after that of Table 2.

TABLE 3A

| Composition reduced of material | Reducing atmosphere | Frequency factor, A (mol percent² / minutes) | Apparent activation energy, E(Kcal./mol) | Identification of curves in Fig. 18 |
|---|---|---|---|---|
| V10 | $C_2H_5OH$ | 4.5×10¹² | 22.1 | 1801 |
| V10 | $C_6H_6$ | 5.0×10⁹ | 18.5 | 1802 |
| V10 | $H_2$ | 8.5×10⁵ | 18.0 | 1803 |
| V10 | $NH_3$ | 8.5×10¹⁴ | 36.1 | 1804 |
| V6:Sr4 | $NH_3$ | 4.5×10⁷ | 19.8 | 1805 |
| V6:Sr3:P1 | $NH_3$ | 4.0×10⁹ | 24.0 | 1806 |

From FIGS. 10–18 and 104 and Tables 2 and 3A, it may be summarized that the reduce-treatment is indispensable in the method according to this invention; the the compositional substances must be converted into vanadium tetraoxide $V_2O_4$; that an excessive reduce-treatment diminishes the abrupt-changing resistance degree $\psi$; that any reduction treatment condition can apply to the particular thermistors of the present invention, since the amount of reduction (reducing reaction velocity) varies linearly with a certain constant in accordance with the Arrhenius' equation and the constant is determined by changing reducing gas, reduce-treating time and reduce-treating temperature; and that the optimum reducing conditions vary from one composition to the other.

Moreover, it is desirable to make the material mixture in powder or porous condition before reduction procedure in order to reduce the mixture uniformly. To keep the mixture in powder or porous condition during the reduction procedure, it is more desirable to maintain the temperature lower than the melting point or softening temperature of the material mixture while under reduction. This temperature is different from the used material composition, yet, it is generally about 500° C. or lower. In principle, compositions of reduction atmosphere are not limited. Since the power of reaction, however, depends on the applied atmosphere and temperature, it is needed to select the atmosphere that is most easy to control. For example, when $NH_3$ is adopted as the reducing atmosphere, and temperature is 400° C., the reaction to reduce $V_2O_5$ is saturated when $V_2O_5$ changed to $V_2O_4$.

While, in the case of $H_2$, it should be noted that the reaction goes on till $V_2O_5$ is reduced to $V_2O_3$. However, $H_2$ can be used as reduction atmosphere, when reduction temperature and reduction time is selected according to the said Arrhenius' equation so that the average value of oxygen/vanadium ratio of vanadium oxide contained in the material mixture is lower than the true stoichiometric value of $V_2O_5$ but not less than that of $V_2O_4$.

Table 3B shows the most suitable reduction gas and suitable temperature and time for the reduction of $V_2O_5$ to $V_2O_4$.

TABLE 3B

| Gas | Temp. (° C.) | Period (min.) |
|---|---|---|
| $C_6H_6$ | 330 | 5–360 |
| $C_6H_5CH_3$ | 320 | 5–600 |
| $C_6H_4(CH_3)_2$ | 270 | 15–1,500 |
| $CH_3OH$ | 200 | 10–240 |
| $C_2H_5OH$ | 200 | 5–180 |
| $NH_3$ | 400 | 5–480 |

The time shown in Table 3B is the case of the material having the composition of 60 $V_2O_5$: 30 $P_2O_5$: 10 SrO (V 7.1: P 1.1: Sr 1.8) and 600° C. of melting point. Furthermore, benzene $C_6H_6$ resolve to $H_2$ at 400° C. and changes $V_2O_5$ to $V_2O_3$. While, ammonia gas changes $V_2O_5$ to $V_2O_3$ at 450° C. or over and exceed 600° C., it resolves to $H_2$ by itself.

As the reduction gas, sulfur dioxide $SO_2$, furfural, aldehyde are also as usable as the gases shown in the said Table 3B; benzene $C_6H_6$ (toluene $C_6HCH_3$, xylene $C_6H_4(CH_3)_2$), methyl alcohol $CH_3OC$, ethyl alcohol $C_2H_5OH$, ammonia ($NH_3$).

It has been mentioned in the foregoing that, in chemical reaction, by varying reduce-treatment condition or compositional ratio of substance, electrical characteristics of a resulting material from the reaction might be varied to a considerable extent. Discussion will now be directed to how much the electric characteristics become variable due to difference in mixing ratio of the compositions which constitute the particular thermistors of the present invention.

First, explanation is given to a binary system particular thermistor produced from a mixture of $V_2O_5$ and one oxide as a single component. The optimum mixing ratio of the binary thermistor is as indicated in Tables 4A, 4B and 4C, and the test results thereof are given in FIGS. 19–30; in each of these figures, the abscissa indicates mixing ratio (atomic ratio of elements other than oxygen) of the second component R and the ordinate shows the degree of abrupt change in resistance $\psi$. In Tables 4A, 4B and 4C, indication of the thermistor composition has been given in the following manner for the sake of simplification: the ratio of $V_2O_5$ is omitted and ratio of the other oxides only is shown. Therefore, if, for example, mixing ratio of $P_2O_5$ ranges from 0–20 percent, it is well understood that mixing ratio of $V_2O_5$ is 100–80 percent. In the case of mixing $V_2O_5$ with other oxides, if the said other oxides are $SrCO_3$, $CaCO_3$, $BaCO_3$, $La_2(C_2O_4)9H_2O$ or $(NH_4)_2HPO_4$, etc., the mixing ratio of $V_2O_5$ with these oxides are indicated by the atomic ratio of the element other than oxygen of SrO, CaO, BaO, $Ca_2O_3$ and $P_2O_5$, respectively, on the assumption that these carbonates, etc. might have been decomposed thermally in the air to become the respective oxides.

The reason why as starting materials, SrO, $P_2O_5$ and etc. are not used but, $SrCO_3$, $(NH_4)_2HPO_4$ etc. are used is that SrO, $P_2O_5$ and etc. are unstable in the air. For example, because when SrO is stored in the air, SrO reacts with $CO_2$ and becomes $SrCO_3$, it is hard to weight precisely.

Therefore, such an oxide, like PbO as is stable as an oxide, may be suitable for the starting material. Yet if it is possible to weight precisely SrO, $P_2O_5$ etc. with the suitable method, the oxide itself is able to be used too. Moreover in the following drawings and explanation, percent oxide mixing ratio means the atomic percent of the elements other than oxygen. For instance, "ratio of $P_2O_5$ is 20% means "ratio of P is 20% in gram atomic ratio."

Figure 38:
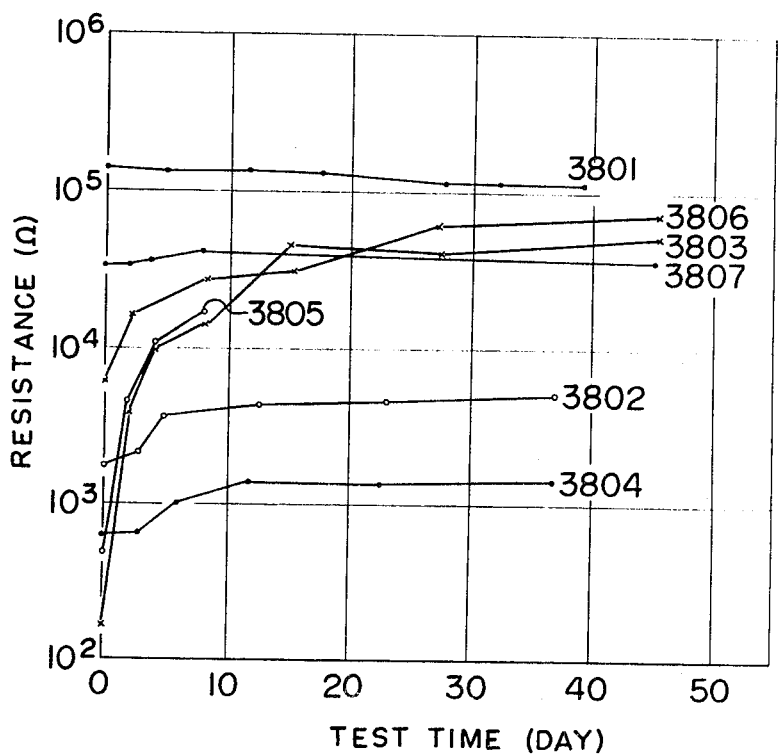

As for the production conditions of the respective thermistors, the reduction treatment was conducted in $NH_3$ atmosphere, at 400° C. for 30 minutes in one case and 120 minutes in the other, and the sintering treatment was conducted at 1000° C., 1100° C. and 1300° C. The other conditions followed same as Example 1. The resultant particular thermistors are, therefore, as small ts about $0.8\phi$ in size. The sintering treatment was conducted by placing the materials into a sintering furnace in $N_2$ gas atmosphpere at normal temperature, then heat-treating the materials for 3 minutes at about 1000° C., thereafter the said materials were immediately taken outside of the furnace at the normal temperature. On account of this, the particular thermistor beads should be considered to have been cooled rapidly after they were sintered. The thermistor composition of the respective curves in FIGS. 19–30 are specified in Tables 4A, 4B and 4C. In each of said figures, the ordinate denotes the degree of abrupt change in resistance $\psi$ and the abscissa indicates atomic percent of the other oxides. FIGS. 31–37 indicate resistance-temperature characteristics curves of particular thermistors of respective compositions having particularly good resistance-temperature characteristics. The production conditions for these thermistors are as shown in Table 5. FIG. 38 illustrates resistance-variation characteristics with lapse of time of those particular thermistors shown in FIGS. 31–37. The characteristic curves of the resistance-variation with lapse of time were obtained in the following manner: the particular thermistors were left at a temperature of 100° C., and was lowered down to 40° C. only at the time of measuring the resistance variation.

TABLE 4A

[Reducing treatment: 30 min. at 400° C.; Sintering treatment: 3 min. at 1,000° C.]

| | Percent | Characteristic curve |
|---|---|---|
| Composition: | | |
| $P_2O_5$ | 0–20 | 1901 |
| BaO | 0–60 | 1902 |
| SrO | 0–60 | 1903 |
| PbO | 0–60 | 1904 |
| $Ag_2O$ | 0–70 | 2001 |
| $Li_2O$ | 0–20 | 2002 |
| $Na_2O$ | Δ | 2003 |
| $K_2O$ | Δ | 2004 |
| BeO | 0–75 | 2101 |
| MgO | Δ | 2102 |
| CaO | Δ | 2103 |
| $La_2O_3$ | 0–40 | 2201 |

TABLE 4A.—Continued

| | Percent | Characteristic curve |
|---|---|---|
| CeO₂ | 0-60 | 2202 |
| ZrO₂ | 0-70 | 2301 |
| ZnO | 0-40 | 2104 |
| CdO | 0-65 | 2105 |
| B₂O₃ | 0-70 | 2203 |
| Al₂O₃ | 0-50 | 2204 |
| SiO₂ | 0-75 | 2302 |
| SnO₂ | Δ | 2303 |
| Bi₂O₃ | Δ | 2304 |
| UO₃ | 0-60 | 2205 |

TABLE 4B

[Reducing treatment: 120 min. at 400° C.; Sintering treatment: 3 min. at 1,000° C.]

| | Percent | Characteristic curve |
|---|---|---|
| Composition: | | |
| P₂O₅ | 0-30 | 2401 |
| BaO | 0-60 | 2402 |
| SrO | 0-60 | 2403 |
| PbO | 0-60 | 2404 |
| Ag₂O | 0-70 | 2501 |
| Li₂O | 0-50 | 2502 |
| Na₂O | 0-35 | 2503 |
| K₂O | 0-30 | 2504 |
| BeO | 0-50 | 2601 |
| MgO | 0-75 | 2602 |
| CaO | 0-60 | 2603 |
| La₂O₃ | 0-50 | 2701 |
| CeO₂ | 0-60 | 2702 |
| ZrO₂ | 0-70 | 2801 |
| ZnO | 0-70 | 2604 |
| CdO | 0-70 | 2605 |
| B₂O₃ | 0-60 | 2703 |
| Al₂O₃ | 0-50 | 2704 |
| SiO₂ | 0-75 | 2802 |
| SnO₂ | 0-75 | 2803 |
| Bi₂O₃ | Δ | 2804 |
| UO₃ | 0-60 | 2705 |

TABLE 4C

| Sintering treatment | Reducing treatment: 120 min. at 400° C. | | Characteristic curve |
|---|---|---|---|
| | 3 min. at 1,100° C. (percent) | 3 min. at 1,300° C. (percent) | |
| Composition: | | | |
| P₂O₅ | | | |
| BaO | | | |
| SrO | | | |
| PbO | 0-69 | | 2901 |
| Ag₂O | | | |
| Li₂O | | | |
| Na₂O | | | |
| K₂O | Δ | | 2902 |
| BeO | | 0-60 | 3001 |
| MgO | | 0-75 | 3002 |
| CaO | | | |
| La₂O₃ | | 0-50 | 3003 |
| CeO₂ | | 0-70 | 3004 |
| ZrO₂ | | 0-70 | 3005 |
| ZnO | 0-70 | | 2903 |
| CdO | | | |
| B₂O₃ | | | |
| Al₂O₃ | | | |
| SiO₂ | 0-70 | | 2904 |
| SnO₂ | | | |
| Bi₂O₃ | | | |
| UO₃ | | | |

NOTE.—The thermistor composition in the above Tables 4A, 4B and 4C is indicated in atomic ratio of elements other than oxygen.

The mark Δ in Tables 4A, 4B and 4C above indicates that no visible temperature characteristics at which resistance undergoes sharp decline could appear, hence the optimum mixing ratio is not known. It should also be noted particularly in Tables 4A, 4B and 4C that the compositional ratio of the materials are not so much influenced by variations in the reduce-treatment conditions. The second components were all shown in the form of oxides, and it goes without saying that the particular thermistors of the present invention were obtained by using these oxides. It was also possible to obtain the particular thermistors by mixing V₂O₅ with the following compounds in such a quantity that corresponds to the ratio in the above table on the assumption that they are supposedly converted into the respective oxides after reaction. These compounds are: (NH₄)₂HPO₄ and H₃PO₄ for P₂O₅; SrCO₃, Na₂CO₃, K₂CO₃, CaCO₃ and Li₂CO₃ for SrO, Na₂O, K₂O, CaO and Li₂O respectively; BaCO₃ and Ba(NO₃)₂ for BaO; H₃BO₃ for B₂O₃; and $$UO_3(NO_3)_2 \cdot 6H_2O$$

for UO₃. In the following Table 5, the production conditions are classified into A, B, C and D these conditions are respectively defined as follows:

(A)—The conditions as in Example 1 in accordance with block diagram of FIG. 4 with the exception that the reducing treatment is conducted for 30 minutes at 400° C. in the atmosphere of ammonia (NH₃) gas and the sintering treatment is conducted for 3 minutes at 1000° C. in the atmosphere of nitrogen (N₂) gas, as shown in Table 4.

(B)—The conditions as in Example 1 in accordance with the block diagram of FIG. 4 with the exception that the reducing-treatment is conducted for 120 minutes at 400° C. in the atmosphere of NH₃ gas and the sintering treatment is conducted for 3 minutes at 1000° C. in the atmosphere of N₂ gas.

(C)—The conditions as in Example 1 following the process steps of FIG. 4 with the exception that the reducing treatment is conducted for 120 minutes at 400° C. in the atmosphere of NH₃ gas and the sintering treatment is conducted for 3 minutes at 1100° C. in the atmosphere of N₂ gas.

(D)—The conditions as in Example 1 following the process steps of FIG. 4 with the exception that the reducing treatment is conducted for 120 minutes at 400° C. in the atmosphere of NH₃ gas and the sintering treatment is conducted for 3 minutes at 1300° C. in the atmosphere of N₂ gas.

TABLE 5

| | Resistance-temperature characteristics | | | | Characteristics of resistance-variation with lapse of time | | | |
|---|---|---|---|---|---|---|---|---|
| Production conditions | A | B | C | D | A | B | C | D |
| Composition: | | | | | | | | |
| V9:P1 | 3101 | 3102 | | | 701 | | | |
| V8:Ba2 | 3103 | 3104 | | | | 702 | | |
| V9:Sr1 | | 3105 | | | | | | |
| V8:Sr2 | 3106 | | | | 3801 | | | |
| V7:Pb3 | 3201 | | | | | | | |
| V9:Pb1 | | 3202 | | | | | | |
| V8:Pb2 | | | 3203 | | | 703 | | |
| V7:Ag3 | 3204 | | | | | 704 | | |

TABLE 5.—Continued

| Production conditions | Resistance-temperature characteristics | | | | Characteristics of resistance-variation with lapse of time | | | |
|---|---|---|---|---|---|---|---|---|
| | A | B | C | D | A | B | C | D |
| V6:Ag 4 | | 3205 | | | | 3802 | | |
| V8:Li 2 | 3206 | | | | | | | |
| V6:Li 4 | | 3207 | | | | | | |
| V7:Na 3 | 3301 | 3309 | | | | 3803 | | |
| V9:Na1 | | 3302 | | | | 3804 | | |
| V8:K2 | 3303 | 3304 | 3305 | | | | | |
| V5:Be5 | 3306 | | | | | 3805 | | |
| V8:Be2 | | 3307 | | | | | | |
| V9:Be1 | | | | 3308 | | | | |
| V9:Mg1 | 3401 | | | 3403 | | | | |
| V7:Mg3 | | 3402 | | | | 3806 | | |
| V9:Ca1 | 3404 | | | | | | | |
| V7:Ca3 | | 3405 | | | | 3807 | | |
| V9:La1 | 3406 | | | | | | | |
| V6:La4 | | 3407 | | 3408 | | | | |
| V7:Ce3 | 3501 | | | | | | | |
| V9:Ce1 | | 3502 | | 3503 | | | | |
| V9:Zr1 | 3504 | 3505 | | | | | | |
| V8:Zr2 | | | | 3506 | | | | |
| V8:Zn2 | 3508 | | 3509 | | | | | |
| V9:Zn1 | | 3507 | | | | | | |
| V8:Cd2 | 3601 | | | | | | | |
| V9:Cd1 | | 3602 | | | | | | |
| V5:B5 | 3603 | 3604 | | | | | | |
| V7:Al3 | 3605 | | | | | | | |
| V6:Al4 | | 3606 | | | | | | |
| V5:Si5 | 3701 | | | | | | | |
| V6:Si4 | | 3702 | | | | | | |
| V8:Sn2 | 3703 | 3704 | 3705 | | | | | |
| V7:Bi3 | 3706 | | | | | | | |
| V7:U3 | 3707 | 3708 | | | | | | |

NOTE: Indication of the thermistor composition in the above Table 5 was followed in the manner of Table 2.

Table 5, FIGS. 7 and 31–38 show the binary system particular thermistors of the present invention. From this resistance-temperature characteristic curves, it is made known that the particular thermistors of the present invention do not abide by the equation $$R = R_0 \exp B \left( \frac{1}{T} - \frac{1}{T_c} \right)$$

which expresses resistance variations of conventional thermistors due to temperature variations, but they undergo peculiar changes wherein a semiconductor-metal transition is clearly observed. Also, what the characteristic curves of resistance-variation with lapse of time shown in FIGS. 7 and 38 suggest is that most of the thermistor compositions can not give good results except for a few kinds. No definite reasons therefor has yet been known, but the characteristics of resistance-variation with lapse of time of the particular thermistors prepared by sintering a mixture of $V_2O_5$ with other oxides such as $P_2O_5$, BaO, BrO, PbO, AgO, $Na_2O$ or CaO, etc. are thought to be improved by the following reasons: that is, these added oxides, such as $P_2O_5$, BaO, SrO or PbO etc., are vitrified with remained $V_2O_5$ in the sintered treatment and the vitrified oxide substance are supposed to help shielding crystalline vanadium tetraoxide $V_2O_4$, which is the principal component of the particular thermistors, from the outer atmosphere thereby preventing intrusion of moisture, or to protect $V_2O_4$ crystals, which are readily oxidized, from oxygen atoms coming into from outside, or to function as a binding agent to bind a plurality of crystalline particles of vanadium tetraoxide $V_2O_4$ in the sintered particular thermistors.

Next, the particular thermistors which are consisted of ternary or more component system oxides added to $V_2O_5$ will be considered hereinbelow.

Figure 41:
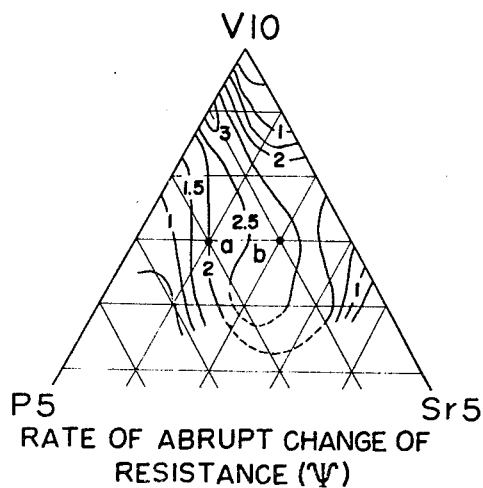
Figure 42:
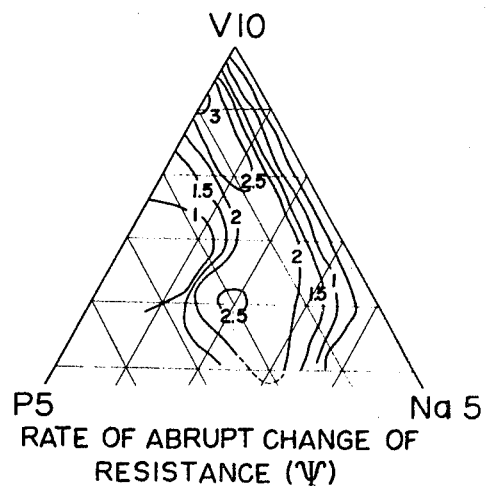
Figure 43:
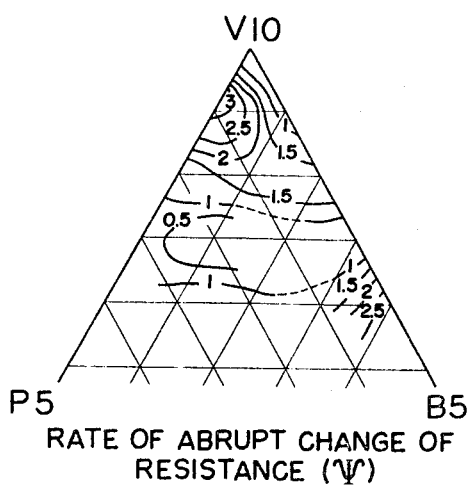
Figure 44:
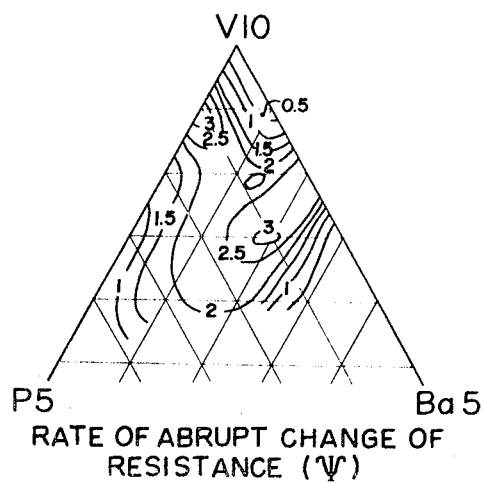
Figure 45:
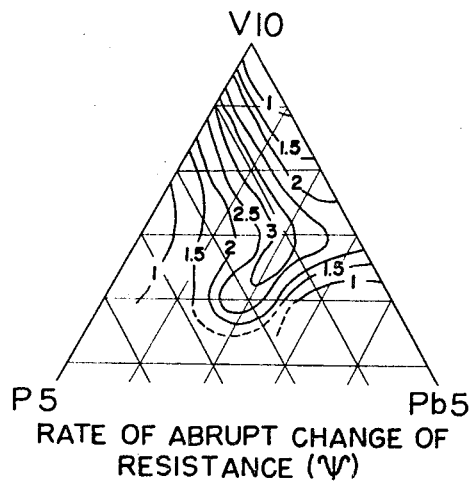
Figure 46:
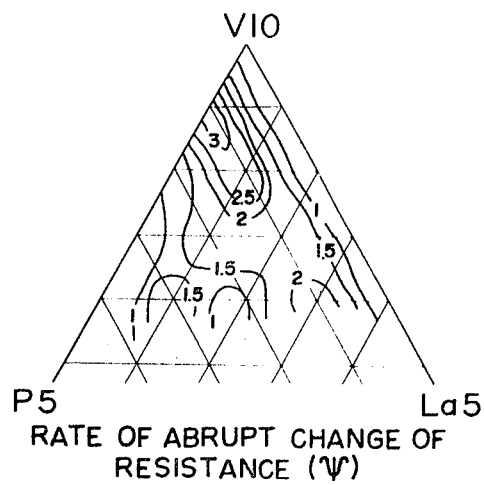
Figure 47:
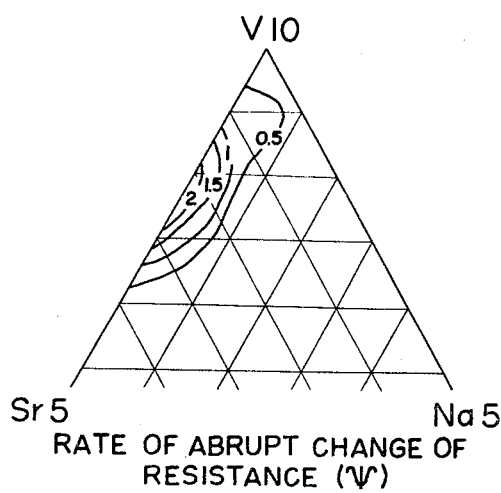
Figure 48:
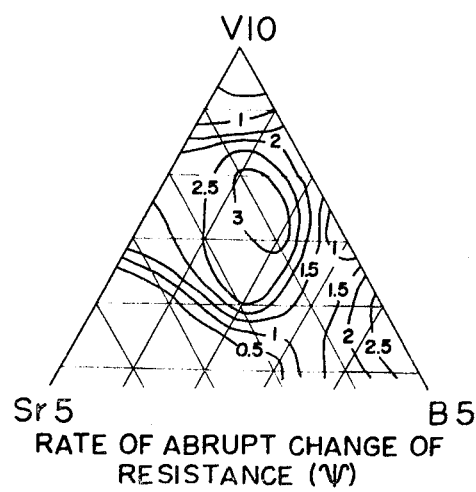
Figure 49:
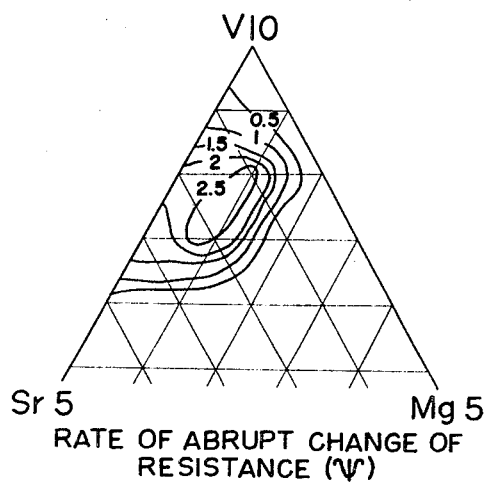
Figure 50:
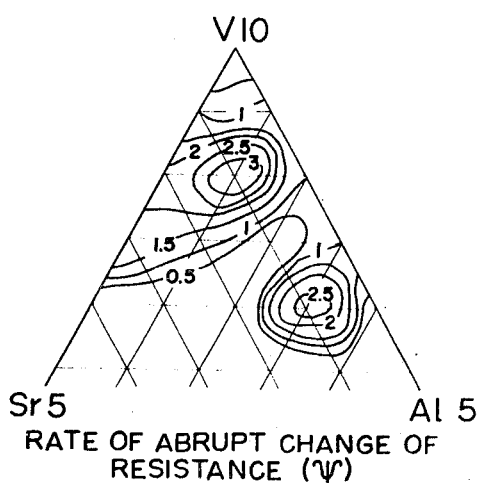
Figure 51:
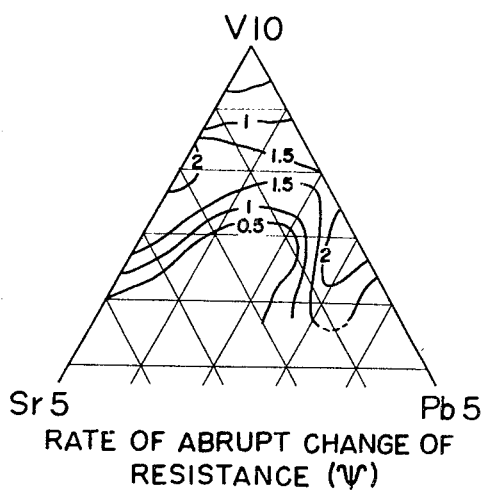
Figure 52:
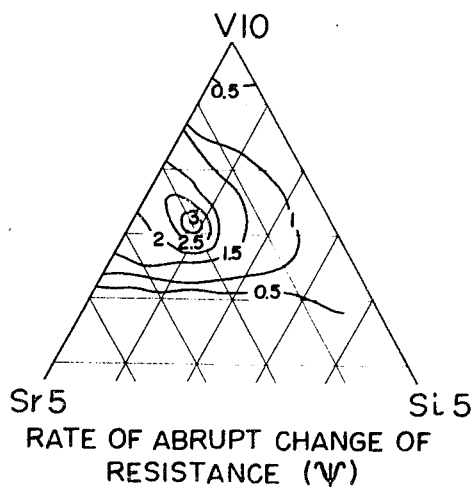
Figure 53:
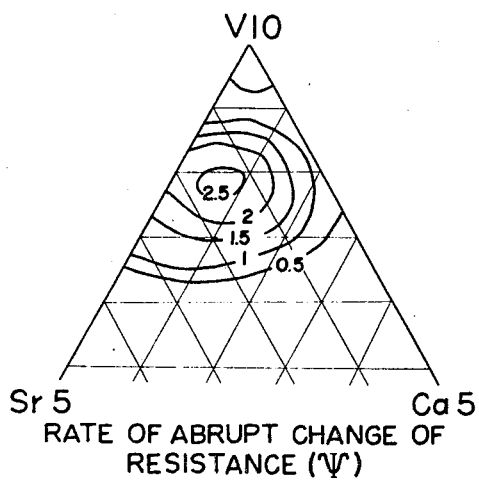
Figure 54:
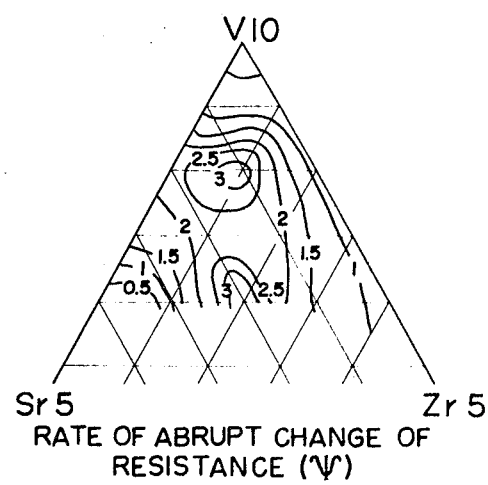
Figure 55:
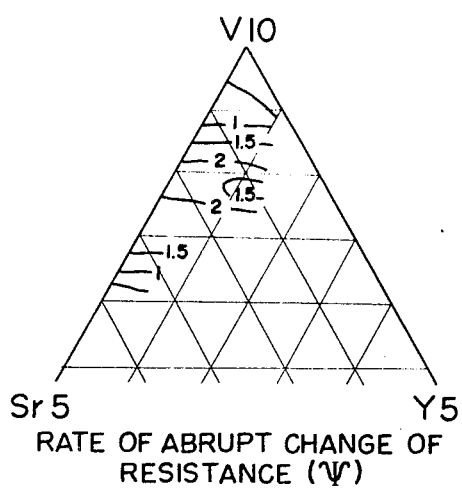
Figure 56:
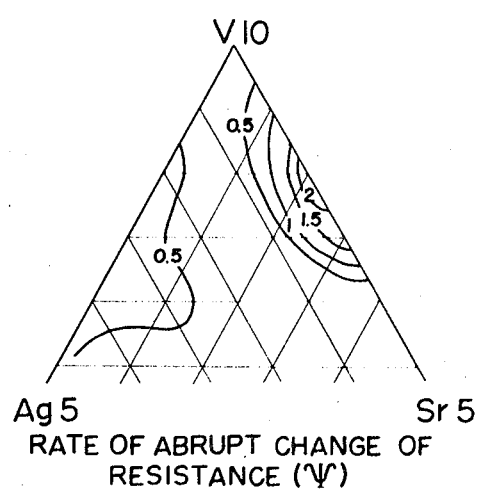
Figure 57:
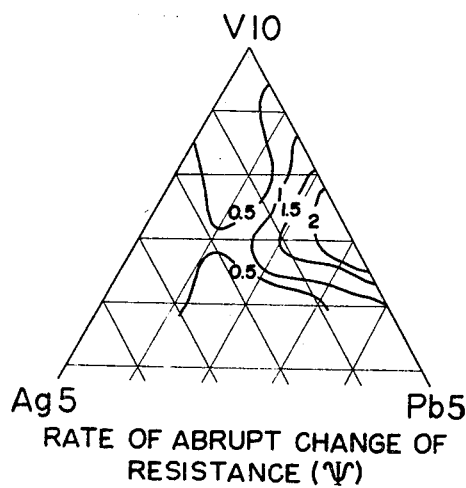
Figure 58:
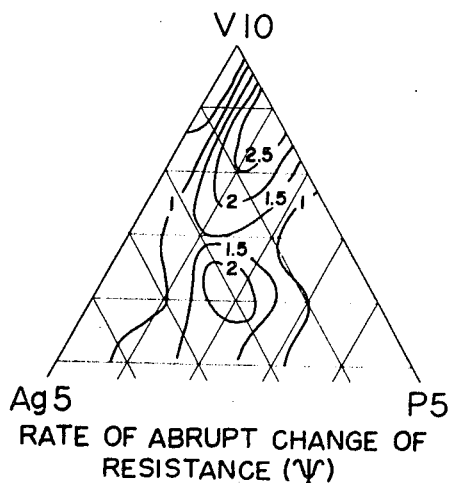
Figure 59:
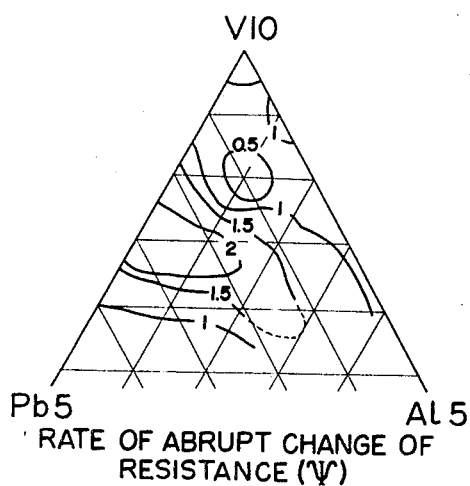
Figure 60:
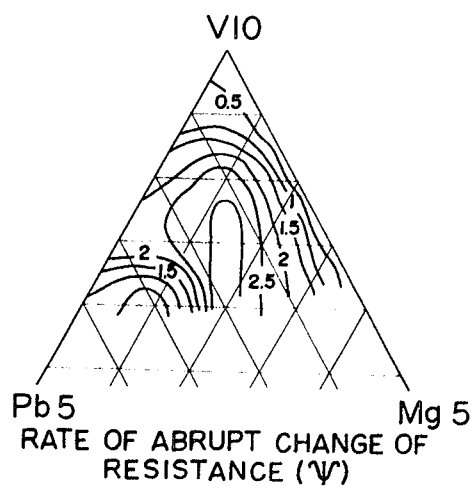
Figure 61:
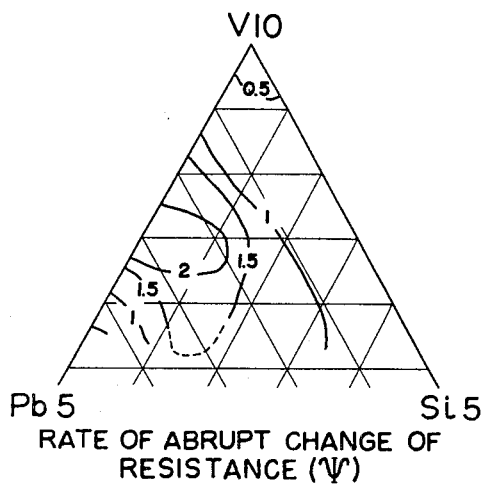
Figure 62:
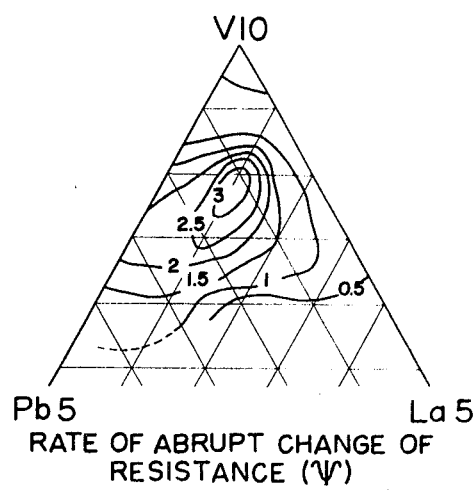
Figure 63:
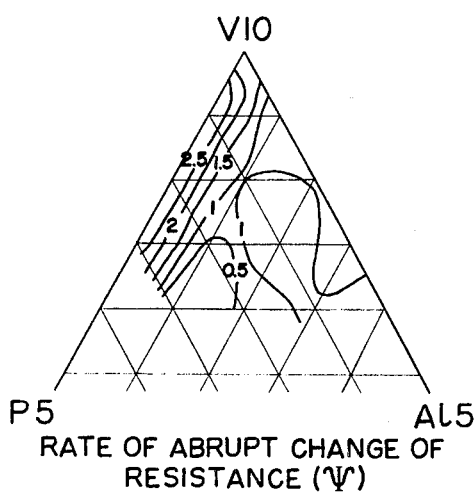
Figure 64:
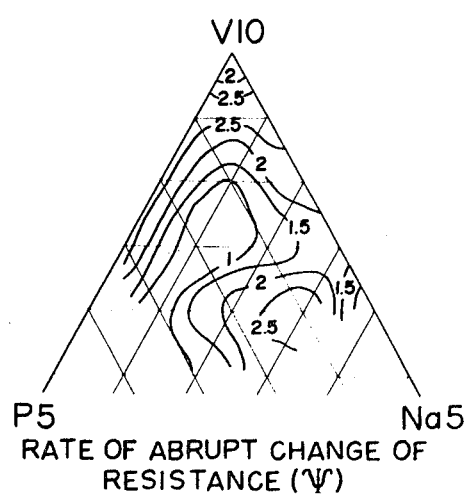
Figure 65:
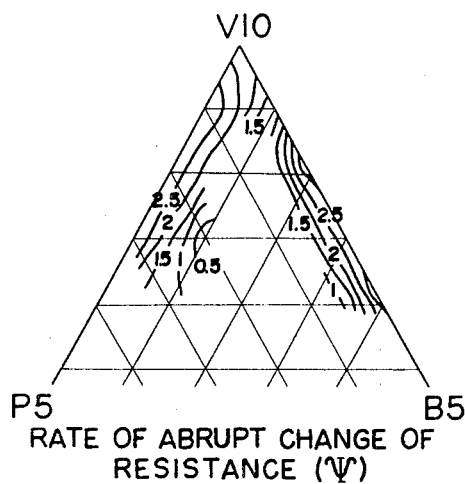
Figure 66:
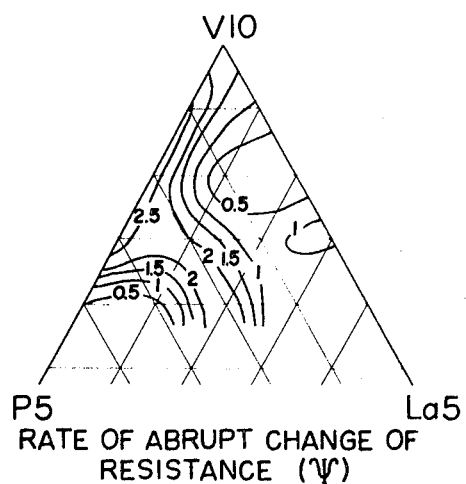
Figure 67:
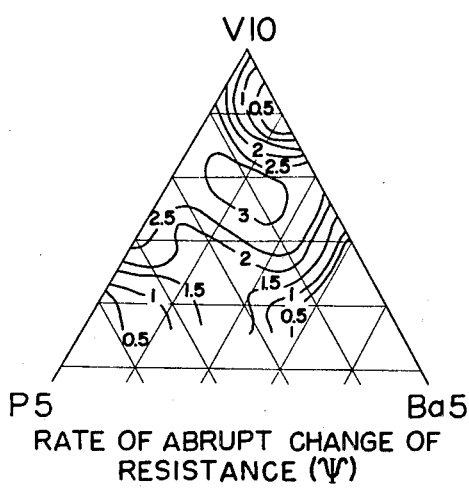
Figure 68:
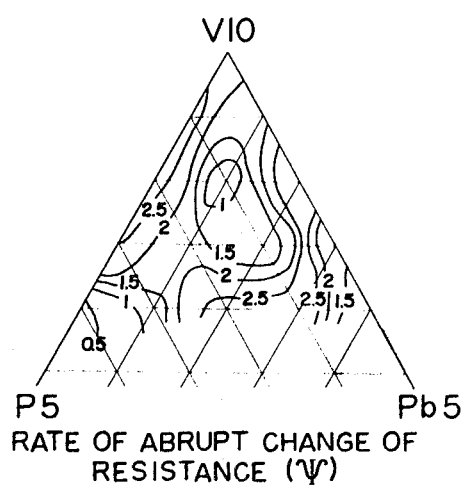
Figure 69:
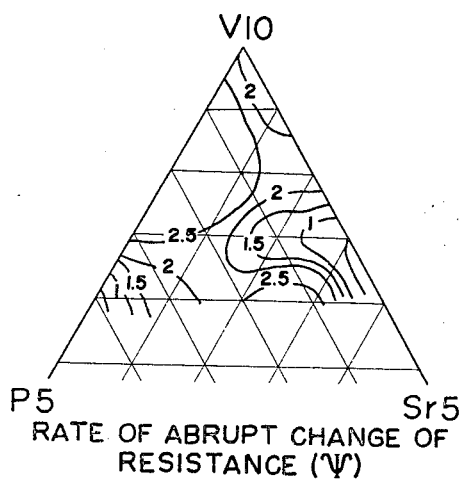
Figure 70:
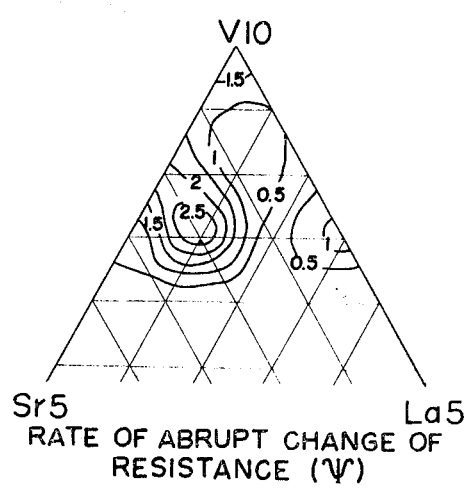
Figure 71:
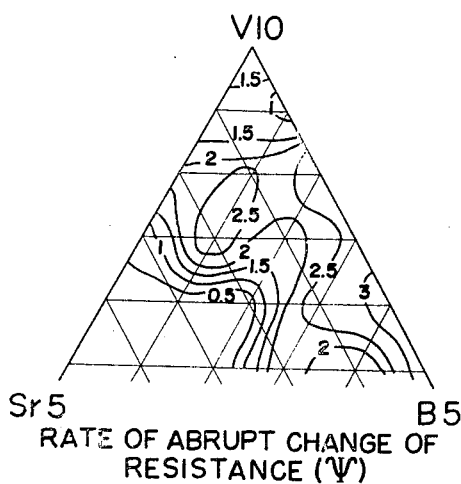
Figure 72:
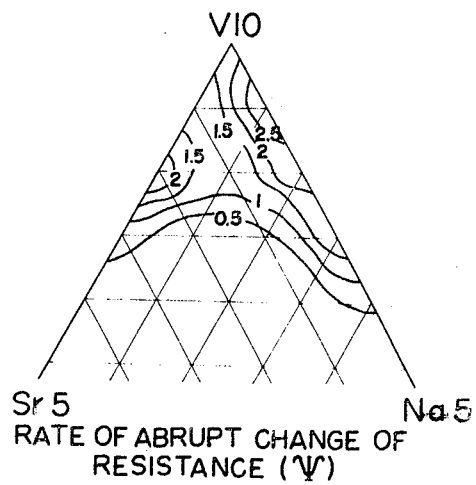
Figure 73:
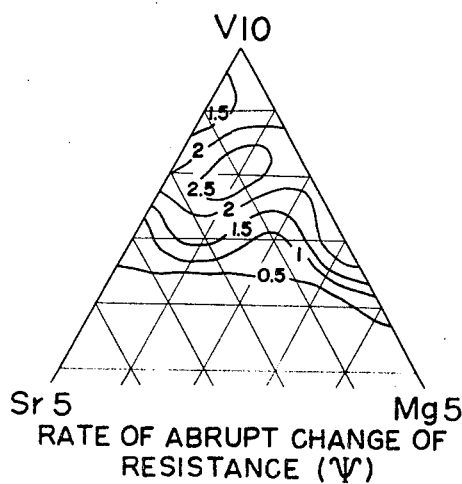
Figure 74:
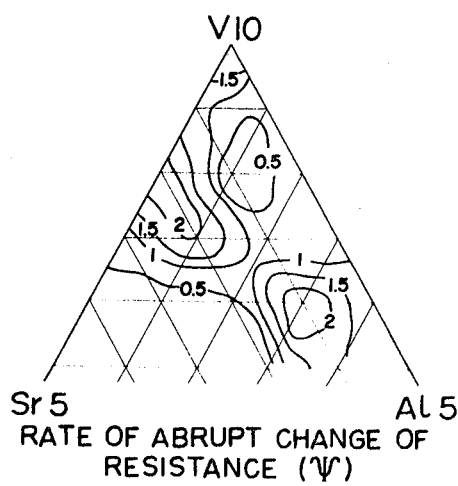
Figure 75:
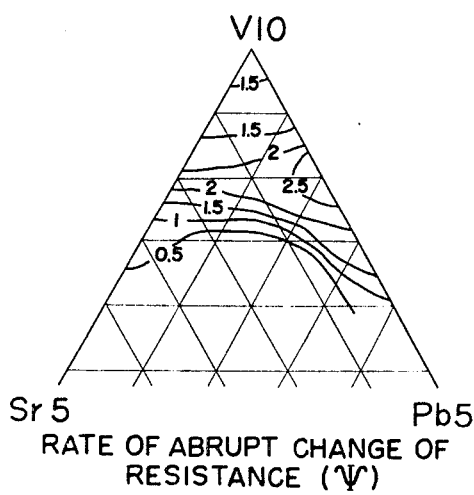
Figure 76:
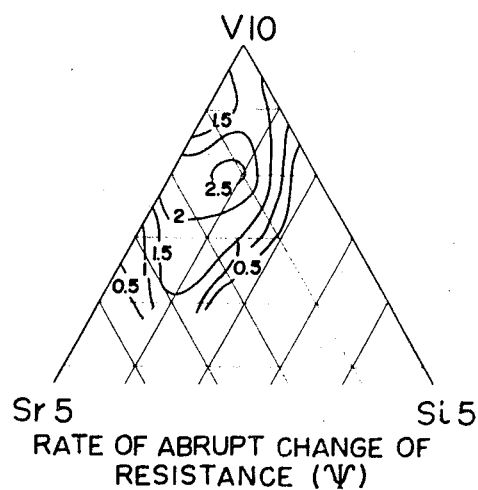
Figure 77:
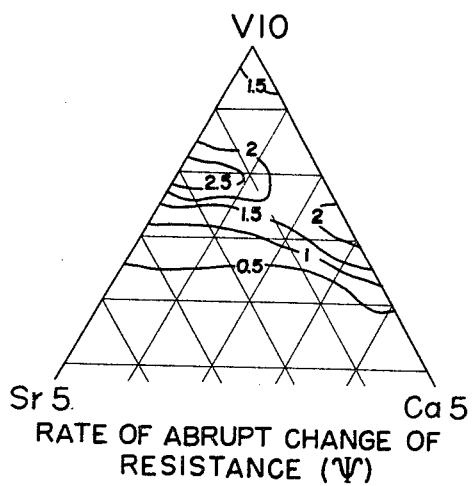
Figure 78:
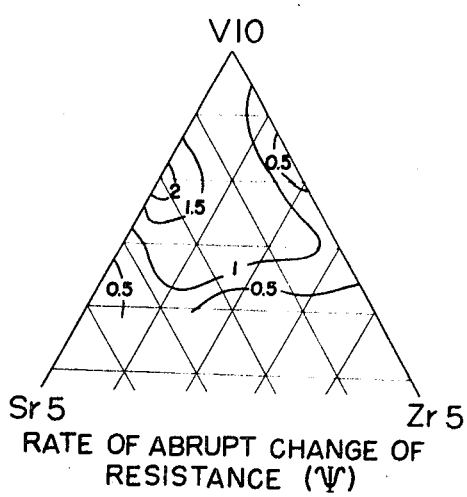
Figure 79:
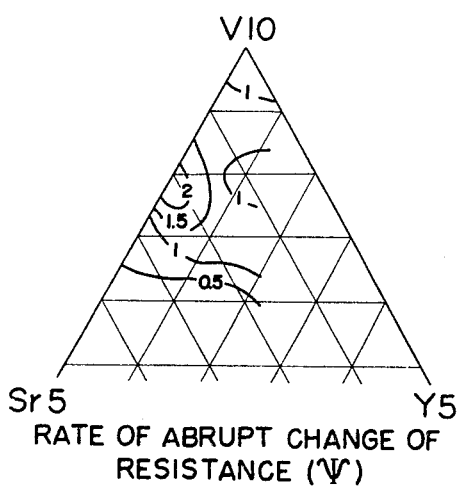
Figure 80:
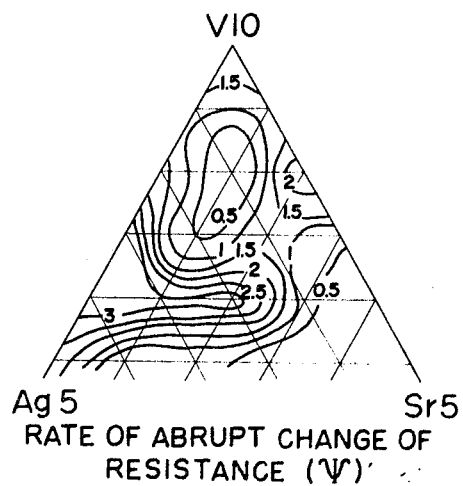
Figure 81:
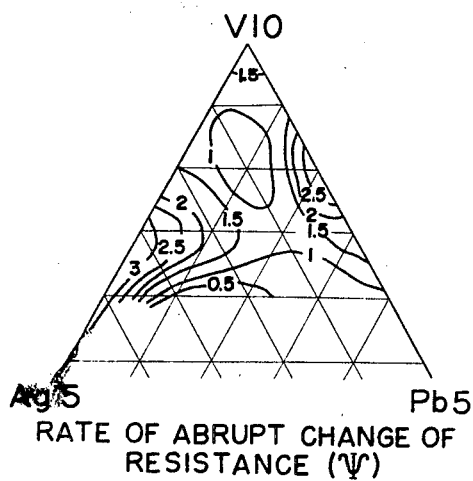
Figure 82:
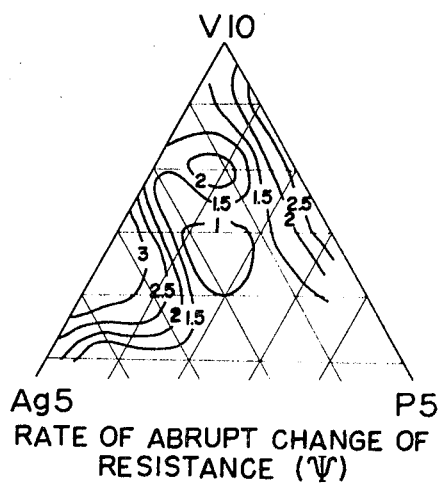
Figure 83:
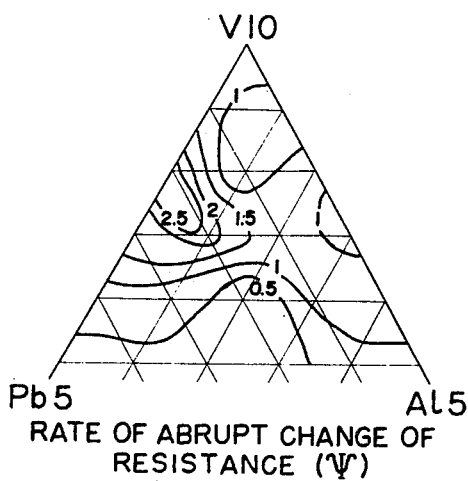
Figure 84:
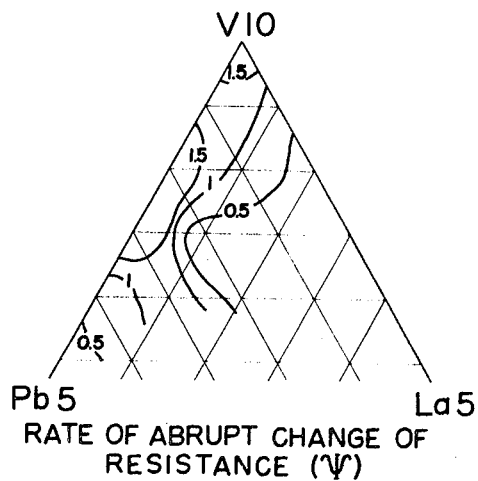
Figure 85:
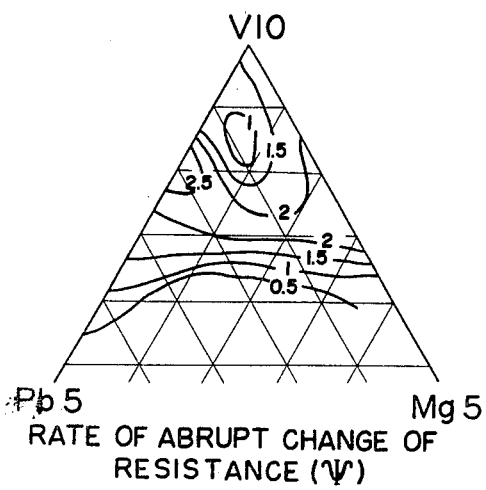
Figure 86:
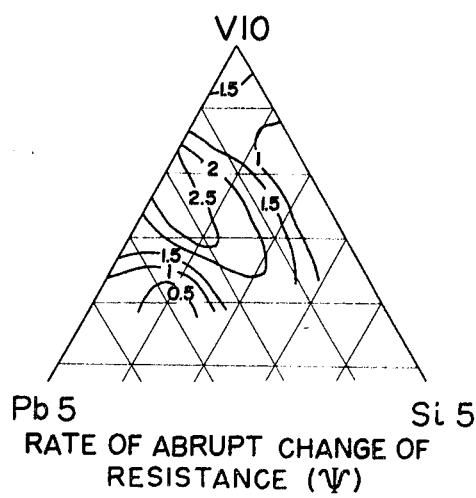
Figure 87:
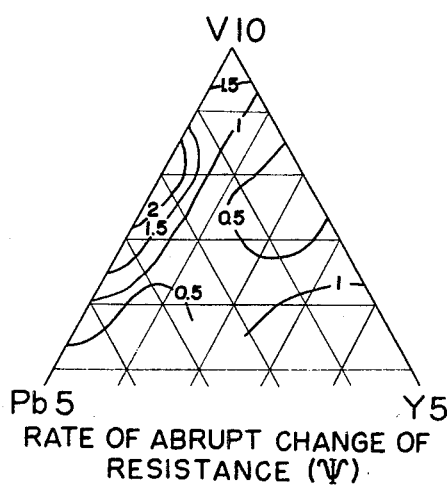
Figure 88:
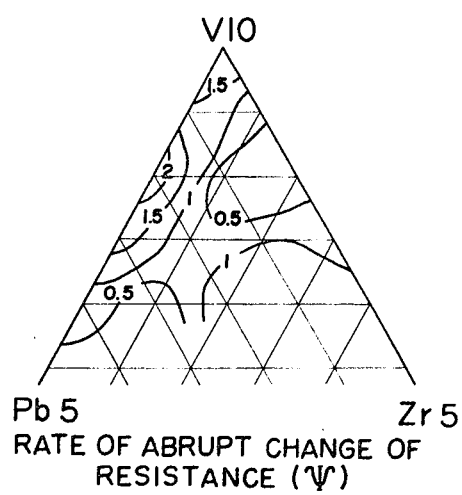
Figure 89:
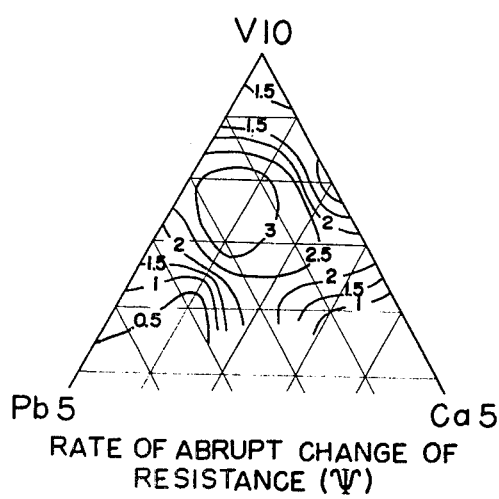
Figure 90:
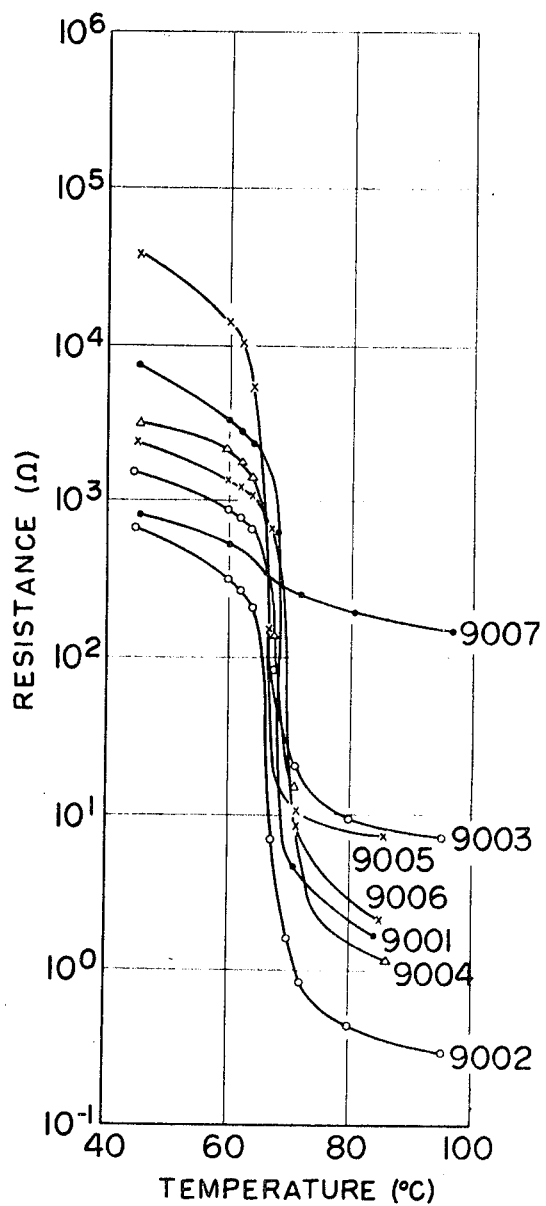
Figure 91:
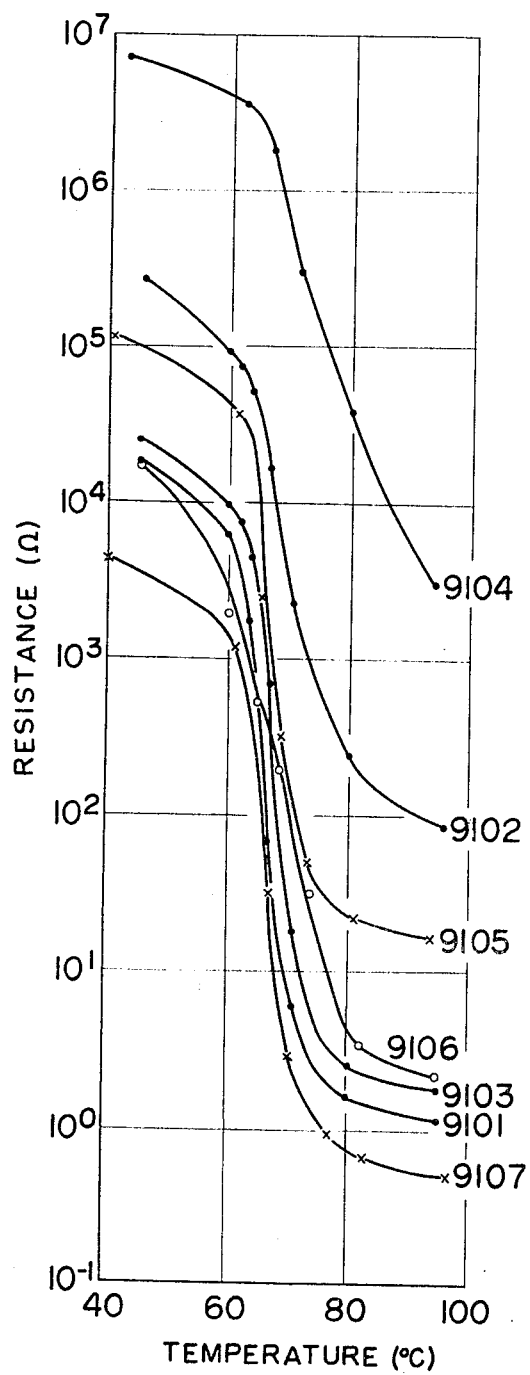
Figure 92:
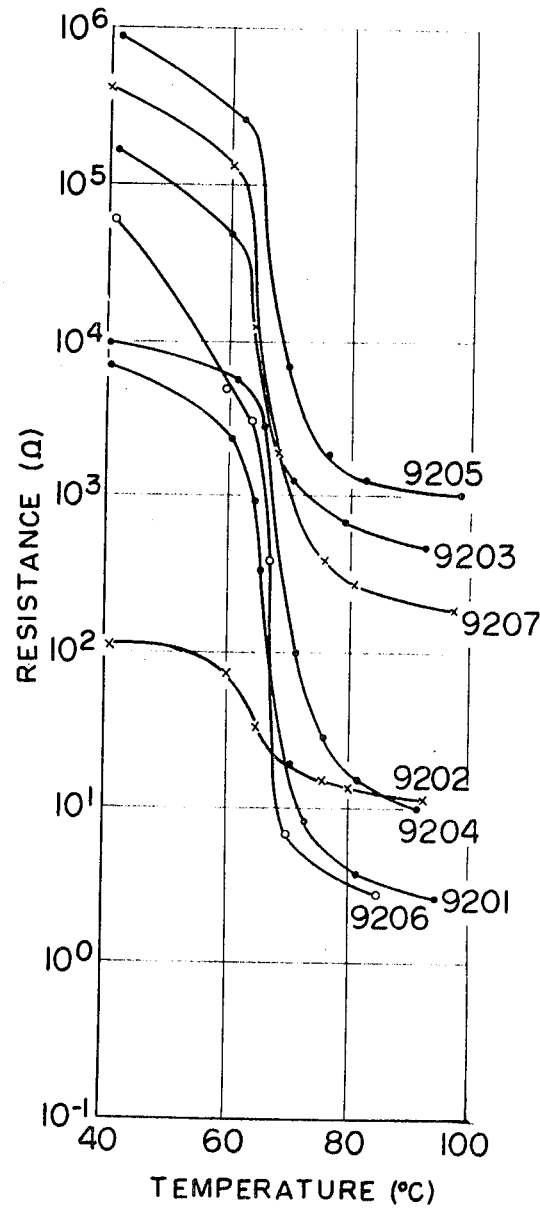

For the sake of convenience in explaining the ternary system specific thermistors, triangular diagrams are employed. This triangular diagram is formed by an equilateral triangle in which the three components are located at each of three vertexes of the triangle, setting the respective vertexes at 100% of each component, while the subtenses to each vertex being set at 0% in the hereinabove described atomic ratio respectively. Take FIG. 41 for instance. The point $a$ signifies that the thermistor is composed of V7:P2:Sr1. (This point is also expressed as V70:P20:Sr10 in atomic ratio or 64% of $V_2O_5$:18% of $P_2O_5$:18% of SrO in mol percent.) In the triangular diagrams, 100% is expressed as 10 for the sake of convenience. The solid lines drawn in the triangular diagram indicate the range of the degree of abrupt change in resistance $\psi$ of the particular thermistors produced from the respective compositions. For example, in FIG. 41, in case the thermistor is composed of V7:P2:Sr1, it is found that the degree of abrupt change in resistance $\psi$ is about 2. Similarly, it will be understood that the particular thermistor fabricated with compositional ratio at the point $b$ has a value of 2.5 and more for its degree of abrupt change in resistance. The triangular diagrams in FIGS. 41–89 have been drawn up on the basis of mean values which have been taken from actually measured values of the degree of abrupt change in resistance $\psi$ of a plurality of specific thermistors in the same lot obtained from the respective compositions shown in the triangular diagrams. The production conditions for the particular thermistors shown in FIGS. 41–62 are identical with the condition A as explained in the previous paragraph concerning the binary system thermistors, while the production conditions for those shown in FIGS. 63–89 are identical with the condition B in the same paragraph.

Figure 97:
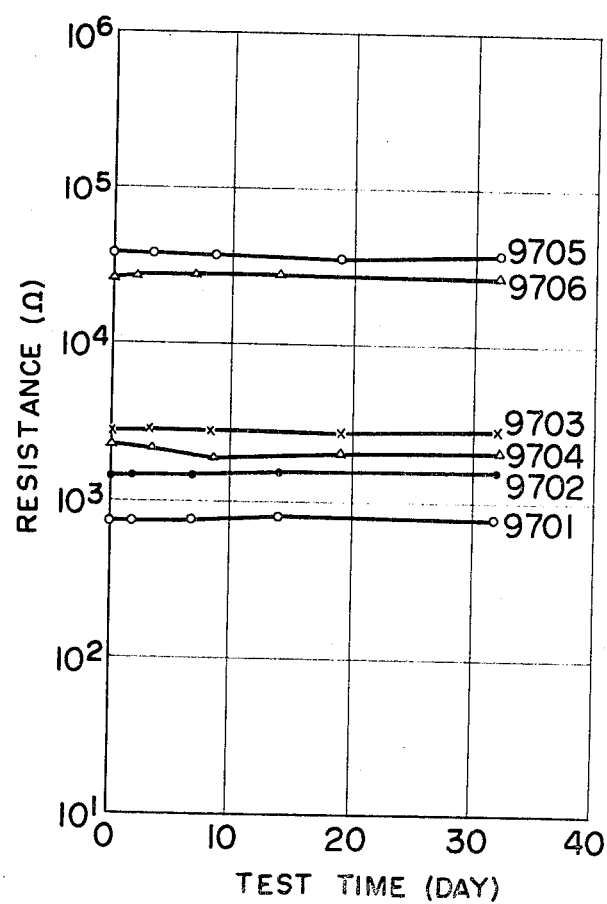
Figure 98:
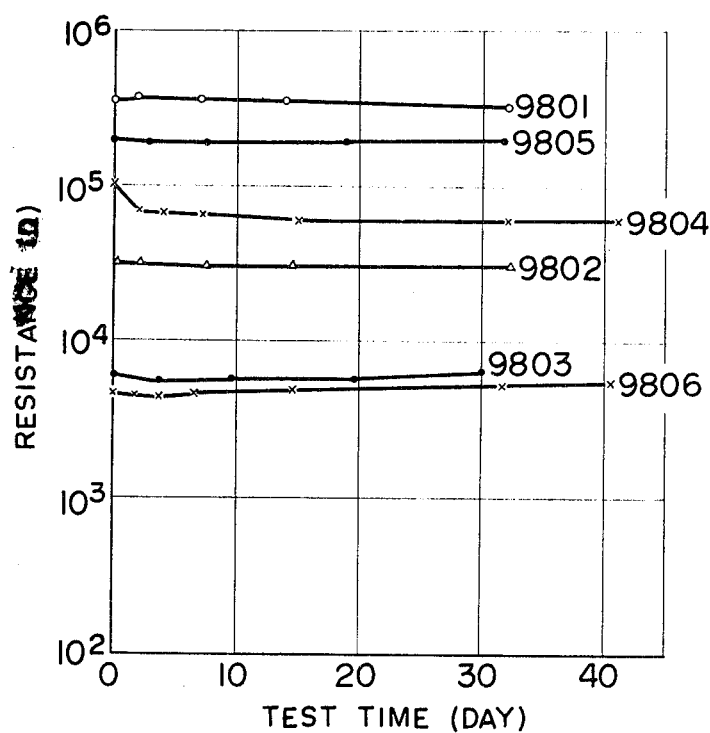
Figure 99:
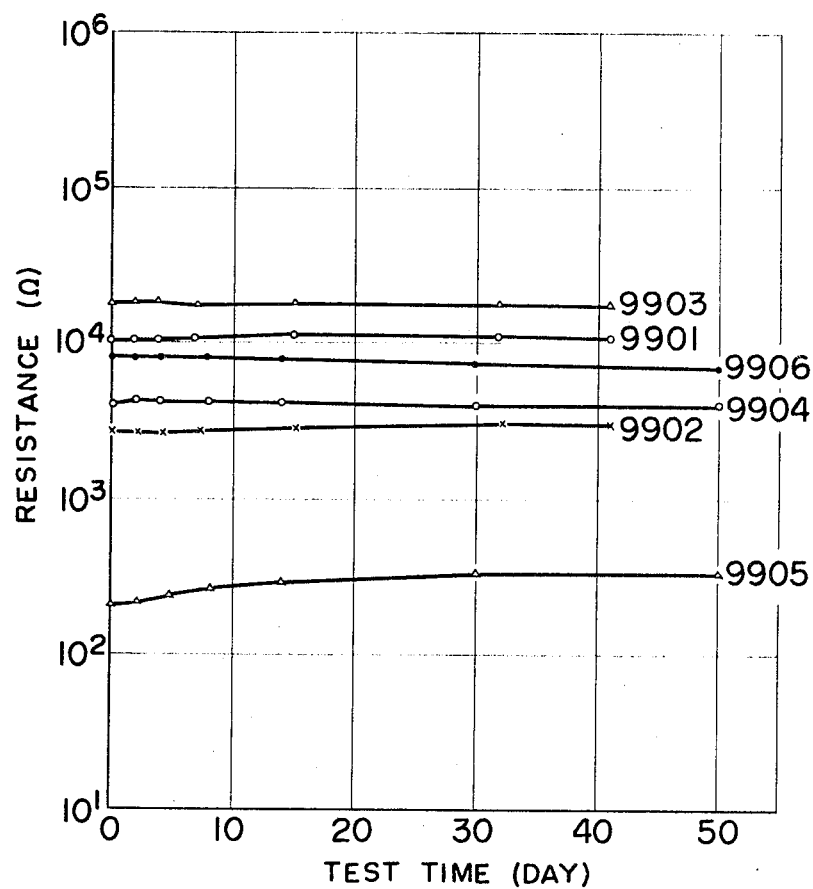
Figure 100:
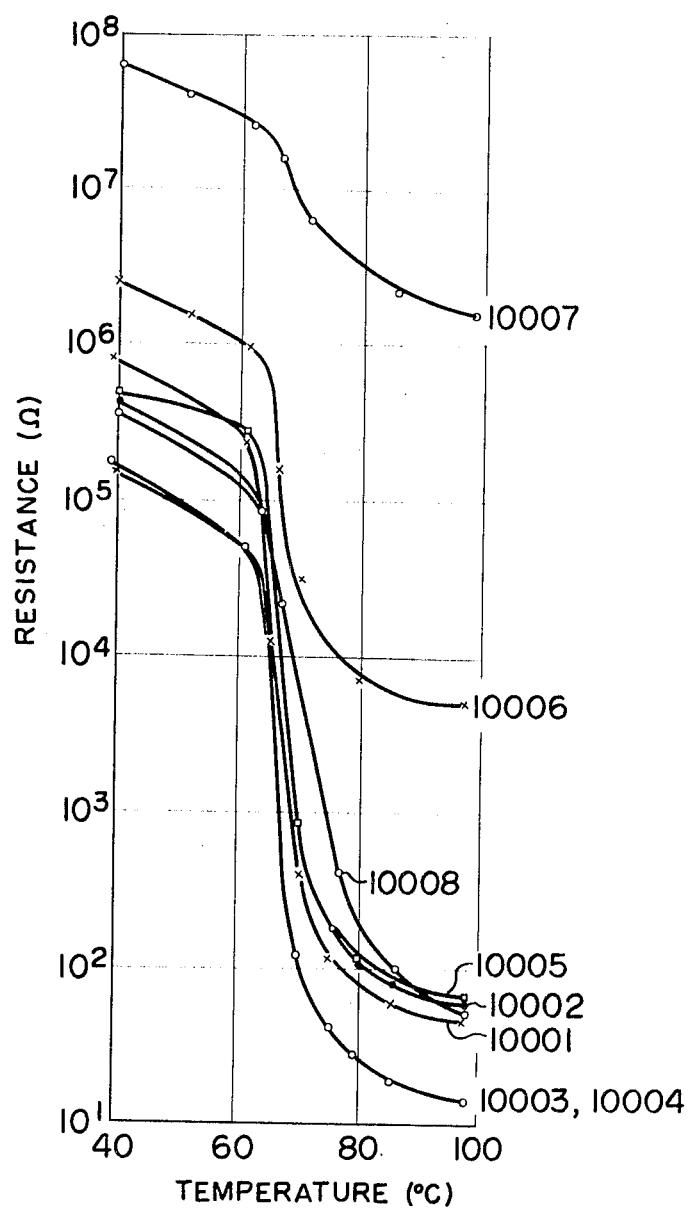

A general review of those triangular diagrams shown in FIGS. 41–89 reveals that, in the composition of, for example, $V_2O_5$, $P_2O_5$ and SrO, and under production condition A a particular thermistor having excellent electric characteristics can be obtained by mixing $V_2O_5$, $P_2O_5$ and SrO so that the atomic ratios of the elements V, P and Sr are 50% or more, 30% or less and 40% or less respectively and the total ratio of the elements other than oxygen may be 100%. The same thing can apply to the particular thermistors made of other compositions and such thermistors are shown in Table 6. FIGS. 90–96 show the resistance-temperature characteristic curves of those particular thermistors which were produced from particularly excellent compositional ratios selected from the respective triangular diagrams. Since the abrupt-changing resistance degree $\psi$ in each triangular diagram is expressed by the mean values, the abrupt-changing resistance degree $\psi$ of particular thermistors shown in FIGS. 90–96 give inevitably different values from those in the diagrams. The characteristic curves of resistance-variation with lapse of time shown in FIGS. 97–99 were obtained from the data based on actual measurement of the particular thermistors which showed the resistance-temperature characteristic curves as in the above stated FIGS. 90 to 96 by continuously leaving the thermistors in air of 150° C. and lowering the temperature down to 40° C. only at the time of measuring the resistance-variations.

complex system. Table 7 explains particular thermistors of quaternary and quinary systems, wherein the compositional ratio is indicated in the same manner as in Table 2. FIG. 100 illustrates resistance-temperature characteristic

TABLE 6

| Two compositions excluding $V_2O_5$ | | Production conditions | Mixing ratio (in the atomic ratio of elements other than oxygen) | | | Characteristics | | |
|---|---|---|---|---|---|---|---|---|
| R | R' | | $V_2O_5$, atomic percent more than | R, atomic percent less than | R', atomic percent less than | Mixing ratio (in the atomic ratio of elements other than oxygen) | Identification No. of resistance-temperature characteristic curves | Identification No. of resistance-variation characteristic curves |
| $P_2O_5$ | SrO | A | 50 | 30 | 40 | V7:P1:Sr2 | 9001 | |
| $P_2O_5$ | $Na_2O$ | A | 50 | 30 | 40 | V8:P1:Na1 | 9002 | 9701 |
| $P_2O_5$ | $B_2O_3$ | A | 50 | 30 | 50 | V8:P1:B1 | 9003 | 9702 |
| $P_2O_5$ | BaO | A | 50 | 30 | 30 | V7:P1:Ba2 | 9004 | 9703 |
| $P_2O_5$ | PbO | A | 50 | 30 | 40 | V7:P1:Pb2 | 9005 | 9704 |
| $P_2O_5$ | $La_2O_3$ | A | 50 | 40 | 40 | V8:P1:La1 | 9006 | 9705 |
| SrO | $Na_2O$ | A | 60 | 40 | 5 | V7:Sr1:Na2 | 9007 | |
| SrO | $B_2O_3$ | A | 40 | 30 | 60 | V7:Sr1:B2 | 9101 | 9706 |
| SrO | MgO | A | 60 | 40 | 20 | V7:Sr2:Mg1 | 9102 | 9801 |
| SrO | $Al_2O_3$ | A | 50 | 30 | 40 | V8:Sr1:Al1 | 9103 | 9802 |
| SrO | PbO | A | 50 | 30 | 40 | V8:Sr1:Pb1 | 9104 | |
| SrO | $SiO_2$ | A | 60 | 40 | 30 | V7:Sr2:Si1 | 9105 | |
| SrO | CaO | A | 60 | 30 | 30 | V8:Sr1:Ca1 | 9106 | |
| SrO | $ZnO_2$ | A | 50 | 30 | 40 | V8:Sr1:Zr1 | 9107 | |
| SrO | $Y_2O_3$ | A | 60 | 30 | 30 | V8:Sr1:Y1 | 9201 | 9803 |
| $Ag_2O$ | SrO | A | 60 | 10 | 10 | V6:Ag3:Sr1 | 9202 | |
| $Ag_2O$ | PbO | A | 60 | 20 | 40 | V6:Ag3:Pb1 | 9203 | |
| $Ag_2O$ | $P_2O_5$ | A | 40 | 50 | 40 | V6:Ag2:P2 | 9204 | |
| PbO | $Al_2O_3$ | A | 50 | 40 | 40 | V7:Pb2:Al1 | 9205 | |
| PbO | MgO | A | 50 | 40 | 40 | V6:Pb2:Mg2 | 9206 | |
| PbO | $SiO_2$ | A | 50 | 40 | 30 | V7:Pb2:Si1 | 9207 | |
| PbO | $La_2O_3$ | A | 60 | 40 | 30 | V6:Pb1:La1 | 9301 | |
| $P_2O_5$ | $Al_2O_3$ | B | 60 | 40 | 40 | V7:P1:Al2 | 9302 | |
| $P_2O_5$ | $Na_2O$ | B | 50 | 40 | 40 | V6:P1:Na3 | 9303 | 9804 |
| $P_2O_5$ | $B_2O_3$ | B | 50 | 10 | 10 | V6:P3:B1 | 9304 | |
| $P_2O_5$ | $La_2O_3$ | B | 50 | 40 | 30 | V6:P2:La2 | 9305 | |
| $P_2O_5$ | BaO | B | 50 | 40 | 30 | V8:P1:Ba1 | 9306 | |
| $P_2O_5$ | PbO | B | 50 | 40 | 40 | V7:P1:Pb2 | 9307 | 9805 |
| $P_2O_5$ | SrO | B | 50 | 40 | 40 | V8:P1:Sr1 | 9401 | |
| SrO | $La_2O_3$ | B | 60 | 30 | 30 | V7:Sr2:La1 | 9402 | |
| SrO | $B_2O_3$ | B | 40 | 30 | 50 | V6:Sr1:B3 | 9403 | 9806 |
| SrO | $Na_2O$ | B | 70 | 30 | 30 | V8:Sr1:Na1 | 9404 | 9901 |
| SrO | MgO | B | 60 | 30 | 40 | V8:Sr1:Mg1 | 9405 | 9902 |
| SrO | $Al_2O_3$ | B | 50 | 30 | 40 | V6:Sr1:Al3 | 9406 | 9903 |
| SrO | PbO | B | 60 | 30 | 40 | V8:Sr1:Pb1 | 9407 | |
| SrO | $SiO_2$ | B | 60 | 30 | 20 | V8:Sr1:Si1 | 9501 | |
| SrO | CaO | B | 60 | 30 | 40 | V8:Sr1:Ca1 | 9502 | |
| SrO | ZrO | B | 60 | 30 | 30 | V7:Sr2:Zr1 | 9503 | |
| SrO | $Y_2O_3$ | B | 60 | 30 | 30 | V7:Sr2:Y1 | 9504 | |
| $Ag_2O$ | SrO | B | 50 | 50 | 30 | V6:Ag3:Sr1 | 9505 | 9904 |
| $Ag_2O$ | PbO | B | 60 | 40 | 40 | V7:Ag2:Pb1 | 9506 | 9905 |
| $Ag_2O$ | $P_2O_5$ | B | 50 | 50 | 30 | V6:Ag3:P1 | 9507 | 9906 |
| PbO | $Al_2O_3$ | B | 60 | 40 | 30 | V7:Pb2:Al1 | 9601 | |
| PbO | $La_2O_3$ | B | 60 | 40 | 20 | V6:Pb3:La1 | 9602 | |
| PbO | MgO | B | 60 | 30 | 40 | V7:Pb2:Mg1 | 9603 | |
| PbO | $SiO_2$ | B | 60 | 30 | 30 | V7:Pb2:Si1 | 9604 | |
| PbO | $Y_2O_3$ | B | 60 | 40 | 30 | V8:Pb1:Y1 | 9605 | |
| PbO | ZrO | B | 60 | 40 | 20 | V8:Pb1:Zn1 | 9606 | |
| PbO | CaO | B | 50 | 40 | 40 | V8:Pb1:Ca1 | 9607 | |

In the "mixing ratio" in the above Table 6, the manner of indicating the compositional ratio has followed the same way as in Table 2.

In the foregoing, the binary as well as ternary system particular thermistors have been described. It is to be noted that, in any case, the optimum mixing ratio of the components are not so much affected by the reduction conditions. The sintering treatment is conducted in an inert or reducing atmosphere, the reason for which is that $V_2O_4$ crystals are very easily oxidized to be $V_2O_5$ in a high temperature air by the following chemical reaction.

$$2V_2O_4 + O_2 \rightarrow 2V_2O_5$$

On account of this fact, in order to maintain $V_2O_4$ crystals the thermistor body, it is necessary to conduct the sintering treatment in the above-mentioned atmosphere. In the above explanations, no mention was made on sinter-treating time. Since the present inventors have found that electric characteristics were not affected to a remarkable extent even when the sinter-treatment was conducted by properly selecting the time within the range of from about 5 seconds to about 30 minutes; hence no explanation. In other words, this is nothing but a proof that sinter-treatment is necessary process to meet the purpose of this invention.

Figure 101:
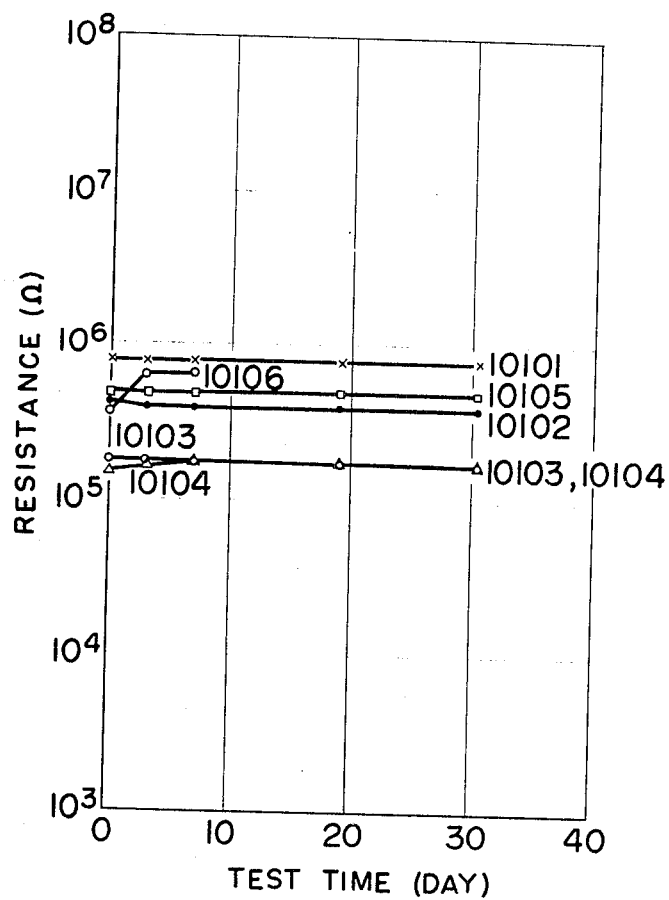

It is to be understood that the present invention is not only limited to the particular thermistors of ternary system or less, but also it is applicable to thermistors of curves of the particular thermistors described in Table 7, and FIG. 101 indicates the characteristic curves of resistance-variation with lapse of time.

TABLE 7

| Compositional ratio (in the atomic ratio of elements other than oxygen) | Production conditions | Identification No. of characteristic curves | |
|---|---|---|---|
| | | Resistance-temperature characteristic curve | Resistance-variation characteristic curve |
| V7:P1:Sr1.5:Pb0.5 | A | 10001 | 10101 |
| V7:P1:Sr1.5:Al0.5 | A | 10002 | 10102 |
| V7:P1:Sr1:Pb1 | A | 10003 | 10103 |
| V7:P1:Sr1:Pb0.5:Al0.5 | A | 10004 | 10104 |
| V7:P1:Sr1.5:Pb0.5 | B | 10005 | 10105 |
| V7:P1:Sr1.5:Al0.5 | B | 10006 | |
| V7:P1:Sr1:Al1 | B | 10007 | |
| V7:P1:Sr1:Pb0.5:Al0.5 | B | 10008 | 10106 |

The production conditions A and B shown in Table 7 are identical with the conditions A and B explained in the foregoing with respect to the binary system thermistors.

So far, the electric characteristics of the particular thermistors according to the present invention which are produced respectively from a mixture of $V_2O_5$ and one other oxide (binary system), $V_2O_5$ and two other oxides (ternary system) as well as $V_2O_5$ and three or more kinds of other oxides (complex system) have been explained. Most of the binary system particular thermistors undergo large variations in the characteristics of resistance-variation, on the other hand the resistance-variations can scarcely be observed with the particular thermistors of ternary or more complex system.

This is supposedly due to the facts that compounds such as $P_2O_5$, SrO, BaO, AgO or the like which is present in those binary system particular thermistors whose characteristics of resistance-variation with lapse of time are comparatively stable is added as one of the components in the particular thermistors of ternary or more complex system and that, when the above-mentioned component group is assumed as the second component, the third component oxides except for the said second component oxides collaborate with said second component oxides to stabilize the electric characteristics of the thermistors.

In the foregoing paragraphs, the particular thermistors of the present invention and the methods of fabricating the same have been explained in details. It is now clear that the particular thermistors of the present invention are entirely different in their compositions from the conventionally known thermistors and have very unique resistance-temperature characteristics. As regards the methods of fabricating the present particular thermistors, two methods have been shown: the first method comprises mixing $V_2O_5$ and other oxides (including those substances which are convertible into oxides thereof through chemical reactions or thermal decomposition reactions), reducing the mixture, thereafter shaping the mixture and finally subjecting the shaped material to a sinter-treatment in an inert or reducing atmosphere; the second method comprises first shaping the mixture of $V_2O_5$ and other oxides and then sintering the shaped mixture in a reducing atmosphere. Besides these two methods, there are also available other method for obtaining the particular thermistors of the present invention, as described hereinbelow.

For example, in case a ternary system particular thermistor is to be obtained, two components, i.e. $V_2O_5$ and an oxide are first reduce-treated and then the remaining one oxide is mixed with the substance resulted from reduction of the two components, after which the mixture is shaped into a desired form and sinter-treated in an inert or reducing atmosphere. In another method, vanadium oxide in which the mean valence value of the vanadium is below five valence but not less than four valence is mixed with other oxides, and the mixture is formed and sintered as same as the aforementioned first or second method. Comparative experiments conducted on these methods have indicated that these methods produce similar results as described in the foregoing examples with respect to the present invention. When the particular thermistors obtained in this way were examined by an X-ray diffraction method, conspicuous peaks of $V_2O_4$ crystals were also observed. This fact testifies that crystalline particles of $V_2O_4$ are contained in the present particular thermistors.

Figure 102:
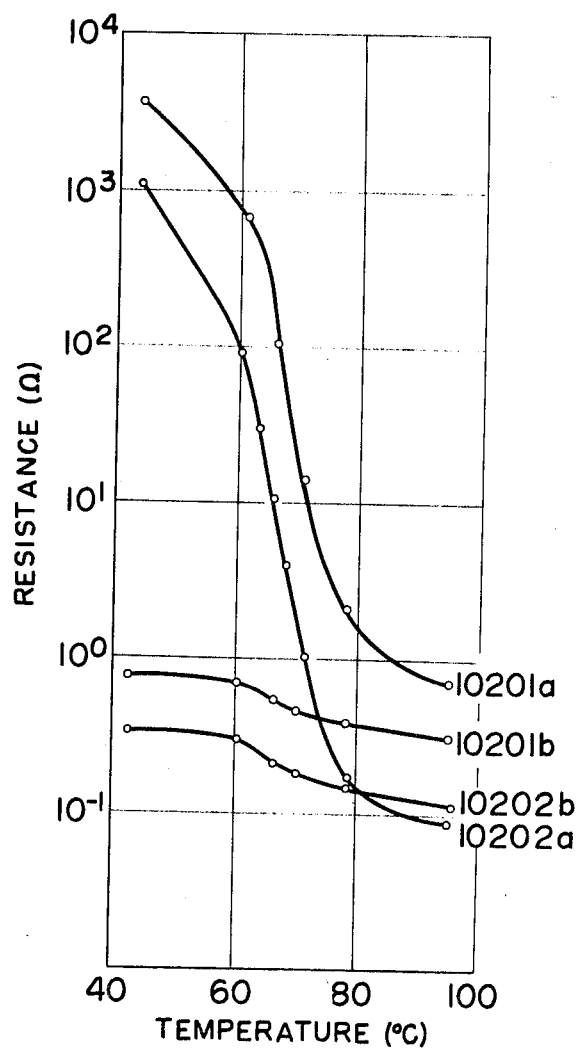
FIG. 102 is the resistance-temperature characteristic curves illustrating the difference of electric characteristics with the change of sinter-treating conditions (cooling conditions after the sinter-treating) of the present oxide semiconductors.

There is involved a step of sintering treatment in the manufacture of the particular thermistors, and it is essentially required to take out for cooling the particular thermistors sintered from the sintering furnace after completion of sintering treatment. In regard to this cooling, a brief mention was made in the foregoing paragraph. It is found that, in the case of fabricating the particular thermistors of the present invention, abrupt cooling of the sintered substance irrespective of the compositions of substance or configuration of the elements would possibly provide a particular thermistor having a large abrupt-changing resistance degree $\psi$. FIG. 102 shows the resistance-temperature characteristic curves of the particular thermistors subjected to such experiments. In this figure, the curves 10201a and 10202a are those of bead type particular thermistors which are obtained in accordance with the block diagram of FIG. 4, wherein at the time of cooling the sintered substance, it was quenched immediately after taken out of the sintering furnace; and the curves 10201b and 10202b are those of the particular thermistors which are produced by the same process as mentioned above up to the sinter-treatment and the cooling after sintering treatment was done by stopping heating of the sintering furnace so that the substance may be gradually cooled down in said furnace. As is apparent from those curves, quench-cooling renders the particular thermistors to have extremely large values of $\psi$. Although definite reasons therefor remain unaccounted for, the following factors are supposed to be involved. Namely $V_2O_4$ which contains other oxides take the form of crystal at high temperature above 700° C., but at a lower temperature than that, $V_2O_4$ crystals are either decomposed by themselves or reacted with other oxides, compounds, etc. which are present in the mixture with the result that the crystal structure of $V_2O_4$ is changed to form a substance different from $V_2O_4$. On the contrary, a quench-cooling would suddenly plunge a particular thermistor which is in a highly heated state into a low (normal) temperature state, with the consequence that $V_2O_4$ crystals in the particular thermistor are solidified and remain in their crystalline form.

Considering from the experimental results, 30° C./sec. or over might be suitable as the said cooling speed. This value, however, is not a critical one. Furthermore, in view of that the crystalline $V_2O_4$ are decomposed or reacted with other oxides etc. at a temperature below 700° C., it is necessary that the sinter-treatment is performed at a temperature more than 700° C. However the sintering temperature must not exceed the melting point of $V_2O_4$ crystalline.

Figure 103:
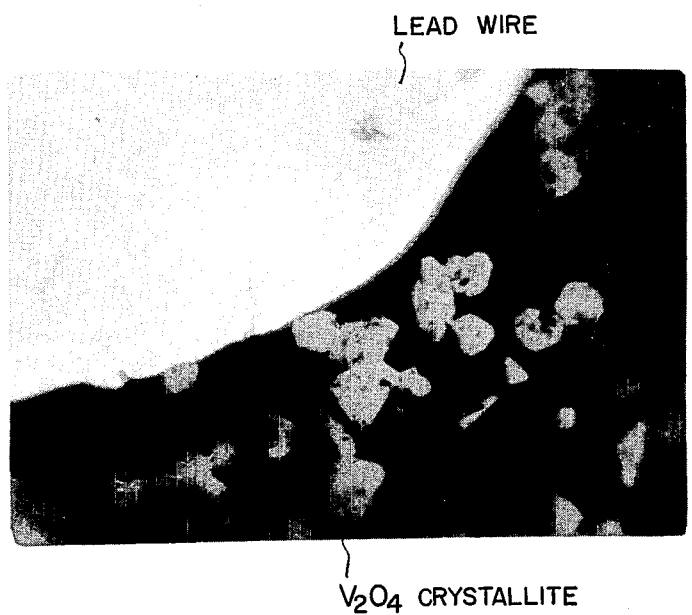
FIG. 103 is a microphotograph of a section of the present oxide semiconductor.

FIG. 103 is a microphotograph of a section of the particular thermistor to show in what form each of the thermistor compositions is present in the thermistor; the photograph is taken at 800 magnifications. As shown in the figure, a plurality of the fine crystalline particles is enclosed by said oxide substance. This oxide substance including vanadium pentoxide and other oxides has semi-conductive or resistive characteristics like glass-thermistors and connects electrically the crystalline particles of $V_2O_4$ to each other.

Figure 105:
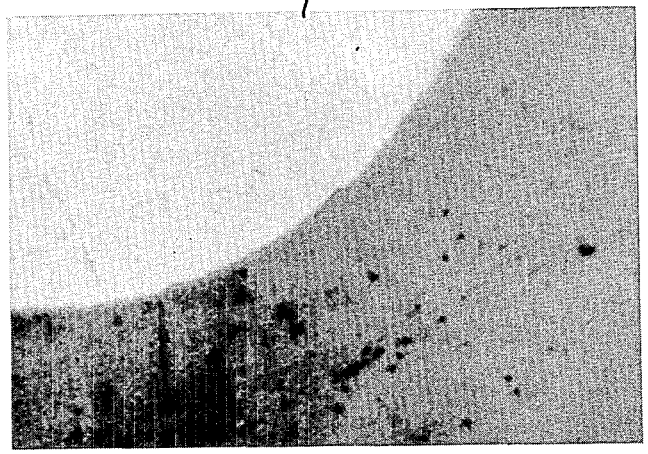
FIGS. 105 and 106 are the micro photographs respectively showing sections of glass thermistor and ordinary thermistor.
Figure 106:
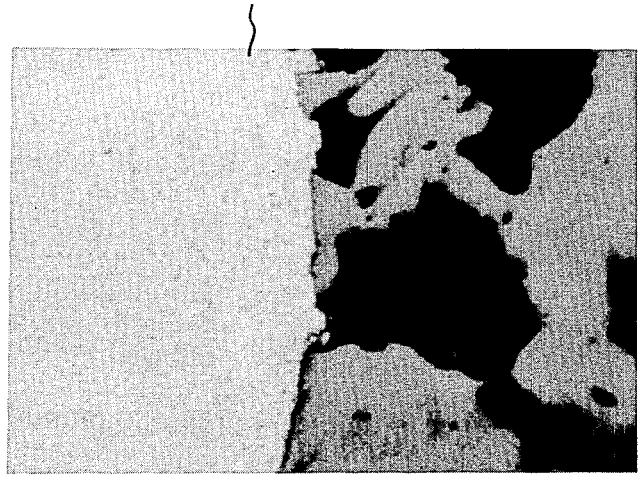

For the sake of reference, microphotographs of sections of glass-thermistor and ordinary thermistor of known type are shown in FIGS. 105 and 106, the respective microphotographs having been taken at 800 magnifications. From FIG. 105, it is seen that the compositions which constitute the glass-thermistor are completely molten and vitrificated. Also, from FIG. 106, it is seen that the compositions constituting the ordinary thermistor are perfectly sintered and no crystalline particles can be ascertained. Therefore, the present inventors made further studies about the $V_2O_4$ crystals. As mentioned in the foregoing, $V_2O_4$ crystals greatly contribute to the electric characteristics of the oxide semi-conductors of the present invention. In the following, a result of quantitative analysis of the degree in which the $V_2O_4$ crystals contribute to the electric characteristics. That is, an element which shows abrupt change in resistance is placed in a liquid of sulfuric acid ($H_2SO_4$) and heated to about 300° C., thereafter the quantity of the element dissolved into the liquid of sulfuric acid is calculated by titration with potassium permanganate, i.e., the quantity of $V^{4+}$ (or $V_2O_4$) mixed in the abovementioned element is calculated from the quantity of potassium permanganate consumed for the titration. Some of the exemplary results are shown in the following Table 8.

TABLE 8

| Mixing ratio of components, ratio of V⁴⁺ | V⁴⁺/V total Minimum (atomic percent) | V⁴⁺/V total Maximum (atomic percent) |
|---|---|---|
| V10 | 80 | 100 |
| V9:P1 | 5 | 100 |
| V7:Ag3 | 50 | 100 |
| V7.5:Pb2.5 | 5 | 100 |
| V7.5:Sr2.5 | 5 | 100 |
| V7:Sr2:Si1 | 30 | 100 |
| V7.1:Sr1.8:Pb1.1 | 5 | 100 |

The above data have been obtained as a result of chemical assay of particular thermistors which show the value of 0.5 and above for the degree of abrupt change in resistance $\psi$. It will be understood from the above table that, in order to obtain peculiar electric characteristics, $V^{4+}$ or $V_2O_4$ crystals should be an indispensable substance for constituting the particular thermistors. In this connection, it has been factually verified that the abovementioned $V_2O_4$ is inevitably produced by the practice of the present invention.

It will be clearly understood from the foregoing description that the particular thermistors of the present invention comprises sintered bodies of an oxide substance and a plurality of fine crystalline particles of $V_2O_4$ suspended in said oxide substance, said oxide substance being composed of vanadium pentoxide, other low-valence vanadium oxides, other oxides and/or complex oxide thereof and that they have peculiar resistance-temperature characteristics, whereby the resistance value undergoes sharp decrease when the temperature reaches a specific level, i.e., about 65° C.–70° C. and that they have extremely large temperature coefficient of negative resistance within the said temperature range, and that they are the elements having stable electric characteristics in all respects. Although there are many methods for the production of the particular thermistors of the present invention, the fundamental principle thereof lies in the preparation of the sintered bodies of complex oxides consisting of more than two components including $V_2O_4$ crystals by subjecting a complex mixture consisting of vanadium oxides and other compounds and being shaped in a desired form to at least reducing and sintering treatments.

In the description, there are two methods to describe the compositions of the particular thermistor. One is to show them with the mol ratio (percent) of the oxide and the other is with atomic ratio of the elements other than oxygen. The former is convenient to weight the starting materials, yet it has the disadvantage of changing the valance value or shifting the value from the stoichiometric value in the elements of the materials by the reduction treatment during manufacturing process. So it is not suitable for the description of the finished elements composition.

On the other hand, the latter method that is atomic ratio is suitable for the method to describe the composition of the finished products because it does not change its value before and after the reducing or oxidizing processes, as it uses the ratio of the elements other than oxygen, for example, P, Sr, Pb, Ba, etc. in the materials.

While, it is easy to convert the value of the two methods as follows: For instance: $V_2O_5$ and $P_2O_5$ are both containing V and P2 gram atoms respectively in 1 mol each. So $V_2O_5 90:P_2O_5 10$ in mol ratio is also able to be shown as V90:P10 in atomic ratio. On the contrary, in the case of $V_2O_5$ and BaO, attention should be paid to that Ba element which is contained in the 1 mol BaO is 1 gram atoms, so $V_2O_5$ 66.7:BaO33.3=$V_2O_5$:BaO1 in mol rate is to be described as V4:Ba1=V80:Ba20 in atomic rate.

Although the invention has been described with respect to preferred embodiments thereof, the present invention is not limited to these examples, but combination of the particular thermistor compositions can be optionally changed as well as any production method can be selectively adopted within the full intended scope of the present invention.

What is claimed is:

1. A method for manufacturing a thermistor composition comprising the steps of heating an oxide composition comprising not less than 25% of oxidized penta-valent vanadium in atomic ratio of elements other than oxygen included in said oxide composition as a principal constituent in a reducing atmosphere to a temperature below 670° C. for such a period of time that the mean value of the oxygen/vanadium ratio of vanadium oxides included in the oxide composition is changed to a value below 5/2 but not less than 4/2; and then heating the resulting oxide composition in an inert atmosphere to a temperature above 700° C. but below the melting point of vanadium tetra-oxide $V_2O_4$ for a period of time sufficient to segregate fine crystalline particles of oxide of tetra-valent vanadium in the oxide composition.

2. A method according to claim 1, wherein said oxide composition further comprises at least one oxide selected from the group consisting of oxides of phosphorus, barium, strontium, lead, silver, lithium, sodium, potassium, beryllium, magnesium, calcium, lanthanum, cerium, zirconium, zinc, cadmium, boron, aluminum, silicon, tin, bismuth, uranium and yttrium.

3. A method according to claim 2, wherein said reducing atmosphere contains one medium selected from the group consisting of ammonia, benzene, methyl alcohol, ethyl alcohol, sulfur dioxide, furfural, toluene and xylene.

4. A method according to claim 1, further comprising the step of quench-cooling the oxide composition, immediately after heating in the inert atmosphere, from the temperature above 700° C. to room temperature thereby to effect quick cooling to solidify said fine crystalline particles in the oxide composition.

5. A method according to claim 1, in which said step of heating in the inert atmosphere is performed at a temperature range of from 1,000 to 1,300° C.

6. A method according to claim 1, wherein said oxide composition before the step of heating in the reducing atmosphere further comprises one oxide selected from the group consisting of oxides of up to 30% of phosphor[o]us, up to 60% of barium, up to 60% of strontium, up to 60% of lead, up to 70% of silver, up to 50% of lithium, up to 35% of sodium, up to 30% of potassium, up to 60% of beryllium, up to 75% of magnesium, up to 60% of calcium, up to 50% of lanthanum, up to 70% of cerium, up to 70% of zirconium, up to 70% of zinc, up to 70% of cadmium, up to 60% of boron, up to 50% of aluminum, up to 75% of silicon, up to 75% of tin and up to 60% of uranium, the ratios of elements being expressed in atomic ratio of elements other than oxygen included in said oxide composition substance, respectively.

7. A method according to claim 1, wherein said oxide composition before the step of heating in the reducing atmosphere is composed essentially of pentoxide of more than 40% of vanadium and at least two oxides selected from the group consisting of oxides of up to 40% of phosphorus, up to 40% of strontium, up to 40% of lead, up to 50% of silver, up to 40% of sodium, up to 40% of magnesium, up to 40% of calcium, up to 40% of lanthanum, up to 30% of zirconium, up to 40% of zinc, up to 60% of boron, up to 40% of aluminum, up to 30% of silicon, and up to 30% of yttrium, the ratios of elements being expressed in atomic ratio of the elements other than oxygen included in said oxide composition respectively.

8. A method according to claim 1, wherein said oxide composition before the step of heating in the reducing atmosphere is composed essentially of pentoxide of more than 40% of vanadium and the balance of two oxides selected from the group consisting of oxide of phosphorus, silver, lead and strontium, the ratios of the elements of said selected two oxides not exceeding 50% in said oxide composition, the ratios of said elements being expressed in atomic ratio of elements other than oxygen.

9. A method according to claim 1, wherein said oxide composition before the step of heating in the reducing atmosphere is composed essentially of pentoxide of more than 40% of vanadium, a first oxide of up to 50% of an element selected from the first group consisting of strontium, phosphorus, silver and lead, and a second oxide selected from the second group consisting of oxides of up to 40% of sodium, up to 60% of boron, up to 30% of barium, up to 40% of lanthanum, up to 40% of magnesium, up to 40% of aluminum, up to 30% of zirconium, up to 30% of yttrium, up to 30% of silicon, up to 40% of calcium and up to 40% of zinc, the ratios of elements being expressed in atomic ratio of elements other than than oxygen included in said oxide composition respectively.

10. A method according to claim 1, in which said oxide composition before the step of heating in the reducing atmosphere is prepared by the step of firing in air a mixture consisting essentially of vanadium pent-oxide as a main constituent and at least one material selected from the group of phosphoric acid, strontium carbonate, sodium carbonate, potassium carbonate, calcium carbonate, lithium carbonate, barium carbonate, barium nitrate, boric acid, diammonium hydrogen phosphate and uranium dioxynitrate at a temperature high enough to oxidize the selected material.

11. A method for manufacturing a thermistor comprising the steps of pulverizing and oxide composition consisting essentially of an oxide of not less than 25% of pentavalent vanadium and the balance of at least one oxide selected from the group consisting of oxides of phosphorus, barium, strontinum, lead, silver, lithium, sodium, potassium, beryllium, magnesium, calcium, lanthanum cerium, zirconium, zinc, cadmium, boron, aluminum, silicon, tin, bismuth, uranium, and yttrium, said ratio of the vanadium being expressed in atomic ratio of elements other than oxygen included in the oxide composition heating the pulverized oxide composition in a reducing atmosphere including one medium selected from the group consisiting of ammonia, benzene, methyl alcohol and ethyl alcohol to a temperature below 670° C. for such a period of time as to reduce the vanadium pentoxide to vanadium oxide in which the mean valence value of vanadium is below pentavalence value but not less than tetra-valence value, again pulverizing the reduced oxide composition, forming the oxide composition again pulverized into a desired shape with a plurality of electrical leads each extending outwardly from the shaped oxide composition, and sintering the shaped oxide composition in an inert atmosphere at a temperature above 700° C. but below the melting point of vanadium tetra-oxide $V_2O_4$ for a period of from 5 seconds to 30 minutes and sufficient to segregate fine crystalline particles of oxide of tetra-valent vanadium in the oxide composition.

12. A method for fabricating a thermistor comprising the steps of: mixing a composition consisting essentially of vanadium oxide the mean value of oxygen/vanadium ratio of which is considerably below 5/2 but not less than 4/2 with at least one oxide selected from the group consisting of oxide of phosphorus, barium, strontium, lead, silver, lithium, sodium, potassium, beryllium, magnesium, calcium, lanthanum, cerium, zirconium, zinc, cadmium, boron, aluminum, silicon, tin, bismuth, uranium and yttrium so that the resulting mixture includes an oxide of at least 25% of vanadium and the balance of the oxide selected from said group in atomic ratio of elements other than oxygen included in the mixture, forming the mixture into a desired shape, and heating the shaped mixture in an inert atmosphere to a temperature above 700° C. but below the melting point of vanadium tetraoxide $V_2O_4$ for a period of at least 5 seconds and sufficient to segregate fine crystalline particles of oxide of tetravalent vanadium in the mixture.

13. A method of fabricating a thermistor comprising the steps of heating a mixture consisting essentially of a vanadium pent-oxide and at least one compound selected from the group consisting of oxides of phosphorus, barium, strontium, lead, silver, lithium, sodium, potassium, beryllium, magnesium, calcium, lanthanum, cerium, zirconium, zinc, cadmium, boron, aluminum, silicon, tin, bismuth, uranium and yttrium, phosphoric acid, diammonium hydrogen phosphate, cabonates of strontium, sodium, potassium, calcium, lithium and barium, barium nitrate, boric acid, uranium dioxynitrate, and $La_2(C_2O_4)9H_2O$, in an oxidizing atmosphere to a temperature above 670° C. for a period of time sufficient to obtain a mixture including an oxide of not less than 25% of penta-valent vanadium and the balance of the oxide of the element selected from the group consisting of phosphorus, barium, strontium, lead, silver, lithium, sodium, potassium, beryllium, magnesium, calcium, lanthanum, cerium, zirconium, zinc, cadmium, boron, aluminum, silicon, tin, bismuth, uranium and yttrium, said ratio of vanadium being expressed in atomic ratio elements other than oxygen included in the mixture, pulverizing the resulting mixture, heating the pulverized mixture in a reducing atmosphere to a temperature below 670° C. for such a period of time that the vanadium pentoxide is converted to vanadium oxide the mean value of the oxygen/vanadium ratio of which is below 5/2 but not less than 4/2, forming the reduced mixture into a desired shape, and heating the shaped mixture in an inert atmosphere to a temperature above 700° C. but below the melting point of vanadium tetraoxide $V_2O_4$ for a period of time sufficient to segregate fine crystalline particles of vanadium tetraoxide $V_2O_4$ in the mixture.

14. A method according to claim 13, in which said reducing atmosphere contains one medium selected from the group consisting of ammonia, benzene, methyl alcohol, ethyl alcohol, sulfur dioxide, furfural, toluene and xylene.

15. A method according to claim 13, comprising the step of quench-cooling the mixture heated in the inert atmosphere from the temperature above 700° C. to room temperature thereby to effect quick cooling to solidify said fine crystalline particles in the mixture.

16. A thermistor comprising:
  a sintered body composed substantially of a semiconductive oxide substance including at least one oxide selected from the group consisting of phosphorus, strontium, barium, lead, silver, lithium, sodium, potassium, beryllium, magnesium, calcium, lanthanum, cerium, zirconium, zinc, cadmium, boron, aluminum, silicon, tin, bismuth, uranium, and yttrium, and
  fine crystalline particles of vanadium tetraoxide $V_2O_4$ embedded in said oxide substance, the amount of vanadium in said sintered body being not less than 25% in atomic ratio of elements other than oxygen included in the sintered body; and
  a plurality of electrode means connected with said sintered body.

17. A thermistor according to claim 16, in which said oxide substance includes vanadium pentoxide.

18. A thermistor according to claim 16, in which said oxide substance is vitrified.

19. A thermistor comprising:
  a body composed substantially of an oxide substance containing vanadium oxide and at least one oxide selected from the group consisting of phosphorus, strontium, barium, lead, silver, lithium, sodium, potassium, beryllium, magnesium, calcium, lanthanum, cerium, zirconium, zinc, cadmium, boron, aluminum, silicon, tin, bismuth, uranium, and yttrium, and
  fine crystalline particles consisting essentially of vanadium tetraoxide $V_2O_4$, said plurality of fine crystalline particles being embedded in and electrically connecting with said oxide substance,
  the amount of vanadium in said body being not less than 25% in atomic ratio of elements other than oxygen included in the body, the means value of the oxygen/vanadium ratio of vanadium oxide included in said body being below 5/2 but not less than 4/2; and a plurality of electrode means connected with said body.

20. A thermistor according to claim 19, in which the amount of the tetravalent vanadium is not less than 5% in atomic ratio of elements other than oxygen included in said body.

21. A circuit element having an abrupt negative temperature coefficient of electrical resistance thereof over a specific temperature comprising: a sintered body composed substantially of fine crystalline particles and a semiconductive substance of vitrified oxides enclosing and electrically connecting with said fine crystalline particles, said crystalline particles being composed substantially of oxide of tetra-valent vanadium, the amount of the tetra-valent vanadium being not less than 5% in atomic ratio of elements other than oxygen in said sintered body; and a plurality of electrode means connected with said sintered body.

22. A circuit element comprising a body composed substantially of a semiconductive substance and fine crystalline particles of vanadium oxide which have a specific abrupt-changing temperature range and which are embedded in said semiconductive substance, the amount of vanadium included in said body being not less than 25% in atomic ratio of elements other than oxygen; and a plurality of electrode means connected with said body.

23. A method according to claim 1, wherein said temperature in the step of heating in the reducing atmosphere is not more than 400° C.

24. A method according to claim 1, wherein said inert atmosphere consists essentially of nitrogen.

25. A method according to claim 1, further comprising the step of cooling the oxide composition heated in the inert atmosphere at a rate of at least about 30° C./sec., thereby solidifying said fine crystalline particles in the oxide composition.

26. A method for manufacturing a thermistor composition comprising the steps of heating an oxide composition comprising an oxide of not less than 25% of penta-valent vanadium in atomic ratio of elements other than oxygen included in said oxide composition in a first reducing atmosphere to a temperature below 670° C. and heating the resulting oxide composition in an inert or a second reducing atmosphere to a temperature above 700° C. but below the melting point of vanadium tetraoxide $V_2O_4$, at which at least one part of the oxide composition melts for a period of time sufficient to segregate fine crystalline particles of vanadium tetraoxide $V_2O_4$ in the molten oxide composition, said steps of heating in the first reducing atmosphere and in the inert or second reducing atmosphere being carired out for such a period of time that the mean valence value of vanadium in said oxide composition does not become lower than the tetra-valence value.

27. A method according to claim 29, wherein said first reducing atmosphere contains one medium selected from the group consisting of ammonia. benzene, methyl alcohol, ethyl alcohol, sulfur dioxide, furfural, toluene and xylene, and said inert or second reducing atmosphere contains one medium selected from the group consisting of nitrogen, ammonia, benzene, methyl alcohol, ethyl alcohol, sulfur dioxide, furfural, toluene and xylene.

28. A method according to claim 26, further comprising the steps of cooling the oxide composition heated in the inert or second reducing atmosphere at a rate of at least about 30° C./sec., thereby solidifying said fine crystalline particles in the oxide composition.

29. A method according to claim 26, wherein said oxide composition further comprises at least one oxide selected from the group consisting of oxides of phosphorus, barium, strontium, lead, silver, lithium, sodium, potassium, beryllium, magnesium, calcium, lanthanum, cerium, zirconium, zinc, cadmium, boron, aluminum, silicon, tin, bismuth, uranium and yttrium.

30. A method for manufacturing a thermistor comprising the steps of:
preparing and consisting essentially of vanadium oxide and the balance of at least one oxide selected from the group consisting of oxides of phosphorus, barium, strontium, lead, silver, lithium, sodium, potassium, beryllium, magnesium, calcium, lanthanum, cerium, zirconium, zinc, cadmium, boron, aluminum, tin, bismuth, uranium and yttrium, the mean value of oxygen/vanadium ratio of said vanadium oxide being below 5/2 but not less than 4/2, the mixture including at least 25% of oxidized vanadium in atomic ratio of elements other than oxygen included therein;
forming the mixture into a desired shape; and
heating the shaped mixture in an inert or a reducing atmosphere to a temperature above 700° C. but below the melting point of vanadium tetraoxide $V_2O_4$ and for such a period of time that the mean valence of vanadium in the mixture does not become lower than tetra-valence value.

31. A method for manufacturing a thermistor composition comprising the steps of preparing a composition consisting essentially of not less than 25% of oxidized penta-valent vanadium and the balance of at least one oxide selected from the group consisting of oxides of phosphorus, barium, strontium, lead, silver, lithium, sodium, potassium, beryllium, magnesium, calcium, lanthanum, cerium, zirconium, zinc, cadmium, boron, aluminum, silicon, tin, bismuth, uranium, and yttrium, the ratios of oxides being expressed in atomic ratio of elements other than oxygen included in the composition, heating the composition in a first reducing atmosphere including at least one material selected from the group consisting of ammonia, benzene, methyl alcohol, ethyl alcohol, sulfur dioxide, furfural, toluene and xylene for a time period such that the vanadium pentoxide is converted to vanadium oxide, the mean value of the oxygen/vanadium ratio of the vanadium oxide being below the true stoichiometric value of vanadium pentoxide but not less than that of vanadium tetraoxide ($V_2O_4$) at an appropriate temperature, and heating the resulting composition in an inert or a second reducing atmosphere to a temperature above 700° C. but below the melting point of vanadium tetraoxide ($V_2O_4$) for such a period of time as to segregate fine crystalline particles consisting essentially of vanadium tetraoxide ($V_2O_4$) in said composition.

32. A method according to claim 31, further comprising the step of cooling the composition heated in said inert or second reducing atmosphere at a rate of at least about 30° C./sec., from the temperature of more than 700° C. to room temperature, thereby solidifying said fine crystalline particles in the composition.

33. A circuit element according to claim 21, wherein said semiconductive substance of vitrified oxides consists essentially of vanadium pentoxide and at least one oxide selected from the group consisting of oxides of strontium, phosphorus, silver and lead.

34. A method for manufacturing a thermistor composition comprising the steps of heating an oxide composition consisting essentially of not less than 25% of oxidized pentavalent vanadium and the balance of at least one oxide selected from the group consisting of oxide of up to 50% of phosphorus, up to 60% of barium, up to 60% of strontium, up to 60% of lead, up to 70% of silver, up to 50% of lithium, up to 40% of sodium, up to 30% of potassium, up to 60% of beryllium, up to 75% of magnesium, up to 60% of calcium, up to 50% of lanthanum, up to 70% of cerium, up to 70% of zirconium, up to 70% of zinc, up to 70% of cadmium, up to 60% of boron, up to 50% of aluminum, up to 75% of silicon, up to 75% of tin, up to 60% of uranium and up to 30% of yttrium in a reducing atmosphere including one material selected from the group consisting of ammonia, benzene, methyl alcohol, ethyl alcohol, sulfur dioxide, furfural, toluene and xylene to a temperature below 670° C. for such a period of time that the mean value of the oxygen/vanadium ratio of vanadium oxide included in the oxide composition is changed to a value below the true stoichiometric value of vanadium pentoxide but not less than that of vanadium tetra-oxide $V_2O_4$ the ratio of said elements being expressed in atomic ratio of elements other than oxygen included in the oxide composition respectively; and then heating the resulting oxide composition in an inert atmosphere to a temperature above 700° C. but below the melting point of vanadium tetraoxide for a period of time sufficient to segregate fine crystalline particles of vanadium tetra-oxide $V_2O_4$ in the oxide composition.

35. A method for manufacturing a thermistor composition comprising the steps of heating an oxide composition consisting essentially of an oxide of not less than 25% of penta-valent vanadium and the balance being at least one oxide selected from the group consisting of oxide of up to 50% of phosphorus, up to 60% of barium, up to 60% of strontium, up to 60% of lead, up to 70% of silver, up to 50% of lithium, up to 40% of sodium, up to 30% of potassium, up to 60% of beryllium, up to 75% of magnesium, up to 60% of calcium, up to 50% of lanthanium, up to 70% of cerium, up to 70% of zirconium, up to 70% of zinc, up to 70% of cadmium, up to 60% of boron, up to 50% of aluminum, up to 75% of silicon, up to 75% of tin, up to 60% of uranium, and up to 30% of yttrium in a first reducing atmosphere including one material selected from the group consisting of ammonia, benzene, methyl alcohol, ethyl alcohol, sulfur dioxide, furfural, toluene and xylene to a temperature below 670° C., the ratios of said elements being expressed in atomic ratio of elements other than oxygen included in the oxide composition, respectively; and then heating the resulting oxide composition in an inert or a second reducing atmosphere to a temperature above 700° C. but below the melting point of vanadium tetraoxide, at which at least one part of the oxide composition melts, for a period of time sufficient to segregate fine crystalline particles of oxide of tetra-valent vanadium in the molten oxide composition; said steps of heating in said first reducing atmosphere and in said inert or second reducing atmosphere being carried out for such a period of time that the mean valence value of vanadium in said oxide composition does not become lower than the tetra-valence value.

References Cited

UNITED STATES PATENTS 2,700,720   1/1955   Torok _____ 252—518X

OTHER REFERENCES

Chemical Abstracts, vol. 47 (1963) col. 1910b.

JOHN D. WELSH, Primary Examiner

U.S. Cl. X.R.

106—39; 252—521